United States Patent
Chanda et al.

(10) Patent No.: US 12,327,016 B2
(45) Date of Patent: *Jun. 10, 2025

(54) GESTURE BASED WORKFLOWS IN A COLLABORATION SYSTEM

(71) Applicant: Bluescape Buyer LLC, Chicago, IL (US)

(72) Inventors: Rupen Chanda, Austin, TX (US); Demian Entrekin, Oakland, CA (US)

(73) Assignee: BLUESCAPE BUYER, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,504

(22) Filed: Jan. 12, 2023

(65) Prior Publication Data

US 2023/0221858 A1 Jul. 13, 2023

Related U.S. Application Data

(63) Continuation of application No. 16/800,752, filed on Feb. 25, 2020, now Pat. No. 11,573,694.
(Continued)

(51) Int. Cl.
*G06F 3/04883* (2022.01)
*H04L 41/22* (2022.01)
(Continued)

(52) U.S. Cl.
CPC .......... *G06F 3/04883* (2013.01); *H04L 41/22* (2013.01); *H04L 67/02* (2013.01); *H04L 67/53* (2022.05)

(58) Field of Classification Search
CPC ..... G06F 3/04883; H04L 41/22; H04L 67/02; H04L 67/20; H04L 67/53
See application file for complete search history.

(56) References Cited

U.S. PATENT DOCUMENTS

| | | | |
|---|---|---|---|
| 4,686,332 | A | 8/1987 | Greanias et al. |
| 5,008,853 | A | 4/1991 | Bly et al. |

(Continued)

FOREIGN PATENT DOCUMENTS

| | | |
|---|---|---|
| CN | 101630240 A | 1/2010 |
| CN | 102483848 A | 5/2012 |

(Continued)

OTHER PUBLICATIONS

"Ergonomics Data and Mounting Heights," Ergonomic Ground Rules, last revised Sep. 22, 2010, 2 pgs.
(Continued)

*Primary Examiner* — Stephen S Hong
*Assistant Examiner* — Darrin Hope
(74) *Attorney, Agent, or Firm* — Haynes Beffel & Wolfeld LLP; Andrew L. Dunlap; Franklin M. Schellenberg

(57) ABSTRACT

A method for facilitating invocation of a procedure by a first network node in a system comprising the first and second network node. The method includes storing, in the second network node, a data set comprising digital assets represented by graphical objects having locations in a virtual workspace, providing information associated with the graphical objects to the first network node, detecting a gesture or a user interaction event contacting a plurality of locations on a screen space of the first network node, obtaining an identification of a workflow procedure in dependence upon an interpretation of the gesture or user interaction event, wherein at least one of the locations corresponds to a location of the graphical object and wherein the workflow procedure has an input parameter associated with one or more properties of the graphical object, and facilitating invocation of the identified workflow procedure according to the input parameter.

20 Claims, 18 Drawing Sheets

Related U.S. Application Data

(60) Provisional application No. 62/810,309, filed on Feb. 25, 2019.

(51) Int. Cl.
*H04L 67/02* (2022.01)
*H04L 67/53* (2022.01)

(56) References Cited

U.S. PATENT DOCUMENTS

| | | |
|---|---|---|
| 5,220,657 A | 6/1993 | Bly et al. |
| 5,309,555 A | 5/1994 | Akins et al. |
| 5,394,521 A | 2/1995 | Henderson, Jr. et al. |
| 5,446,842 A | 8/1995 | Schaeffer et al. |
| 5,537,526 A | 7/1996 | Anderson et al. |
| 5,563,996 A | 10/1996 | Tchao |
| 5,689,628 A | 11/1997 | Robertson |
| 5,727,002 A | 3/1998 | Miller et al. |
| 5,781,732 A | 7/1998 | Adams |
| 5,818,425 A | 10/1998 | Want et al. |
| 5,835,713 A | 11/1998 | FitzPatrick et al. |
| 5,872,924 A | 2/1999 | Nakayama et al. |
| 5,938,724 A | 8/1999 | Pommier et al. |
| 5,940,082 A | 8/1999 | Brinegar et al. |
| 6,078,921 A | 6/2000 | Kelley |
| 6,084,584 A | 7/2000 | Nahi et al. |
| 6,128,014 A | 10/2000 | Nakagawa et al. |
| 6,167,433 A | 12/2000 | Maples et al. |
| 6,320,597 B1 | 11/2001 | Teperen |
| 6,342,906 B1 | 1/2002 | Kumar et al. |
| 6,343,313 B1 | 1/2002 | Salesky et al. |
| 6,518,957 B1 | 2/2003 | Lehtinen et al. |
| 6,564,246 B1 | 5/2003 | Varma et al. |
| 6,710,790 B1 | 3/2004 | Fagioli |
| 6,778,989 B2 | 8/2004 | Bates et al. |
| 6,911,987 B1 | 6/2005 | Mairs et al. |
| 6,930,673 B2 | 8/2005 | Kaye et al. |
| 6,930,679 B2 | 8/2005 | Wu et al. |
| 7,003,728 B2 | 2/2006 | Berque |
| 7,043,529 B1 | 5/2006 | Simonoff |
| 7,100,195 B1 | 8/2006 | Underwood |
| 7,129,934 B2 | 10/2006 | Uman et al. |
| 7,171,448 B1 | 1/2007 | Danielsen et al. |
| 7,356,563 B1 | 4/2008 | Leichtling et al. |
| 7,450,109 B2 | 11/2008 | Halcrow et al. |
| D600,703 S | 9/2009 | LaManna et al. |
| 7,908,325 B1 | 3/2011 | Pabla et al. |
| 8,209,308 B2 | 6/2012 | Rueben et al. |
| D664,562 S | 7/2012 | McCain et al. |
| 8,402,391 B1 | 3/2013 | Doray et al. |
| 8,407,290 B2 | 3/2013 | Abt, Jr. et al. |
| 8,898,590 B2 | 11/2014 | Okada et al. |
| 8,954,862 B1 | 2/2015 | Mabie et al. |
| 9,201,854 B1 | 12/2015 | Kloiber et al. |
| 9,298,834 B2 | 3/2016 | Kleppner et al. |
| 9,465,434 B2 | 10/2016 | Mason |
| 9,471,192 B2 | 10/2016 | Mason |
| 9,477,522 B2 | 10/2016 | Harper et al. |
| 9,479,548 B2 | 10/2016 | Jensen et al. |
| 9,479,549 B2 | 10/2016 | Pearson |
| 10,009,550 B1 | 6/2018 | Hunt |
| 10,255,023 B2 | 4/2019 | Liu et al. |
| 11,573,694 B2 | 2/2023 | Chanda et al. |
| 2003/0020671 A1 | 1/2003 | Santoro et al. |
| 2003/0058227 A1 | 3/2003 | Hara et al. |
| 2004/0060037 A1 | 3/2004 | Damm et al. |
| 2004/0083264 A1 | 4/2004 | Veselov |
| 2004/0093331 A1 | 5/2004 | Garner et al. |
| 2004/0150627 A1 | 8/2004 | Luman et al. |
| 2004/0155871 A1 | 8/2004 | Perski et al. |
| 2004/0174398 A1 | 9/2004 | Luke et al. |
| 2004/0243605 A1 | 12/2004 | Bernstein et al. |
| 2004/0243663 A1 | 12/2004 | Johanson et al. |
| 2005/0060656 A1 | 3/2005 | Martinez et al. |
| 2005/0195216 A1 | 9/2005 | Kramer et al. |
| 2005/0237380 A1 | 10/2005 | Kakii et al. |
| 2005/0262107 A1 | 11/2005 | Bergstraesser et al. |
| 2005/0273700 A1 | 12/2005 | Champion et al. |
| 2006/0012580 A1 | 1/2006 | Perski et al. |
| 2006/0066588 A1 | 3/2006 | Lyon et al. |
| 2006/0085767 A1 | 4/2006 | Hinckley et al. |
| 2006/0195507 A1 | 8/2006 | Baek et al. |
| 2006/0211404 A1 | 9/2006 | Cromp et al. |
| 2006/0220982 A1 | 10/2006 | Ueda |
| 2006/0224427 A1 | 10/2006 | Salmon |
| 2006/0294473 A1 | 12/2006 | Keely et al. |
| 2007/0136685 A1 | 6/2007 | Bhatla et al. |
| 2007/0198744 A1 | 8/2007 | Wensley et al. |
| 2007/0262964 A1 | 11/2007 | Zotov et al. |
| 2008/0114844 A1 | 5/2008 | Sanchez et al. |
| 2008/0143818 A1 | 6/2008 | Ferren et al. |
| 2008/0155480 A1* | 6/2008 | Van Wyk ............... G06Q 10/06 715/863 |
| 2008/0163053 A1 | 7/2008 | Hwang et al. |
| 2008/0177771 A1 | 7/2008 | Vaughn |
| 2008/0201339 A1 | 8/2008 | McGrew et al. |
| 2008/0207188 A1 | 8/2008 | Ahn et al. |
| 2008/0301101 A1 | 12/2008 | Baratto et al. |
| 2009/0049381 A1 | 2/2009 | Robertson et al. |
| 2009/0089682 A1 | 4/2009 | Baier et al. |
| 2009/0128516 A1 | 5/2009 | Rimon et al. |
| 2009/0153519 A1 | 6/2009 | Suarez Rovere |
| 2009/0160786 A1 | 6/2009 | Finnegan |
| 2009/0174679 A1 | 7/2009 | Westerman |
| 2009/0195518 A1 | 8/2009 | Mattice et al. |
| 2009/0207146 A1 | 8/2009 | Shimasaki et al. |
| 2009/0217177 A1 | 8/2009 | DeGrazia |
| 2009/0234721 A1 | 9/2009 | Bigelow et al. |
| 2009/0251457 A1 | 10/2009 | Walker et al. |
| 2009/0278806 A1 | 11/2009 | Duarte et al. |
| 2009/0282359 A1 | 11/2009 | Saul et al. |
| 2009/0309846 A1 | 12/2009 | Trachtenberg et al. |
| 2009/0309853 A1 | 12/2009 | Hildebrandt et al. |
| 2010/0011316 A1 | 1/2010 | Sar et al. |
| 2010/0017727 A1 | 1/2010 | Offer et al. |
| 2010/0073454 A1 | 3/2010 | Lovhaugen et al. |
| 2010/0132034 A1 | 5/2010 | Pearce et al. |
| 2010/0192091 A1 | 7/2010 | Oishi et al. |
| 2010/0194701 A1 | 8/2010 | Hill |
| 2010/0205190 A1 | 8/2010 | Morris et al. |
| 2010/0211920 A1 | 8/2010 | Westerman et al. |
| 2010/0306650 A1 | 12/2010 | Oh et al. |
| 2010/0306696 A1 | 12/2010 | Groth et al. |
| 2010/0309148 A1 | 12/2010 | Fleizach et al. |
| 2010/0315481 A1 | 12/2010 | Wijngaarden et al. |
| 2010/0318470 A1 | 12/2010 | Meinel et al. |
| 2010/0318921 A1 | 12/2010 | Trachtenberg et al. |
| 2010/0328306 A1 | 12/2010 | Chau et al. |
| 2011/0047505 A1 | 2/2011 | Fillion et al. |
| 2011/0050640 A1 | 3/2011 | Lundback et al. |
| 2011/0055773 A1 | 3/2011 | Agarawala et al. |
| 2011/0060992 A1 | 3/2011 | Jevons et al. |
| 2011/0063191 A1 | 3/2011 | Leung et al. |
| 2011/0069184 A1 | 3/2011 | Go |
| 2011/0109526 A1 | 5/2011 | Bauza et al. |
| 2011/0148926 A1 | 6/2011 | Koo et al. |
| 2011/0154192 A1 | 6/2011 | Yang et al. |
| 2011/0181526 A1* | 7/2011 | Shaffer ............... G06F 3/04883 345/173 |
| 2011/0183654 A1 | 7/2011 | Lanier et al. |
| 2011/0191343 A1 | 8/2011 | Heaton et al. |
| 2011/0197147 A1 | 8/2011 | Fai |
| 2011/0197157 A1 | 8/2011 | Hoffman et al. |
| 2011/0202424 A1 | 8/2011 | Chun et al. |
| 2011/0208807 A1 | 8/2011 | Shaffer |
| 2011/0214063 A1 | 9/2011 | Saul |
| 2011/0216064 A1 | 9/2011 | Dahl et al. |
| 2011/0225494 A1 | 9/2011 | Shmuylovich et al. |
| 2011/0243380 A1 | 10/2011 | Forutanpour et al. |
| 2011/0246875 A1 | 10/2011 | Parker et al. |
| 2011/0264785 A1 | 10/2011 | Newman et al. |
| 2011/0271229 A1 | 11/2011 | Yu |
| 2012/0011465 A1 | 1/2012 | Rezende |
| 2012/0019452 A1 | 1/2012 | Westerman |

(56) References Cited

U.S. PATENT DOCUMENTS

| | | |
|---|---|---|
| 2012/0026200 A1 | 2/2012 | Okada et al. |
| 2012/0030193 A1 | 2/2012 | Richberg et al. |
| 2012/0038572 A1 | 2/2012 | Kim et al. |
| 2012/0050197 A1 | 3/2012 | Kemmochi |
| 2012/0075212 A1 | 3/2012 | Park et al. |
| 2012/0124124 A1 | 5/2012 | Beaty et al. |
| 2012/0127126 A1 | 5/2012 | Mattice et al. |
| 2012/0169772 A1 | 7/2012 | Werner et al. |
| 2012/0176328 A1 | 7/2012 | Brown et al. |
| 2012/0179994 A1 | 7/2012 | Knowlton et al. |
| 2012/0229425 A1 | 9/2012 | Barrus et al. |
| 2012/0254858 A1 | 10/2012 | Moyers et al. |
| 2012/0260176 A1 | 10/2012 | Sehrer |
| 2012/0274583 A1 | 11/2012 | Haggerty |
| 2012/0275683 A1 | 11/2012 | Adler et al. |
| 2012/0278738 A1 | 11/2012 | Kruse et al. |
| 2012/0320073 A1 | 12/2012 | Mason |
| 2013/0004069 A1 | 1/2013 | Hawkins et al. |
| 2013/0027404 A1 | 1/2013 | Sarnoff |
| 2013/0047093 A1 | 2/2013 | Reuschel et al. |
| 2013/0086487 A1 | 4/2013 | Findlay et al. |
| 2013/0093695 A1 | 4/2013 | Davidson |
| 2013/0198653 A1 | 8/2013 | Tse et al. |
| 2013/0218998 A1 | 8/2013 | Fischer et al. |
| 2013/0222371 A1 | 8/2013 | Reitan |
| 2013/0246969 A1 | 9/2013 | Barton |
| 2013/0282820 A1 | 10/2013 | Jabri et al. |
| 2013/0320073 A1 | 12/2013 | Yokoo et al. |
| 2013/0346878 A1 | 12/2013 | Mason |
| 2013/0346910 A1 | 12/2013 | Mason |
| 2014/0013234 A1 | 1/2014 | Beveridge et al. |
| 2014/0022334 A1 | 1/2014 | Lockhart et al. |
| 2014/0032770 A1 | 1/2014 | Pegg |
| 2014/0033067 A1 | 1/2014 | Pittenger et al. |
| 2014/0040767 A1 | 2/2014 | Bolia |
| 2014/0055400 A1 | 2/2014 | Reuschel |
| 2014/0062957 A1 | 3/2014 | Perski et al. |
| 2014/0063174 A1 | 3/2014 | Junuzovic et al. |
| 2014/0149901 A1 | 5/2014 | Hunter |
| 2014/0215393 A1 | 7/2014 | Schwartz et al. |
| 2014/0222916 A1 | 8/2014 | Foley et al. |
| 2014/0223334 A1 | 8/2014 | Jensen et al. |
| 2014/0223335 A1 | 8/2014 | Pearson |
| 2014/0250398 A1* | 9/2014 | Andrews ............ G06F 3/04883 715/771 |
| 2014/0282229 A1 | 9/2014 | Laukkanen et al. |
| 2014/0380193 A1 | 12/2014 | Coplen et al. |
| 2015/0007040 A1 | 1/2015 | Xu et al. |
| 2015/0007055 A1 | 1/2015 | Lemus et al. |
| 2015/0084055 A1 | 3/2015 | Nagata et al. |
| 2015/0089452 A1 | 3/2015 | Dorninger |
| 2015/0135046 A1 | 5/2015 | Moore et al. |
| 2015/0185990 A1 | 7/2015 | Thompson |
| 2015/0248384 A1 | 9/2015 | Luo et al. |
| 2015/0279071 A1 | 10/2015 | Xin |
| 2015/0331489 A1 | 11/2015 | Edwardson |
| 2015/0365277 A1* | 12/2015 | Moyers ............... H04L 65/4053 715/757 |
| 2016/0085381 A1 | 3/2016 | Parker et al. |
| 2016/0142471 A1 | 5/2016 | Tse et al. |
| 2016/0232647 A1 | 8/2016 | Carlos et al. |
| 2016/0328098 A1 | 11/2016 | Santhakumar et al. |
| 2016/0328114 A1 | 11/2016 | Santhakumar et al. |
| 2016/0378291 A1 | 12/2016 | Pokrzywka |
| 2017/0090852 A1 | 3/2017 | Harada |
| 2017/0235537 A1 | 8/2017 | Liu et al. |
| 2017/0315767 A1 | 11/2017 | Rao |
| 2017/0330150 A1 | 11/2017 | Foley et al. |

FOREIGN PATENT DOCUMENTS

| | | |
|---|---|---|
| JP | 2001356878 A | 12/2001 |
| JP | 2002116996 A | 4/2002 |
| JP | 2005258877 A | 9/2005 |
| JP | 2010079834 A | 4/2010 |
| JP | 2010129093 A | 6/2010 |
| JP | 2010134897 A | 6/2010 |
| JP | 2010165178 A | 7/2010 |
| JP | 2010218313 A | 9/2010 |
| JP | 2012043251 A | 3/2012 |
| WO | 0161633 A2 | 8/2001 |
| WO | 2009018314 A2 | 2/2009 |
| WO | 2011029067 A2 | 3/2011 |
| WO | 2011048901 A1 | 4/2011 |
| WO | 2012162411 A1 | 11/2012 |
| WO | 2014023432 A1 | 2/2014 |
| WO | 2014121209 A2 | 8/2014 |

OTHER PUBLICATIONS

Albin, T., "Comfortable Portable Computing: The Ergonomic Equation," Copyright 2008 Ergotron, Inc., 19 pgs.

Anacore, "Anacore Presents Synthesis", InfoComm 2012: Las Vegas, NV, USA, Jun. 9-15, 2012, 2 pages, screen shots taken from http://www.youtube.com/watch?v=FbQ9P1c5aNk (visited Nov. 1, 2013).

Ionescu, Ama, et al., "WorkspaceNavigator: Tools for Capture, Recall and Reuse using Spatial Cues in an Interactive Workspace," 2002, <URL=https://hci.stanford.edu/research/wkspcNavTR.pdf>, 16 p.

Johanson, Brad et al., "The Event Heap: an Enabling Infrastructure for Interactive Workspaces." 2000 <Url=https://iraphics.stanford.edu/papers/eheap/>, 11 pages.

Masters Thesis: "The ANA Project, Development of the ANA-Core Software" Ariane Keller, Sep. 21, 2007, ETH Zurich, 92 pages.

Taylor, Allen G., "SQL for Dummies," 7th Ed., published Jul. 5, 2012, 11 pages.

Villamor, C., et al., "Touch Gesture Reference Guide", Apr. 15, 2010, retrieved from the internet: http://web.archive.org/web/20100601214053; http://www.lukew.com/touch/TouchGestureGuide.pdf, 7 pages, retrieved on Apr. 10, 2014.

W3C Working Group Note, HTML: The Markup Language (an HTML language reference), http://www.w3.org/TR/html-markup/iframe.html[Aug. 4, 2016 2:01:59 PM], 3 pages.

* cited by examiner

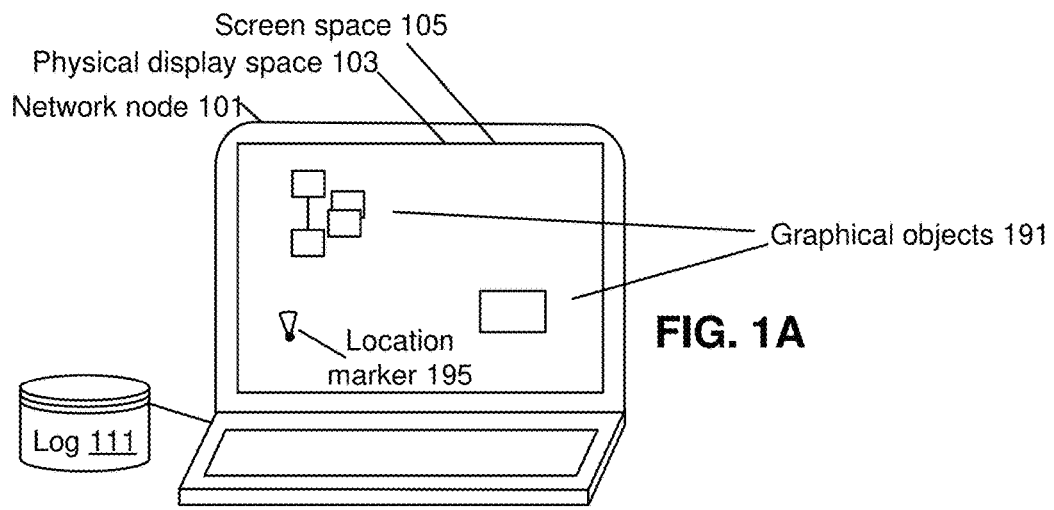
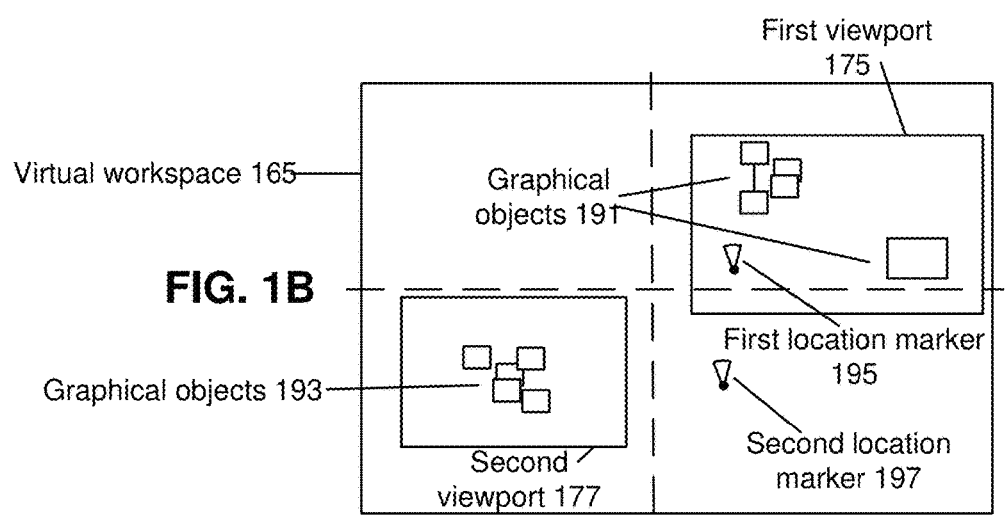
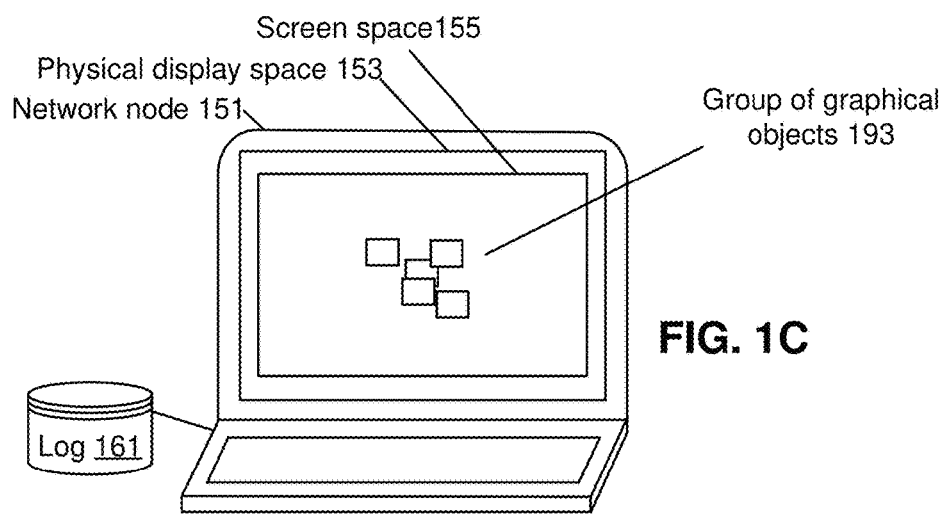

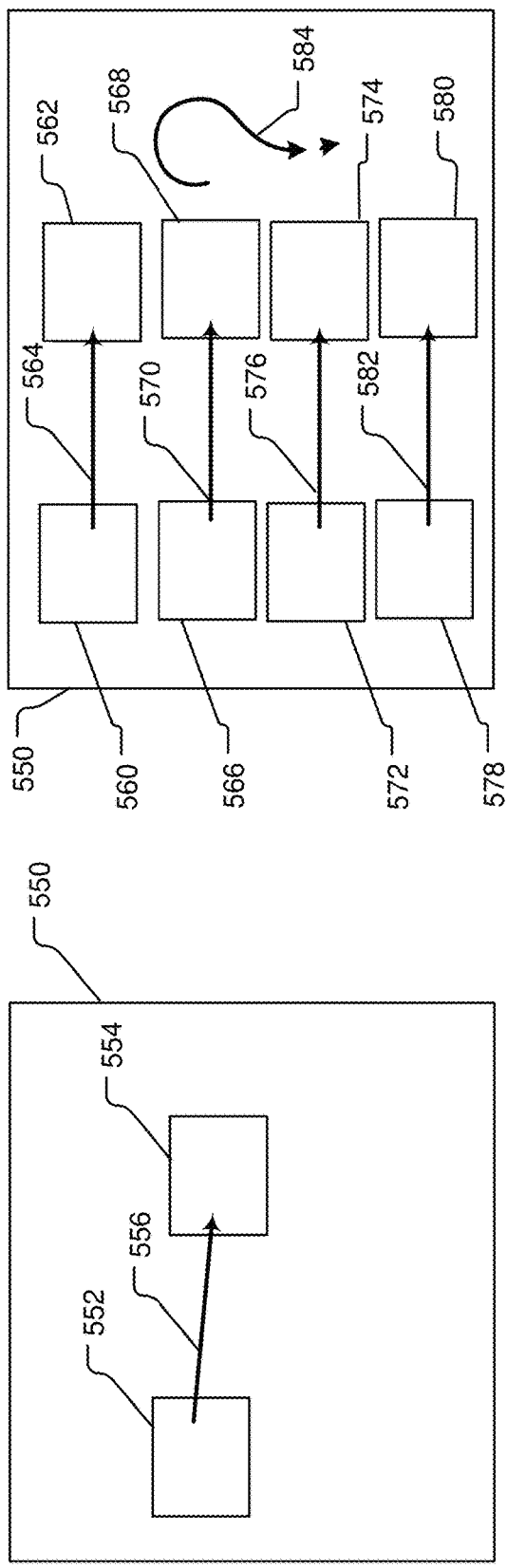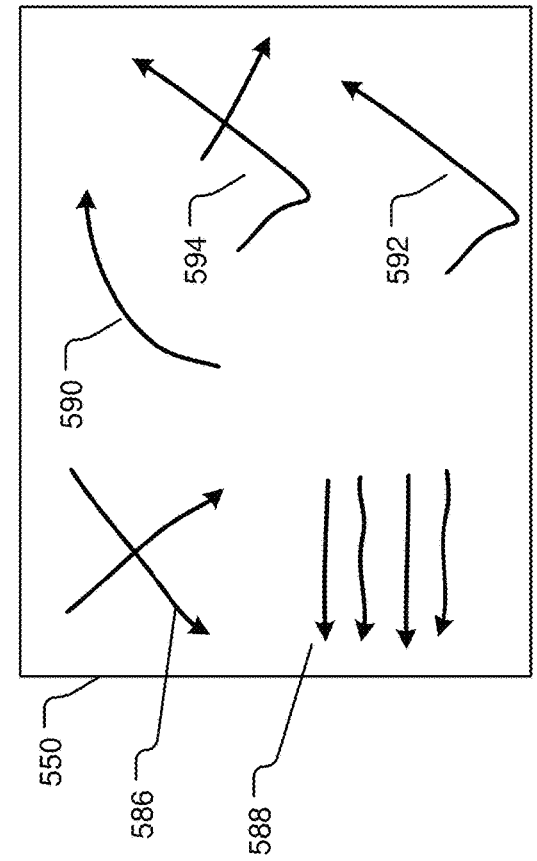

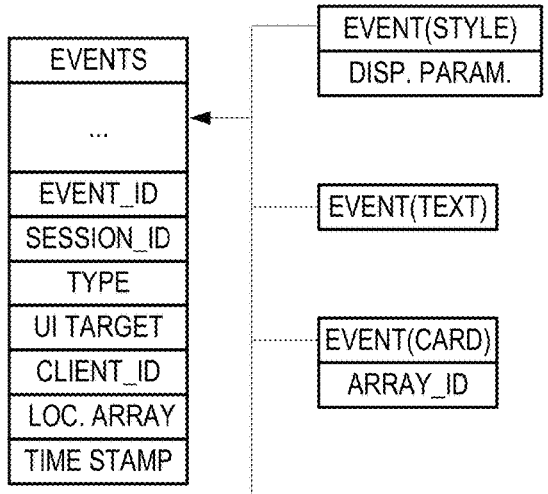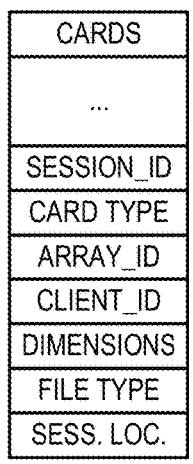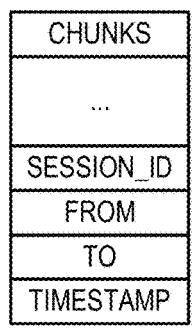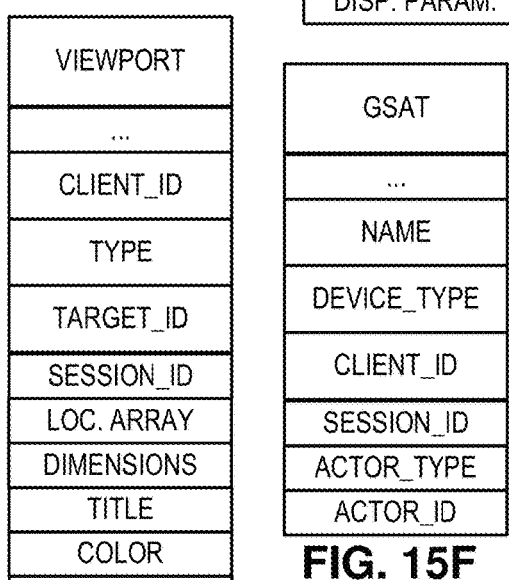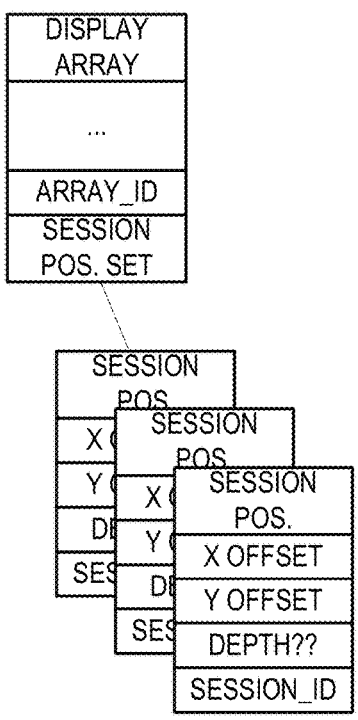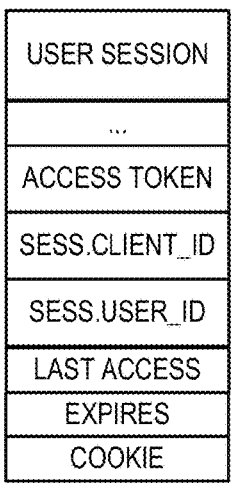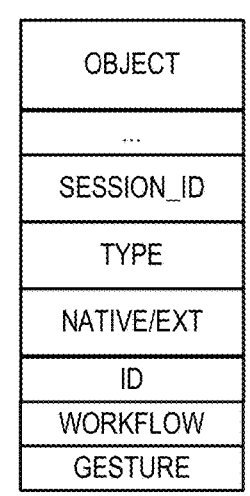
FIG. 15A
FIG. 15B
FIG. 15C
FIG. 15D
FIG. 15E
FIG. 15F
FIG. 15G
FIG. 15H
FIG. 15I

GESTURE BASED WORKFLOWS IN A COLLABORATION SYSTEM

PRIORITY APPLICATION

This application is a Continuation of U.S. Non-Provisional application Ser. No. 16/800,752, titled "GESTURE BASED WORKFLOWS IN A COLLABORATION SYSTEM", filed Feb. 25, 2020, which claims benefit of U.S. Provisional Patent Application No. 62/810,309, titled "VISUAL PROGRAMMING PLATFORM", filed Feb. 25, 2019, both for which are incorporated by reference.

INCORPORATION BY REFERENCE

Further, this application also incorporates by reference U.S. Nonprovisional patent application Ser. No. 15/093,664, titled "Object Group Processing and Selection Gestures for Grouping Objects in a Collaboration System," filed on Apr. 7, 2016.

FIELD OF THE TECHNOLOGY DISCLOSED

The technology disclosed relates to methods and systems for digital collaboration, and more particularly relates to collaborative digital display systems that facilitate the invocation of customizable workflow procedures that are invoked using interpreted gestures that are also customizable.

DESCRIPTION OF RELATED ART

Conventional collaboration systems do not integrate tasking systems with content systems, specifically in situations where the tasking systems and/or content systems are third-party systems. For example, a tasking system can be native to one platform and content can be native and/or available to a multitude of other platforms. The technology disclosed bridges this gap and provides a visual collaboration system/platform that combines tasking systems and content systems into one virtual workspace. Furthermore, the technology disclosed provides a virtual workspace that interprets gestures and invokes workflow procedures across multiple tasking systems and/or content systems.

Additionally, in conventional visual collaboration systems/platforms, spatial layout of graphical objects can manifest an implicit workflow. For example, positions of a graphical object to the left, right, top or bottom of another graphical object can have an implicit meaning. However, this implicit meaning is left up to the interpretation of the user and no specific action can be taking in the visual collaboration system/platform based on this implicit meaning. The technology disclosed solves this problem and transforms this implicit meaning to explicit workflow procedures that can be invoked by interpreted gestures.

Moreover, convention prior art visual collaboration systems/platforms require specific tasks to be codified separately by a user of another system. For example, conventionally, the only way to translate agreements in a meeting to actionable tasks is to introduce further human intervention. This introduces delay and the potential for error. The technology disclosed automatically initiates predefined (and customizable) workflow procedures based on gestures.

SUMMARY

The technology disclosed provides a visual collaboration system that provides a platform in which user interaction with high-level visual elements (e.g., graphical objects and or digital assets, such as documents, videos, browser page, images, notes, etc.) on a display screen can be used to determine user intent based on a relationship defined among the visual elements using, for example, gestures or a user interaction event. Specifically, the technology disclosed can create workflow procedures based on touch and non-touch gestures and can generate notifications and varieties of tasks.

Moreover, the technology disclosed is capable of combining (i) native tasking and content systems, (ii) native and external third-party tasking systems, and (iii) native and external third-party content systems into one virtual workspace, such that the collaboration system interprets gestures and invokes workflow procedures across the multiple tasking systems and content systems.

Further, the technology provides for the design and implementation of workflow procedures that have actionable output (e.g., a set of tasks assigned to one or more users). For example, during a collaboration session using a touch enabled digital display, the participants can decide actions for meeting participants. To achieve this, a user can perform actions related to the content in or related to a digital asset. The technology disclosed can transform a discussion that takes place during a collaboration session into a workflow procedure consisting of actionable tasks. Therefore, the visual collaboration system can become a source of truth for the discussion that took place during the collaboration and for agreements on "to dos" for the participants of the collaboration session.

Specifically, in an embodiment a method of invoking a procedure by a first network node in a computer system including first and second network nodes is provided. The method can include accessing, by the first network node, a stored data set, the data set identifying events linked to digital assets represented by (i) graphical objects having locations in a virtual workspace and (ii) information associated with the graphical objects, the events having locations in the virtual workspace and involving user interactions with the graphical objects representing the digital assets. The method can also include generating a graphical object representing a digital asset in a screen space of a display of the first network node by (i) mapping the screen space to a viewport in a virtual workspace (ii) identifying an event having a location in the viewport, the identified event being linked, by the data set, to the digital asset represented by the graphical object and (iii) placing the graphical object, which represents the digital asset that is linked to the identified event, on the screen space according to a location of the graphical object in the virtual workspace, as identified by the data set. Furthermore, the method can include detecting a gesture or a user interaction event contacting a plurality of locations on the screen space, and obtaining an identification of a workflow procedure in dependence upon an interpretation of the gesture or the user interaction event, the workflow procedure having an input parameter. Moreover, the method can include mapping locations, included in the plurality of locations contacted by the gesture or the user interaction event, to the location of the graphical object on the screen space, to obtain, from the data set, an identification of corresponding information associated with the graphical object, and obtaining an identification of the input parameter of the identified workflow procedure in dependence upon the identified corresponding information, and invoking the identified workflow procedure according to the identified input parameter.

In another embodiment a computer system including a first network node having a first communication module and a first processor is provided. Further, the first network node can include logic, executable by the first processor, to access, by the first network node, a stored data set, the data set identifying events linked to digital assets represented by (i) graphical objects having locations in a virtual workspace and (ii) information associated with the graphical objects, the events having locations in the virtual workspace and involving user interactions with the graphical objects representing the digital assets. Additionally, the logic is executable by the first processor to generate a graphical object representing a digital asset in a screen space of a display of the first network node by (i) mapping the screen space to a viewport in a virtual workspace (ii) identifying an event having a location in the viewport, the identified event being linked, by the data set, to the digital asset represented by the graphical object and (iii) placing the graphical object, which represents the digital asset that is linked to the identified event, on the screen space according to a location of the graphical object in the virtual workspace, as identified by the data set. Moreover, the logic is executable by the first processor to detect a gesture or a user interaction event contacting a plurality of locations on the screen space, obtain an identification of a workflow procedure in dependence upon an interpretation of the gesture or the user interaction event, the workflow procedure having an input parameter, map locations, included in the plurality of locations contacted by the gesture or the user interaction event, to the location of the graphical object on the screen space, to obtain, from the data set, an identification of corresponding information associated with the graphical object, obtain an identification of the input parameter of the identified workflow procedure in dependence upon the identified corresponding information, and invoke the identified workflow procedure according to the identified input parameter.

In yet another embodiment a method for invoking a procedure by a second network node in a computer system comprising a first network node and the second network node is provided. The method can include storing, by the second network node, a data set, the data set identifying events linked to digital assets represented by (i) graphical objects having locations in a virtual workspace and (ii) information associated with the graphical objects, the events having locations in the virtual workspace and involving user interactions with the graphical objects representing the digital assets. The method can also include providing, to the first network node and for display in a screen space of a display of the first network node, display information related to a graphical object representing a digital asset, the display information allowing for (i) mapping the screen space to a viewport in a virtual workspace (ii) identifying an event having a location in the viewport, the identified event being linked, by the data set, to the digital asset represented by the graphical object and (iii) placing the graphical object, which represents the digital asset that is linked to the identified event, on the screen space according to a location of the graphical object in the virtual workspace, as identified by the data set. Furthermore, the method can include providing, to the first network node, an identification of a workflow procedure in dependence upon an interpretation of a detected gesture or a detected user interaction event contacting a plurality of locations on the screen space, the workflow procedure having an input parameter, providing, to the first network node, mapping information mapping locations, included in the plurality of locations contacted by the gesture or the user interaction event, to the location of the graphical object on the screen space, providing, to the first network node and from the data set, an identification of corresponding information associated with the graphical object, providing, to the first network node, an identification of the input parameter of the identified workflow procedure in dependence upon the identified corresponding information, and facilitating invocation of the identified workflow procedure according to the identified input parameter.

In a further embodiment a computer system is provided to carry out the method performed by the second network node.

In another embodiment a non-transitory computer readable storage medium impressed with computer program instructions to implement a collaborative workspace system including a first network node having a communication module, a processor and a database accessible thereto is provided. The computer program instructions, when executed on a processor, can implement any of the above-described methods.

BRIEF DESCRIPTION OF THE DRAWINGS

The included drawings are for illustrative purposes and serve to provide examples of structures and process operations for one or more implementations of this disclosure. These drawings in no way limit any changes in form and detail that can be made by one skilled in the art without departing from the spirit and scope of this disclosure. A more complete understanding of the subject matter can be derived by referring to the detailed description and claims when considered in conjunction with the following figures, wherein like reference numbers refer to similar elements throughout the figures. The technology disclosed will be described with respect to specific embodiments thereof, and reference will be made to the drawings, which are not drawn to scale, and in which:

FIGS. 1A, 1B, and 1C (collectively FIG. 1) illustrate one implementation of a system of network nodes that collaborate within a virtual workspace.

FIG. 5A illustrates an example gesture and workflow procedure that results in emailing a graphical object or information associated therewith to a specific user.

FIG. 5B illustrates an example gesture and workflow that results graphical objects being logically related to one another and parallel groups of sequential tasks requesting status.

FIG. 5C illustrates some example gestures that can have default and or user-defined workflow procedures associated therewith.

FIGS. 15A, 15B, 15C, 15D, 15E, 15F, 15G, 15H and 15I (collectively FIG. 15) represent data structures which can be part of workspace data maintained by a database at the collaboration server 1405.

DETAILED DESCRIPTION

Figure 2:
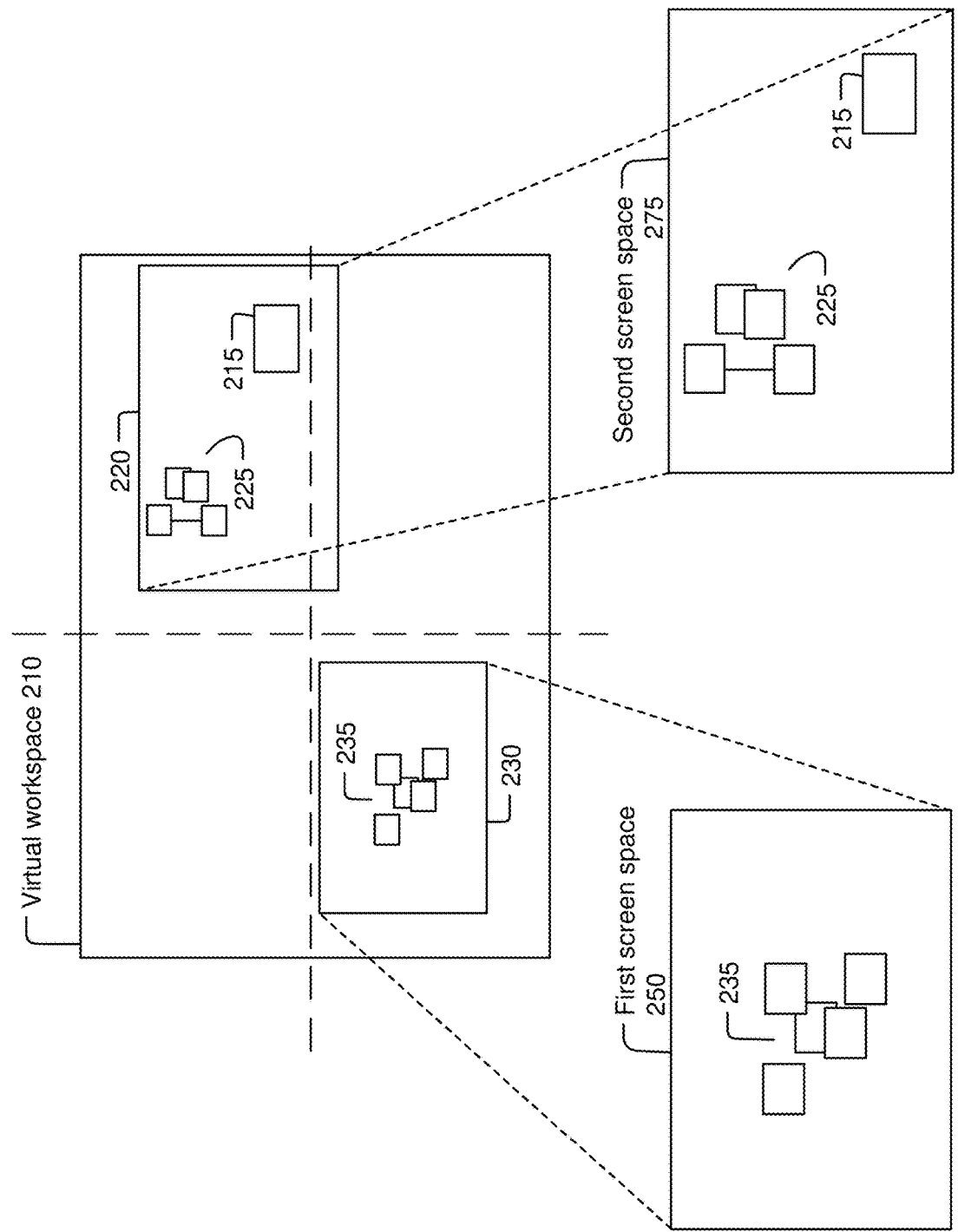
FIG. 2 illustrates one implementation of two network nodes having viewports in distinct areas of an unbounded virtual workspace.

The following description is presented to enable any person skilled in the art to make and use the technology disclosed, and is provided in the context of particular applications and requirements. Various modifications to the disclosed embodiments will be readily apparent to those skilled in the art, and the general principles defined herein may be applied to other embodiments and applications without departing from the spirit and scope of the technology disclosed. Thus, the technology disclosed is not intended to be limited to the embodiments shown, but is to be accorded the widest scope consistent with the principles and features disclosed herein.

Overview of Collaborative Workspaces and Viewports

Collaborative workspaces, such as digital whiteboarding workspaces, are essentially blank canvases that exist in two-dimensional space to which users can add content such as text or images. When content is added to a workspace it must be placed at a specific location. Thus, when a user places content in a workspace, the user must indicate to the system where in the workspace content is to be placed. To support referencing specific locations within workspaces, a system that implements a collaborative workspace might treat its workspace as a Cartesian plane having an origin at its center. Such a system need not place any artificial limitations on the distance from the origin that one can reference, and in such a system, the maximum and minimum coordinates that can be referenced in the workspace are limited by the extent of the addressing scheme used to store those coordinates. If, for example, a system were able to store addresses extending from (−1,000,000) to 1,000,000 in both the vertical and horizontal directions, then the workspaces supported by that system would be considered practically unlimited since it would take the average person an inordinate amount of time to traverse, much less fill, that much space.

While a workspace may be essentially infinite in size, the physical display area of a screen that a user would use to render the workspace is finite in size. Therefore, a user would not be able to render an entire workspace, but rather, would always be rendering a portion of the workspace. Because the entire workspace is addressable in Cartesian coordinates, any portion of the workspace that a user may be viewing itself has a location, width, and height in Cartesian space. This concept of a portion of a workspace can be referred to as a viewport, which is described in greater detail below.

For example, in a system that implements a collaborative workspace, workspaces can be stored on a central network node (e.g., a server or a server-side network node) comprised of a processor and communication port that is capable of receiving connections from other network nodes (e.g., client nodes or client-side network nodes) and transmitting to them all or part of the digital workspace as requested. When a user wishes to render a workspace, they will use a client, comprised of a display, user input device(s), processor and communication port, that is configured with logic to establish communication with the central network node, request and receive workspace data, and render workspaces to the display. Upon connecting to the central network node, clients can request a finite portion of the workspace by transmitting values representing a viewport, namely a location, width, and height. In response to such a request, the central network node will return data enabling the client to render that area of the workspace including any content that has been placed wholly or partially within that area previously by any users of the system to the client's display. Assuming no changes are being made to a workspace, two users on separate clients that request the same viewport from the central network node for display on the same size screen at the same time will see the exact same result rendered to the display. If two users on separate clients with the same screen sizes wish to view the same portion of the workspace, one user (user A) must somehow convey (using their client) to the client of the other user (user B) the exact location, width, and height of their current viewport so that the client of user B can obtain the content of the same portion of the workspace from the central network node and render the content within that particular viewport on the display of user B.

In a collaboration system, where users wish to share viewports for any purpose, such as synchronizing displays, the system implementing the collaborative workspace must (i) enable clients to transmit information related to their viewports to the central network node, (ii) enable the central network node to distribute the dimensions of the viewports and the contents located within the viewports to the client nodes, and (iii) enable clients to select and obtain the dimensions, locations and contents of the viewports, so that the contents of the workspace that are located in the viewports can be rendered on the respective screens of the clients. For example, a system that implements a collaborative workspace can include viewport information whenever clients are connecting to and transmitting information about the state of the workspace. This viewport information can include the locations, dimensions and/or contents of the viewports of any and all clients connected to the central network node and the locations, dimensions and/or contents of viewports that have been saved by users in the workspace.

Definitions and Descriptions

The "unlimited workspace" problem includes the need to track how people and devices interact with the workspace over time. In one implementation, this can be addressed by allowing a first system to select a particular view (i.e., a viewport) including specific graphical objects created by a second system. In other words, the first system has the ability to select and view a particular portion of the workspace that was created by the second system, such that the first system views all of the graphical objects as intended by the user of the second system. In another implementation, a first system can save a viewport (e.g., a particular area of the workspace) in association with a viewport marker, and make the viewport marker available to a second system.

Workspace (virtual workspace): In order to support an unlimited amount of spatial information for a given collaboration session, the technology disclosed provides a way to organize a virtual space termed the "workspace" or "virtual workspace." The workspace can be characterized by a multi-dimensional and in some cases two-dimensional Cartesian plane with essentially unlimited extent in one or more dimensions for example, in such a way that (i) new content can be added to the workspace, (ii) the content can be arranged and rearranged in the workspace, (iii) a user can navigate from one part of the workspace to another and (iv) the user can easily find needed things in the workspace when required.

A virtual workspace associated with a specific collaboration session can be represented as an unbounded virtual area providing a frame of reference without a specified boundary, within which to locate events in time and in virtual collaboration space. The workspace can encompass a virtual area that is practically unlimited in that it has a size large enough that the likelihood of a client-side network node navigating beyond its boundaries is negligible. For example, a size encompassing a virtual area that maps to a physical display space including 1,000,000 pixels by 1,000,000 pixels can be considered practically unlimited in some settings. In some examples, the workspace is essentially "infinite" in that its size is only limited by the extent of the addressing scheme used to identify locations within the workspace. Also, the collaboration system can include a number of workspaces, where each workspace can be configured individually for access by a single user or by a user group.

Spatial Event Map (data set): In order to provide the features described above, the collaboration system utilizes a spatial event map. Throughout this document, the spatial event map is also referred to a data set. This data set is not necessarily limited to just a spatial event map, as the data set can also contain other types of data described herein. When discussing transmission of the spatial event map, some or all of the data set may be transmitted and when dissing updating of the spatial event map, other parts of the data set can be updated without updating the information related to the contents of the spatial event map. The spatial event map can include a system architecture supporting collaboration using a plurality of spatial event maps and a plurality of collaboration groups. The spatial event map contains information needed to define objects and events in a workspace. The spatial event map comprises data structures specifying events having locations and dimensions in a virtual collaboration space (e.g., a virtual workspace). The events, maps of events in the space, and access to the space by multiple users, including multiple simultaneous users, support collaboration from users around the globe. Aside from what is disclosed in further detail below, additional details of the virtual workspace and spatial event map are presented in our U.S. application Ser. No. 15/093,664, entitled, "Object Group Processing and Selection Gestures for Grouping Objects in a Collaboration System," filed Apr. 7, 2016, which is fully incorporated herein by reference.

Viewports: A viewport is a particular view of a portion or all of a visual workspace. For example, a first network node (e.g., a first client-side network node) can select a viewport created by a second network node (e.g., a second client-side network node), so that the first network node can render each of the objects included in the area designated by the viewport created by the second network node. This way, the first network node will render each of the objects as intended by the second network node. This allows the first network node to be able to render the "full picture" with all of the associated objects at the same time, without missing any objects or information designated by the second network node.

In one example, an operator of the first network node might be interested in all of the events or objects within a viewport created by the second network node. The first network node can extract event information from the local log that identifies a viewport marker representing the viewport created by the second network node. A graphical menu can be rendered to allow the user to select from one or more previously created viewport markers. The first network node can then select the viewport marker from the menu and obtain information from the local log or from a log stored on a server that allows them to update their local viewport to match the viewport created by the second network node along with all of the graphical targets within the viewport. The first network node can render those graphical targets included in the viewport on a local screen space.

Digital assets (or digital objects): digital assets or objects are arranged in the workspace. The digital assets can be represented by (i) graphical objects having locations in the virtual workspace and (ii) information associated with the graphical objects (e.g., metadata information). One or more digital displays in the collaboration session can display a portion of the workspace on their screen space that is mapped to a viewport in the virtual workspace. In other words, locations on the digital displays can be mapped to locations in the virtual workspace via the viewport. Further, the digital assets can be linked to events, where the events have locations in the virtual workspace and involve interactions with the graphical objects representing (i.e., linked to) the digital assets. A digital asset can also be an internal built-in user level object, such as a notecard, user strokes and/or annotation capabilities. Furthermore, a digital asset can be a third-party application. The third-party application can be external to the collaboration system or it can be native to the collaboration system. The third-party application can be a tasking application (e.g., a tasking system) that performs tasks and it can be a content system that accesses, stores and modifies data. For example, an external third-party application can be a web-based or cloud-based application that is accessed by the collaboration system using specific identifiers, such as a URL. Additionally, for example, a native third-party application can be a third-party application that has been developed or modified to run on the collaboration system itself using, for example, but not limited to, HTML or JavaScript. Data or information can be exchanged between the third-party applications (whether they be external or native) and other components of the collaboration system.

Graphical Objects: Graphical objects can represent the above-described digital assets. A graphical object can be a container on a display screen of a user, where the container is a programmable window. A container may also be referred to as an "iframe." The programmable window can have functions and behaviors associated therewith (e.g., panning information, zooming information, editing information, features defined or programmed by developer of third-party applications represented by the graphical object, X, Y and Z coordinates within the virtual workspace, height and width within the virtual workspace, opacity information, transparency information, Cartesian and/or rotational translation information, multi-purpose internet mail extension (MIME) type information, visibility information such as hidden or visible, launch information, internal or external URL information along with specific arguments, scalable information, fixed-type information, such as location of graphical object being fixed to a location in the virtual workspace or movable, information related to staying afloat on top of other graphical object, such that, for example, a graphical object can or cannot be obscured by any other graphical object, listener information, listener list information including information related to other graphical objects and/or digital assets that can register themselves to listen to meta data related to events, graphical objects and/or digital assets).

Additionally, a container (or iframe) can be referred to as a visual object window (VOW) that can, for example, load a specific URL containing a custom third-party web application (external third-party application) or can load a native third-party application.

Some graphical objects can have any combination of properties and the properties can be defined by words, numbers, various data sets, etc. Some graphical objects can have tasks associated with them. A graphical object (e.g., a container) can be a primitive that allows the collaboration system to bind to any scriptable or native library (e.g., MSWord™, AutoCAD™, etc.). As briefly discussed above, the same graphical object can represent a third-party application and also host third party code. Accordingly, the graphical object can be code-wise containerized, safe from cross-site scripting, since it may contain third-party code. On a server-side node of the collaboration system, the technology disclosed can define the binding of the programmable window and service performed thereby. Such features can allow for handling of the large documents or other electronic information. Also, as mentioned above, third party application and/or ecosystem can be natively integrated into the collaboration system.

Events: Interactions with the virtual workspace are handled as events. People, via tangible user interface devices (e.g., a client-side node of the collaboration system) and systems can interact with the workspace. Events have data that can define or point to a (i) graphical object to be displayed on a physical display (e.g., a screen space of the client-side node), (ii) an action (or actions) and (iii) a user interaction (or interactions), such as creation, modification, movement within the workspace and deletion of a graphical object. Further, the events, which are linked to digital assets and/or graphical objects, can include information (e.g., meta data) associated therewith. This meta data can include information such as originator, date, time, location in the workspace, event type, security information, and other information.

Tracking events in a workspace enables the collaboration system to not only present the spatial events in a workspace in its current state, but to share it with multiple users on multiple displays, to share relevant external information that may pertain to the content, and to understand how the spatial data evolves over time. Also, the spatial event map can have a reasonable size in terms of the amount of data needed, while also defining an unbounded workspace.

There can be several different kinds of events in the collaboration system. Events can be classified as persistent events, also referred to as history (or historical) events that are stored permanently, or for a length of time required by the system for maintaining a workspace during its useful life. Events can be classified as ephemeral events that are useful or of interest for only a short time and shared live among other clients involved in the session. Persistent events may include history events stored in an undo/playback event stream, which event stream can be the same as or derived from the spatial event map of a session. Ephemeral events may include events not stored in an undo/playback event stream for the system. A spatial event map, or maps, can be used by a collaboration system to track the times and locations in the workspace, in some embodiments, of both persistent and ephemeral events on workspaces in the system.

Map of Events: A map of events in the workspace can include the sum total of discrete spatial events that relate to graphical objects having locations in the workspace. When the persistent spatial events for a workspace are available, then that workspace and events in the map of that workspace can be "mapped" to a physical display or screen that has a displayable area referred to herein as a screen space, of specific size. A client can specify their own a viewport (i.e., a local client viewport) in the workspace, where the local client viewport has a location and dimensions in the workspace. The client can then map the events from their local client viewport of the workspace to the screen space for display.

Multi-User Access: One characteristic is that some or all users, or multiple users, who are working on a workspace simultaneously, should be able to see the interactions of the other users in a near-real-time way. The spatial event map allows users having displays at different physical locations to experience near-real-time events, including both persistent and ephemeral events, within their respective viewports, for all users on any given workspace. The collaboration system architectures described herein enable operation of many workspaces and many user groups.

User manipulation of groups of graphical targets, referred to as group interactions, at client-side network nodes, such as group creation, duplication, movement, editing, group membership modifications, deletion and other group management interactions, can be experienced as near-real-time events, including both persistent and ephemeral events, within their respective screen spaces, for all users on any given workspace. One way for a first user to ensure that all other users can view graphical targets or widgets (i.e., graphical objects) as intended by the first user is to provide the ability for the first user to create a viewport having an area that includes one or more graphical targets and share a viewport marker to the other users. The shared viewport marker represents the viewport created by the first user and allows the other users to open up (view) that viewport and all of the graphical targets included therein as intended by the first user.

Widget: A widget is a component of a workspace that the user can interact with or view (e.g., Notes, Images, Clocks, Web Browsers, Video Players, Location Markers, Viewport Markers, etc.). A Window is a widget that is a rectangular region with two diagonally opposite corners. Most widgets are also windows. As described above, a widget is another type of graphical object.

Third-Party Applications: Native and external third-party applications are described in detail above with respect to the descriptions of graphical objects. Specifically, a digital asset can be a third-party application that is represented by a graphical object. The third-party application can be an external third-party application that can be accessed via, for example a URL, and the third-party application can be a natively integrated third-party application. Third-party applications can also be task-related applications as well as content-related applications. Third-party applications are discussed in more detailed below with respect to gestures that interact with third-party applications and workflow procedures that are invoked using the third-party application.

Log of Events: The spatial event map can include a log of events, where entries in the log have the location of the graphical target of the event in the workspace and a time. Also, entries in the log can include a parameter (e.g., URL or actual file) identifying graphical constructs used to render a graphical object (target) on a display. A graphical construct has a location and a dimension in the screen space when it is rendered. Server-side network nodes and client-side network nodes are described which interact to form the collaboration system by which the spatial event map can be made accessible to authorized clients, and clients can utilize the spatial event map to render local display areas, and create events that can be added to the spatial event map and shared with other clients.

Application Program Interface (API): The collaboration system can be configured according to an API, so that the server-side network nodes and the client-side network nodes can communicate about collaboration events. Messages can be defined that identify events that create, modify or delete a graphical target having a location in the workspace and the time, and groups of graphical targets. The events can be classified as history events ("he" events) and as ephemeral, or volatile events ("ve" events), where history events are stored in the spatial event map, and ephemeral events are not permanently stored with the spatial event map but are distributed among other clients of the collaboration session. Messages containing collaboration system operating information can be exchanged in, for example, an application layer including history events and ephemeral events among nodes within the collaboration system. Contents of the messages are sometimes referred to as metadata. Specific examples of APIs are provided in other sections of this disclosure, where the APIs enable, for example, the use of gesture enabled workflow procedures and the customization of gestures and workflow procedures.

In the collaborative environment, it can be beneficial to see what others are working on within the environment, and to be able to see what others have created, as the creator intended their creation to viewed. The technology disclosed allows a first network node to select a viewport marker that represents a viewport including a location and dimensions as created by a second network node without any significant increase in network utilization. This can be accomplished by exchanging messages, which are configured according to the API, carrying simple text event records that can include JSON data structures or the like, rather than sending images between network nodes. The first network node receives descriptions of events from all other participating network nodes within a virtual workspace, and stores at least some of them in a local log. The first network node also creates its own events, and stores at least some of them in the local log. The first network node has a viewport into the virtual workspace that can include any number of graphical targets defined by the events. The first network node can render the objects described by the event records that have coordinates within its viewport, ignoring the event records describing events relating to graphical object located outside of its viewport.

(Visual) Graphical Object Registration: There can be set of default platform defined (visual) graphical objects represented by digital assets. First-party (native) or third-party (external or native) developers can register a custom visual object package (e.g., including graphical objects of digital assets) with a platform visual object registry. In a manifest file of the graphical object, a developer can declare a MIME handler and other launch properties. Installation of a new graphical object can be initiated by the user via market place or by IT administrator. By default and for example, a graphical object can be associated with the following functions: (i) Create (argument)—system or user action can create a graphical object; (ii) OnCreate (argument)—this function can be called when the graphical object has been created and it can allow the third-party developer to set and manipulate various parameters; (iii) Run ( )—this function can be called by the third-party developer and depending upon the parameters set, a graphical object will start running/executing; (iv) GetMetaDatao—this function can be called by the platform or other visual objects to get a current meta data, this function can return a JSON object, where the format of the JSON object can be custom defined, (v) SetMetaData( )—this function that can be called by the platform or other visual objects to set meta data and this function can be called with a JSON object; (vi) NotifyMetaData( )—this function can be called by the visual object due to user action to notify other visual objects to notify meta data and this function can be called with a JSON object; and (vii) Stop ( )—a system or user action can invoke this function to stop the visual object. This list is not conclusive and only represents a fraction of available functions.

Gestures: A gesture can be a certain touch sequence on a touch-enabled digital display (i.e., screen space) of a client-side network node or a server-side network node of the collaboration system. A gesture will occupy one or more locations of a plurality of locations on the digital display. The one or more locations on the digital display can be referred to as a position of the gesture on the digital display. The technology disclosed can translate the position (i.e., the one or more locations) of a gesture into a position on the virtual workspace. That position (i.e., the one or more locations) on the virtual workspace can be used to identify a graphical object and/or a digital asset connected to the gesture based on the position of the gesture. For example, the one or more locations of the gesture on the digital display can be mapped to a location of a graphical object on the screen space. This mapping can be done using information contained in the spatial event map (data set) regarding graphical objects and the one or more locations of the gesture with respect to the digital display and with respect to the mapped/translated location of the gesture within a virtual workspace. Based on this mapping, corresponding information associated with the graphical object that is "touched" by the gesture can be obtained and/or identified using the spatial event map (data set).

Additionally, the spatial event map (data set) or other information associated with the virtual workspace can contain information that associates the identified gesture with a particular workflow procedure. This association of the identified gesture with the particular workflow procedure can be contextual, based on, for example, the type of graphical object or objects that are "touched" by the gesture. The gesture can be applied to a single graphical object or a group of single graphical object.

As touched on above, a user's gesture (or action) can have an intent. The collaboration system can generate generates a workflow from that gesture by applying the gesture to the single graphical object in the workspace to which the gesture maps to. A gesture can be mapped to a graphical object if the gesture "touches" the graphical object in the virtual workspace and or if the gesture is close enough to a designated proximity zone of the single graphical object.

A gesture can be an annotation, a symbol or a group of symbols drawn on single graphical objects in a workspace. For example, an "arrow" gesture pointing outward from a single graphical object can invoke a workflow procedure that shares the single graphical object in various different ways. Such a gesture could also display a pop-up window to the user to allow the user to identify a target user with whom the user of the collaboration system wants to share the single graphical object.

In another implementation, a gesture can include more than one symbol or annotation. For example, consider a user that organizes several graphical objects on the display (screen space). The user can then make a "corner" gesture within the viewport using one or more fingers, hands or interactions devices (e.g., touch device such as a digital touch pen or wand). When the user performs this gesture, the workflow procedure can be performed on the entire on the entire group of graphical objects. In other words, this single gesture can invoke a function or procedure for this set of graphical objects. This function can parse all graphical objects in the group and can perform a workflow procedure for the entire group of graphical objects. Other examples of gestures can include non-touch gestures, such as detecting movement in a space using a motion sensor or imaging system, which can be associated with graphical objects in the workspace. For example, a motion sensor or imaging system can identify a particular user of the collaboration system. That identified user may have created custom gestures and workflow procedures. A graphical user interface can be provided in a screen space that accepts an input of a user-defined gesture, allows the user to define a custom workflow procedure that is associated with the user-defined gesture and allows the user to designate a custom input parameter of the custom workflow procedure.

The collaboration system can then correctly interpret gestures and workflow procedures for that particular (identified) user. Additionally, different gestures and/or workflow procedures can be interpreted and invoked based on other factors that are identified by the motion sensor or imaging system (e.g., based on multiple individual in the same vicinity, based on a particular meeting room in which the collaboration session is being held, etc.). A gesture can be interpreted by comparing an identified gesture to a library of gestures (e.g., a default gesture library and/or a customized library of gestures) and by considering context of the gesture, based on, for example, locations of the gesture within the virtual workspace/or types of graphical objects "touched" by the gesture.

Locations of graphical objects and/or gestures in the virtual workspace can be a parameter in the collaboration system that impacts the interpretation of the gesture and/or the invoking of the workflow procedure associated with the gesture. The location can imply an order and a grouping for applying the function to generate the workflow procedure. The technology disclosed can make an implicit workflow procedure (for example as evidenced by arrangement of graphical objects in the virtual workspace) an explicit actionable workflow procedure or procedures.

Additionally, a gesture could include dragging-and-dropping predefined or customized programming language in a toolbar or onto a graphical object. The technology disclosed is sophisticated enough to accept manual programming from a user to define gestures and/or workflow procedures and is simple enough that lay users can program workflow procedures or business processes visually.

Workflow Procedures: A workflow procedure is a set of tasks (or a single task) that achieve a particular objective. Examples of workflow procedures invoked by one or more gestures on one or more graphical objects in the virtual workspace can include, for example: (i) grouping two or more graphical objects (e.g., via a corner gesture that forms a box surrounding the two or more graphical objects), where a specific workflow procedure can them be applied to all of the graphical objects in the group based on a subsequent gesture (e.g., a direction of forming the box could invoke different functions and/or data in the data set regarding the graphical objects can be used to determine which workflow procedure to invoke); (ii) forming a customized viewport for a particular client-side network node or an entire group of client-side network nodes; (iii) displaying a pop-up window (another graphical object) to the user to allow the user to, for example, identify a target user with whom the user wants to share the graphical object; (iv) changing a status of a graphical object (e.g., changing status from idea/discussion to implementation, changing status regarding who is responsible for a task, changing a status from "approved" to "denied" or visa-versa, etc.); (v) approving a graphical object for a next step, (vi) denying a graphical object for a next step; (vii) assigning a graphical object to an entity, a particular user or group of users, another system and/or another graphical object or digital asset; (viii) printing a graphical object (e.g., 3D or 2D printing); (ix) emailing a graphical object; (x) sharing a graphical object with another user (e.g., force the target user to see a graphical object by changing target user's viewport to include the graphical object); (xi) storing the graphical object to a shared cloud drive, such as Dropbox™ or to a local network drive; (xii) adding additional tasks to be associated with the graphical objects; (xiii) disapproving a graphical object and copying/moving the disapproved graphical object to a particular folder/location; (xiv) classifying a digital asset as "classified" and applying appropriate protection measures (e.g., DRM protection); (xv) extracting an image from a graphical object (e.g., an electronic document) and then emailing the extracted image to an appropriate user, group of users or non-users of the collaboration system and/or saving the extracted image to a local or cloud drive (this can be done by an a digital asset and/or graphical object that is an image extractor and an image sender and saver); and (xvi) manipulating information or data stored within a digital asset represented by a graphical object (e.g., manipulating information within a spreadsheet or electronic document).

These workflow procedures allow a user to make one or more gestures that enable the user to take the graphical objects from "discussion" during a meeting to "implementation" stage in which some action is performed. Simple gestures can have a contextual meaning which can build out a workflow procedure.

Additionally, consider, for example, that a user's objective is to share a document (i.e., graphical object) in a workspace with a target user. In conventional systems, the user would have to then perform a set of tasks to achieve that objective, e.g., find the document, find a shared drive, upload the document to shared drive, send the URL of the document to the target user. The technology disclosed generates the desired workflow procedure from a simple predefined or customized gesture that "touches" a graphical object displayed in a workspace. This leverages the virtual location of the graphical object in the workspace for the purpose of defining parameters of the workflow procedure or procedures.

Workflow Procedure Customization: As discussed above, in the technology disclosed, gestures are customizable and the functions (i.e., workflow procedures) invoked from those gestures are also customizable. In one implementation, the collaboration system includes a "workflow creation" environment that proves a user interface that allows the user to design a workflow procedure or procedures as well as the gestures that invoke the workflow procedure or procedures. This user interface can simply be a "scratch pad" that allows for defining workflow procedures and gestures associated therewith. Additionally, the workflow procedure or procedures can be defined using a programming or coding environment, that is available for more sophisticated users.

During a workflow procedure creation stage, workflow procedures are implemented in software and configured for launch in response to specific gestures and contexts of gestures and graphical object in the workspace. This can use locations of selected graphical objects in the workspace to define parameters of the workflow procedures. The gestures to be used can be linked to the workflow procedures using, for example, workflow software included in the collaboration system. Also, as touched on above, more than one gesture can be utilized. For example, a user can enter multiple gestures (such as arrows connecting different objects) to the workspace on one or more graphical objects. The collaboration system includes a "preview stage" in which the user can view the workflow procedures (e.g., actions, functions, etc.) based on the gestures. The user can approve the identified workflow procedures, cancel the identified workflow procedures and edit the identified workflow procedures. Finally, in a "publish" stage, the collaboration system translates the gestures into workflow procedures and invokes the approved or edited workflow procedures. This can be accomplished by providing/displaying a user interface on a display screen that allows the user to easily approve, cancel, edit and/or approve the workflow procedures. Again, a workflow procedure can be a unique set of tasks assigned to a user.

Workflow Procedure Input Parameters: Workflow procedures utilize input parameters in order to carry out various functions. Several different types of input parameters are described in this document. Some example types of input parameters of workflow procedures include, but are not limited to: (i) relative positions of graphical objects (e.g., graphical object A is to the left of graphical object B); (ii) information regarding a graphical object that has a location at an end of a gesture (e.g., information regarding the graphical object that is "touched" by the end of the gesture); (iii) information regarding a graphical object that has a location at a beginning of a gesture (e.g., information regarding the graphical object that is "touched" by the beginning of the gesture); (iv) content of one or more of the graphical objects (the content can be part of the data set, can be from a third-party data source and/or can be from content display within or accessed by a graphical object, including native and external third-party applications; (v) location information regarding the location of a graphical object in the virtual workspace; (vi) information identifying an owner of a graphical object; (vii) information identifying a user associated with a graphical object; (viii) an identifier of a digital asset linked to an identified event; (ix) information identifying an owner of a digital asset linked to a graphical object that is "touched" by a gesture; and (x) a user associated with a digital asset linked to a graphical object that is "touched" by a gesture.

Additional descriptions of the above described virtual workspace, spatial event map (data set), viewports, digital assets, graphical objects, events, maps of events, multi-user access, widgets, third party applications, logs of events, APIs, visual graphical object registrations, gestures and workflow procedures are described below in greater detail and variations thereof will be apparent to a person of ordinary skill in the art.

DESCRIPTIONS OF THE FIGURES

An environment is illustrated by FIGS. 1A, 1B and 1C, describing a virtual workspace with graphical objects, viewports, and screen spaces. FIG. 1A illustrates a first network node (e.g., a client-side network node) 101 with a physical display space 103 that includes a screen space 105 allocated for use in the collaboration session. As illustrated, the screen space 105 can be coextensive with the physical display space 103 at the first network node, or can consist of an allocated portion, like a window, in the physical display space. The physical display space has a resolution in terms of a number of pixels and an aspect ratio set by the local network node that is independent of the workspace. The resolution in the workspace is based on the coordinate system used, and can include an essentially unbounded number of virtual points that can identify locations in the virtual workspace. In one example, the screen space 105 includes the entire displayable area of, and has the same resolution as, the physical display space 103. In another example, the screen space can be smaller than the physical display space.

In the illustrated example, the network node can include touch sensors on the screen space 105 that can perform as a user input device. The collaboration system client on the network node can access a local log file 111 that can store event records defining a spatial event map or other type of data structure representing contents of a currently used workspace. In this example, a set of graphical objects 191, and a first location marker 195 are displayed in the screen space 105. The screen space 105 provides a view of a certain area of the virtual workspace, as a viewport or a local client viewport.

FIG. 1B illustrates a virtual workspace 165, a first viewport 175, and a second viewport 177 that have locations and dimensions in the workspace. A plurality of graphical objects 191 and a first location marker 195, have locations within the first viewport 175. Graphical objects 193 have locations within the second viewport 177. A second location marker 197 has a location within the virtual workspace 165 outside the boundaries of both the first viewport 175 and the second viewport 177. Second viewport 177 can be a viewport created by the first network node 101, so as to have a certain area defined by a location and dimensions within the virtual workspace 165. The virtual workspace 165 has locations identified by coordinates relative to a reference point, such as a center point, and so the virtual workspace 165 can be unbounded. In a system of Cartesian coordinates, the center point of the virtual workspace 165 lies at coordinate (0,0). Every graphical object, which is the graphical object of an event in the collaboration session, can be defined by, or specified to have, an area within the virtual workspace, such as a rectangle having an upper left x,y coordinate and a lower right x,y coordinate. The x,y coordinates of the rectangle can be defined with respect to the center coordinate (0,0) of the virtual workspace 165.

Likewise, the first viewport 175 and the second viewport 177 can be defined by corresponding areas within the virtual workspace defined by the coordinate system chosen. Thus, in this example, the first viewport 175 might have for example an upper left coordinate of (−1000, +600) and a lower right coordinate of (+250, −150) assuming that the center of the virtual workspace 165 lies at the center of the rectangle shown. This provides an area of 1250×750 virtual pixels having a 5×3 aspect ratio.

FIG. 1C shows a second network node (e.g., a client-side network node) 151 with a physical display space 153 and a screen space 155. In the illustrated example, the second network node 151 can include touch sensors that can perform as a user input device. The second network node 151 can have access to a local log file 161 that can store event records defining a spatial event map or other type of data structure representing contents of a virtual workspace, such as the same workspace 165 currently in use at the first network node. In this example, the local client viewport of the second network node is second viewport 177, and maps to the screen space 155. As mentioned above, second viewport 177 can be created by the first network node 101 to include an area that includes graphical objects 193. In this implementation, the second network node 151 can select a viewport marker (not illustrated) that represents second viewport 177 created by the first network node 101. As a result of the second network node 151 selecting the viewport marker representing second viewport 177, and as a result of the second viewport 177 being mapped to the screen space 155, the set of graphical objects 193 is displayed in the screen space 155.

A network node can generate an event to record the creation of a graphical object such as a text box, a location marker, a viewport marker, a web page, or a viewport within a virtual workspace. The event including the creation of the viewport marker or the viewport can include the location and dimension of the viewport and one or more graphical objects within the virtual workspace, a time of the event, as well as various other attributes of the viewport and the graphical objects within the viewport. The network node can then communicate the event to other network nodes participating in the workspace. Each participating network node can store the event in its local log 111, 161. In this example, an event exists in the local log 111, 161 for each of the events creating or modifying or moving the graphical objects 191, 193, the location markers 195, 197, and the viewports 175, 177 within the virtual workspace 165. The graphical objects of the events can be rendered on the screen space 105, 155 by a processor with logic to render the graphical objects.

The processor includes logic to render graphical objects having locations in a viewport to the screen space, and to render only those graphical objects, or portions of graphical objects, that are within the boundaries of the viewport, using a zoom level that is a function of the local screen space resolution and the dimensions of the local client viewport.

A screen space can have a fixed aspect ratio, and fixed resolution in terms of pixels per line, and lines per screen. This aspect ratio and resolution can be used to compute the mapping of the viewport to the screen space. For example, a starting viewport in the workspace can include an array of 1000 points by 1000 lines. The screen space can have the same resolution of 1000 by 1000. However, if a user executes a zoom out operation, the screen space resolution remains the same, but the workspace resolution increases to, for example, 2000 points by 2000 lines. In this case, the graphical objects of the events in the larger viewport are scaled to fit within the smaller number of pixels in the screen space as a function of the zoom factor. Likewise, if the user executes a zoom in operation, the screen space resolution remains the same, but the workspace resolution decrease to, for example, 500 points by 500 lines. In this case, the graphical objects of the events in the smaller viewport are scaled to fit within the larger number of pixels in the screen space. A viewport can be specified by a location in the workspace, an aspect ratio of the client screen space, and a zoom level, or ratio of resolution of the viewport compared to that of the screen space.

This allows various devices such as mobile devices, computers, and walls to display respective viewports at a common zoom level and at aspect ratios that match the respective screen spaces. The technology disclosed allows clients to specify viewports independently, so that two viewports may overlap. In one example, a first user modifies a viewport so that it includes an area already included in the viewport of a second user. In this example, the viewports are independent of each other, and one viewport can be modified without affecting the other. In another example, a first user selects a viewport (by way of selecting a viewport marker) created by a second user, whereby the local viewport of the first user is set to match the selected viewport and the viewport attributes and/or specifications created by the second user. In this case, even if the screen space of the first user has a different aspect ratio and resolution than the second user, the screen space of the first user will still display the same graphical objects so as to essentially replicate the viewport as intended by the second user. This matching is performed by adjusting dimensions and aspect ratios of the graphical objects and/or the entire viewport, as created by the second user, so that the first user views all of the graphical objects of the viewport as intended by the second user.

Figure 3:
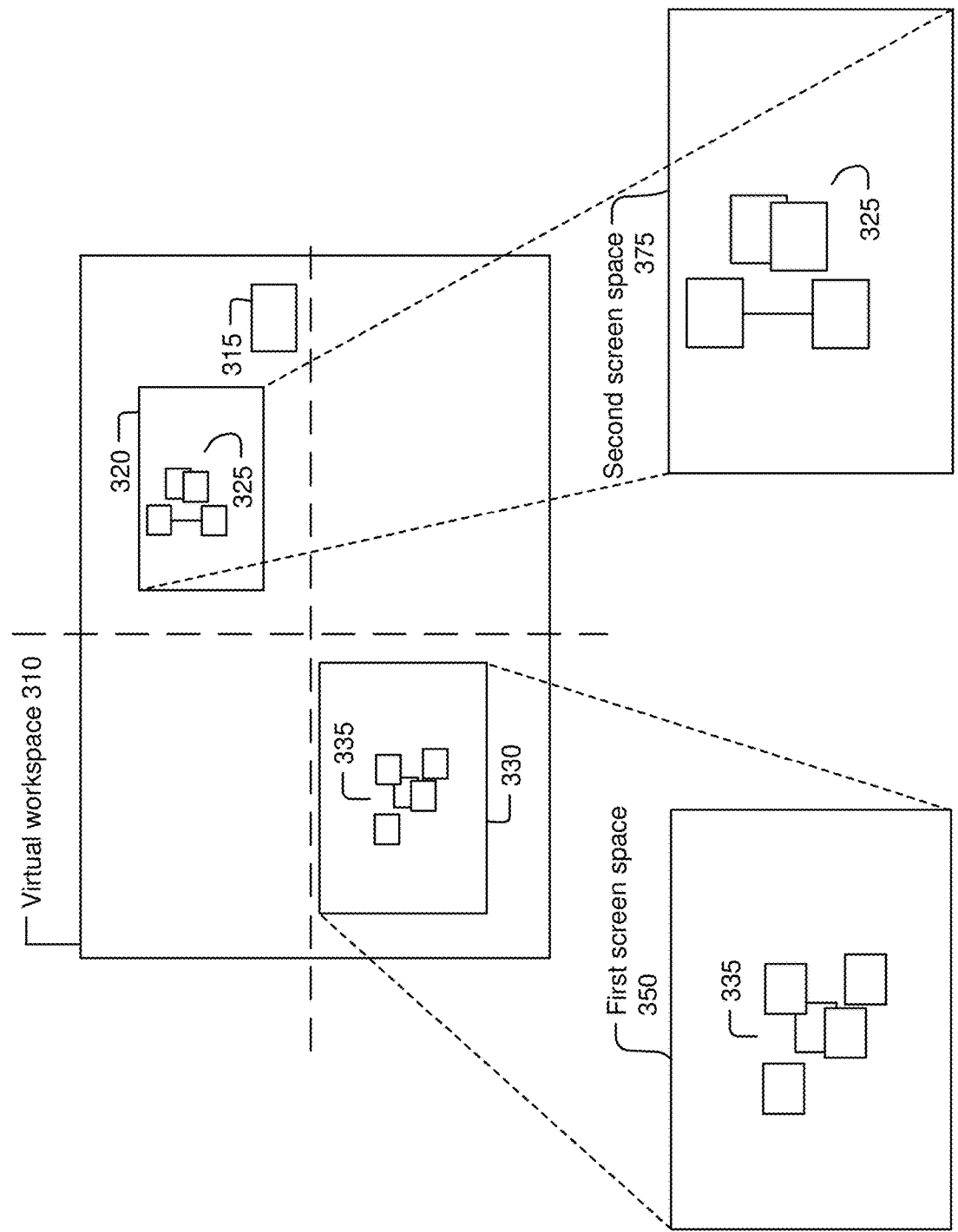
FIG. 3 illustrates how a viewport of one network node can be changed without affecting the viewports of other network nodes.
Figure 4:
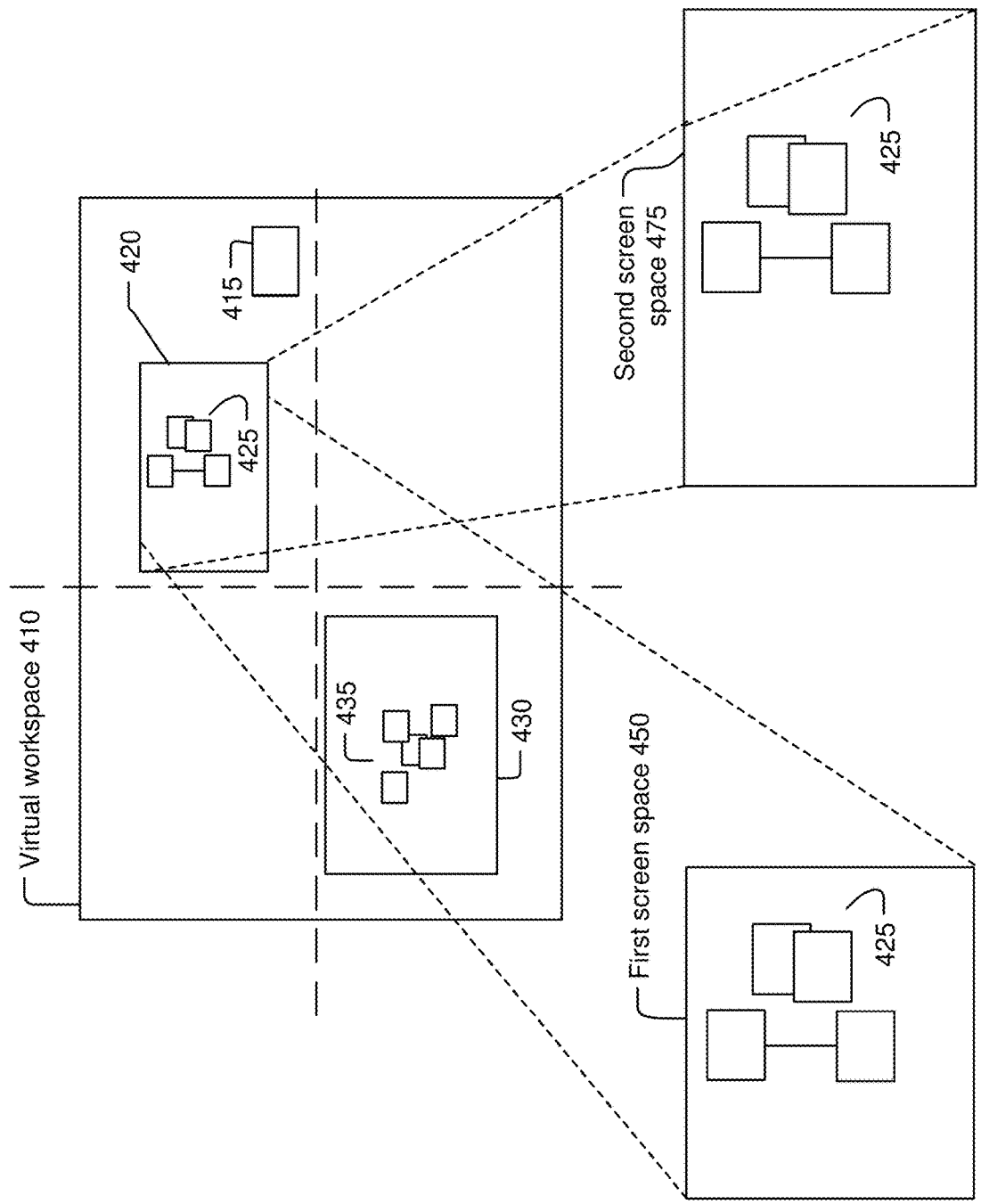
FIG. 4 illustrates a first network node selecting a viewport created by a second network node.

FIGS. 2, 3, and 4 illustrate a high-level process of a first network node selecting a viewport created at a second network node.

FIG. 2 illustrates one implementation of two network nodes having viewports in distinct areas of a virtual workspace. FIG. 2 illustrates a virtual workspace 210 comprising a first viewport 230 and a second viewport 220. A set of graphical objects 235 having locations in the first viewport 230, and a set of graphical objects 225 and a particular graphical object 215 having locations within the second viewport 220 are shown. FIG. 2 also illustrates schematically a first screen space 250 at a first network node and a second screen space 275 at a second network node. In this illustration, the first viewport 230 containing the set of graphical objects 235 is mapped to the first screen space 250, and the set of graphical objects 235 are rendered on it. The first viewport 230 can be referred to as the initial local client viewport of the first network node. The second screen space 275 has the graphical objects (225 and 215) in second viewport 220 rendered on it. Each viewport contains a different set of graphical objects. In another example, some or all of the graphical objects can exist outside of the viewports.

FIG. 3 illustrates how a viewport of one network node can be changed without affecting the viewports of other network nodes. FIG. 3 illustrates how a second network node changes the dimensions in the workspace of second viewport 320 without affecting the first viewport 330 of a first network node. In this example, FIG. 3 is based on FIG. 2. FIG. 3 illustrates a virtual workspace 310 comprising a first viewport 330 and a second viewport 320. The first viewport 330 envelops a set of graphical objects 335. The second viewport envelops a set of graphical objects 325. A graphical object 315 exists within the virtual workspace 310 outside of the area enveloped by the first viewport 330 or the second viewport 320. FIG. 3 also illustrates a first screen space 350 and a second screen space 375. The first screen space 350 has the first viewport 330 containing the set of graphical objects 335 rendered on it. The second screen space 375 has the second viewport 320 containing the set of graphical objects 325 rendered on it. The graphical object 315 within the virtual workspace 310 exists outside of either of the viewports 330, 320, and is not rendered on either the first screen space 350 or the second screen space 375.

A difference between FIG. 2 and FIG. 3 is that a size of the second viewport 320 has been changed in FIG. 3 to exclude the graphical object 315. The size of the viewport can be changed by changing the zoom level of the viewport by using, for example, a variety of input devices and gestures, including, for example, a zoom wheel on a mouse, or combinations of keys pressed on a keyboard. A viewport can also be changed by a touch screen or mouse gesture that includes "grabbing" a location on the screen space with a mouse or other pointer, and then moving the mouse. In this implementation illustrated in FIG. 3, the first node can essentially save the second viewport 320 and create a viewport marker that represents the second viewport 320. In other examples, the size of the second viewport 320 could remain the same but the location of the second viewport 320 could change, such that the graphical object 315 is not included (e.g., the second viewport 320 could move to the left but remain the same size, and the graphical object 315 would no longer be located in the second viewport 320). The second viewport 320 can be moved in a similar manner as described above regarding the zooming. The viewport marker is not illustrated in FIG. 3, but is illustrated in FIG. 7A.

A display is a device comprised of an array of pixels. Complex displays, such as walls, comprise multiple displays in a rectangular array, and have consecutive pixels in the X and Y coordinates managed by a controller. In one implementation, a display can have multiple windows, each window comprising a separate screen space.

For example, a workspace can have a set of objects laid out between coordinates x0=−10000, y0=4500 and x1=5200, y1=−1400, in abstract units. If a client wants to see that set of objects, then it defines a viewport with those coordinates, and then renders that viewport within its screen space, mapping the abstract units of the workspace to the physical units of displayable pixels. If the client wants to see more of the workspace, they can zoom out so that more distributed x0, y0, x1, y1 coordinates of the viewport map are viewable on the available space in the screen space. If they want to see a smaller area of the workspace, they zoom in to whatever x0', y0', x1', y1' coordinates they want, and those coordinates are mapped to the screen space of the client. In other words, the dimensions of the viewport are changed by changing the zoom level of the viewport, which allows more or less of the workspace to be viewed within the screen space. In rendering the viewport to the screen space, scaling of the contents of the viewport can be accomplished through standard graphical scaling techniques.

FIG. 4 illustrates what happens when a first network node selects the viewport created by a second network node. As discussed in further detail below, the viewport is selected by the first network node when the first network node selects a viewport marker from a menu that represents the viewport created by the second network node. FIG. 4 illustrates a virtual workspace 410 comprising a first viewport 430, and a second viewport 420. FIG. 4 also illustrates a first screen space 450 and a second screen space 475. A graphical object 415 exists within the virtual workspace 410 and outside of the area enveloped by the first viewport 430 or the second viewport 420. The graphical object 415 within the virtual workspace 410 exists outside of either of the viewports 430, 420, and is not rendered on either the first screen space 450 or the second screen space 475.

The first viewport 430 specifies an area in the virtual workspace 410 that envelops a set of graphical objects 435. In this implementation, the first viewport 430 is not mapped on screen spaces 450 and 475, and corresponds, for example, to another local client viewport. The second viewport 420 specifies an area in the virtual workspace 410 that envelops a set of graphical objects 425. The second viewport 420 has been created by the second network node and has been associated with a viewport marker (not illustrated). When the first network node selects, from a menu, the viewport marker representing the second viewport 420, the second viewport 420 is mapped to first screen space 450 by the local client that operates first screen space 450. Even though the physical display of the first network node is a different size and/or aspect ratio than the physical display of the second network node, the first screen space 450 of the first network node will display all of the graphical objects 425 of the second viewport 420, as intended by the second network node, which created the second viewport 420 to include all of the graphical objects 425.

As mentioned above, even though the first screen space 450 has a first aspect ratio and size and the second screen space 475, on which the second viewport 420 was created, has a second aspect ratio and size (width or height or both width and height) that is different from the first aspect ratio and size (width or height or both width and height), the first screen space 450 still displays all of the graphical objects 425 on the screen at the same time. This is possible because dimensions of the second viewport 420 and the graphical objects 425 are adjusted and rendered so that they are properly displayed in the first screen space 450. This can be achieved by proportionally scaling the one or more graphical objects 425 so that they all are rendered and displayed on the first screen space 450. Alternatively, this can be achieved by rearranging one or more of the graphical objects 425 with or without the scaling.

Gestures and Workflow Procedures

Before discussing gesture creation, gesture interpretation and invocation of corresponding workflow procedures with respect to FIGS. 5-17, the framework of the technology disclosed is provided. As described above, a Visual Object Window (VOW) is a graphical object that can be implemented as a container/iframe by a client-side node and/or a server-side node of the collaboration system. The container/iframe can load a specific URL containing a custom third-party external web application. Additionally, a native third-party application can be loaded/implemented using the container/iframe as the graphical object representing the native third-party application. The native third-party application can be integrated using a Web Assembly (WASM). Communication between the container/iframe and the client-side network node and/or the server-side network node can be managed using various techniques, such as a Window.postMessage API. This allows for fast development time and high decoupling. Other techniques will be apparent to a person of ordinary skill in the art.

The technology disclosed can, if configured accordingly, only allow a trusted partner to create and publish VOWs, where the trusted partner hosts the third-party external web application code on their own external servers. Additionally, the technology disclosed can, if configured accordingly, allow broader access to the collaboration system and allow a VOW third-party application to run natively if the third-party submits it code in an unminified form (or other authorized form) as part of the submission process to a marketplace managed or accessed by the collaboration system.

In an implementation, the technology disclosed can support automated and manual code review to each version of an external third-party application to ensure that, for example, the third-party application is not malicious and that it will function properly natively in the collaboration system. Then, for example. The third-party application can be hosted from servers of the collaboration system using, for example, a minified form of vetted code of the third-party application.

In addition to the "vetting" process described above, third-party applications can be required to be enabled individually by organization administrators of the collaboration system before the third-party applications can be instantiated in specific workspaces for that organization. The technology disclosed can also allow user to add third-party applications if, for example, an administrator for the organization has granted such authority to allow users to add applications on their own. This feature could be turned off by default, or visa-versa.

Some third-party applications can be more "heavyweight" applications that others, meaning that they will be required more processing power, memory, local or eternal data, etc. As third-party applications become more "heavyweight," the containers/iframes can be required to support both active and inactive states of the corresponding third-party applications.

For example, an active state can be the actual iframe and an inactive state can be represented by a static image without the third-party application actually being loaded into the iframe (or the virtual workspace). In an implementation, such as generation of a preview of the third-party application, an instance of the iframe may run on backend servers of the collaboration system inside a dummy client so as to execute code in from the third-party application while a client-side network node has the third-party application in an inactive state.

Specific geometry (e.g., location, size, interactions) of the third-party application can be managed by the client-side network node. This architecture can require a set of external handles outside the iframe, if events cannot be suitably and reliably stolen from on top. For example, when a user selects or interacts with a third-party application, the collaboration system can detect location and the location can be mapped/provided to other clients on the collaboration system; but the location is not an absolute coordinate in terms of a pixel on a screen, but rather location is a relative location based on, for example, a top left corner of the iframe/container/programmable window, which allows for different clients to have different locations, zoom levels, etc. in a collaboration session, so as to allow translation of relative coordinates across distributed clients). The visualization implemented by the client-side network node can also include affordances for preview and activation/deactivation of the third-party application.

In an implementation, activation and deactivation of the iframe (i.e., third-party applications) can be controlled by the user of the client-side network node, with no limits on the number of active third-party applications per type. Additionally, if desired, a restriction on the number of active third-party applications per type or just in general can be implemented.

VOWs (third-party applications and or their respective containers/iframes) can be exposed on a developer portal of the collaboration system as a new third-party application type. In other words, the third-party applications can be required to be registered by the collaboration system. For each type of VOW one wishes to add to the collaboration system, one can be required to provide, for example (i) a user friendly name for the VOW type (manually described or selected from a menu or a series of menus), (ii) a URL of the third-party application (e.g., external web application to load in the iframe), (iii) a default thumbnail for a toolbar that can be displayed while a user is using the collaboration system, (iv) a default preview image for an inactive state of the third-party application, and (v) an indication as to whether the third-party application is a screen-space or workspace object.

Screen-space objects do not store history events, though they have one shared state object per workspace for coordination and setup, and scree-space objects can see all messages from all instances of the same type in the workspace, which makes screen-space objects suitable for floating windows that enhance the workspace but are not part of it (like a video call). Workspace objects store history events and have separate state objects per instance, such that they can only see messages meant for their instance inside a workspace, though one can still use a supporting service to perform additional coordination between all objects of a type in a workspace if desired, making workspace objects suitable for individual content items that are part of the workspace, like a document. Each third-party application, in registration sense, can be identified and registered as a screen-space object, a workspace object, or a non-visual object (e.g., a third-party application such as Slack™ that do not integrate into the workspace with visual objects). However, any developer can create a set of multiple third-party applications of multiple types which share information and user access tokens to achieve complex implementation.

After registration of a third-party application, the developer and/or user can receive a particular user id and an application token and secret. The application token and secret can be embedded in the third-party application for automatic user access/grant in the collaboration system. Additionally, users interacting with the third-party application that is in an active mode can automatically authorize the third-party application in the container/iframe to invoke the standard APIs of the collaboration system on behalf of that user. Furthermore, an application developer, from the developer portal, can indicate that a new version of a particular third-party application is available, which may, for example, force a reload of the third-party application from a same URL in all active client-side network nodes, in order to ensure that there is a consistent version in use across the board.

Each third-party application and container/iframe (VOW) can have its own object state. Specifically, each VOW type in a workspace can have an object state associated therewith. If the VOW is a workspace object, then every instance of the VOW in the workspace will have a state encapsulated in its HE. If the VOW is not a workspace object, then there can be is one object state shared by all instances of that VOW type in the workspace (generated when the first VOW of that type is created and then permanently stored). Changes to this state will be propagated using VE events and can be queried from the spatial event map or another data set for an initial state (similar to history). Events can also be sent across a websocket, and the type of the VOW will be represented using the user identification generated at the time of registration.

An example Graphical Object State Schema (Common) can be implemented as follows:

```
{
  "type": "object",
  "properties": {
    typeId: {
      "type": "string" //The VOW uid for reference
    },
    resizable: {
      "enum": [
        "NoResize",
        "StretchResize",
        "KeepAspectRatioResize",
      ]
    },
    allowSnapshot: {
      "type": "boolean",
      "default": "false",
    },
    customData: {
      "type": "object" //Anything from the app that should persist
    },
  },
}
```

In view of the API example provided above, note that x-coordinates, y-coordinates, w-coordinates, h-coordinates and z-coordinates for screen-space objects can be handled entirely by a client-side network node. The third-party application can be queried for defaults before creation of a screen-space object, then the user will be able to move the third-party application (in all cases) and resize the third-party application as allowed by the resizable policy. Further, the third-party application can query its current x-coordinates, y-coordinates, w-coordinates, h-coordinates and z-coordinates through messages, but those messages may not be part of the shared state of the third-party application because screen-space objects do not share position information, which is one of the distinctions between screen-space objects and workspace objects.

Moreover, workspace object instance state can also have the properties described above, in addition to the ones specified below. Workspace objects have a shared state per instance, as the instances are reflected across clients, and screen-space objects have a shared state per workspace, as the state of individual instances are not reflected between clients.

An example Graphical Object Schema can be implemented as follows:

```
{ //All properties from above, plus
  "type": "object",
  "properties": {
    objectId: {
      "type": "string" //object user identification for use in APIs
    },
    x: {
      "type": "integer"
    },
    y: {
      "type": "integer"
    },
    z: {
      "type": "integer"
    },
    scale: { //can also support full transforms
      "type": "number",
      "minimum": 0.5,
      "maximum": 4.0,
    },
    opacity: {
      "type": "number",
      "minimum": 0.1, //not completely invisible to avoid hidden objects
      "maximum": 1.0,
      "default": 1.0,
    },
    isPinned: {
      "type": "boolean"
    },
    width: {
      "type": "integer",
      "minimum": 8,
      "maximum": 65535, //avoid 0x0 objects
    },
    height: {
      "type": "integer",
      "minimum": 8,
      "maximum": 65535,
    },
    allowDuplicate: {
      "type": "boolean",
      "default": "false",
    },
  },
}
```

Example Message Protocol: A client-side network node can communicate with the third-party application (VOW) instance with messages that take the form of JSON arrays. This schema can be similar to the websocket protocol in use by the client-side network nodes already.

These "messages" can be wrapped into a library/SDK, then "messages" will be reclassified as "methods" but will be substantively the same. Additionally, the implementation will prevent external developers from being directly exposed to the message protocol.

An example Protocol Schema can be implemented as follows:

```
{
  "type": "array",
  "minItems": 5,
  "maxItems": 5,
  "items": [
    {
      "type": "string",
      "enum": [ // Message type. Some examples:
        "he",
        "ve",
        "activate",
        "deactivate",
        "??"
      ]
    },
    {
      "type": "object" //Message Parameters
    },
    {
      "type": "object" //Payload object
    }
  ],
  "additionalItems": false
}
```

For HE and VE messages, the message payload can be passed directly in as the payload object when the third-party application (VOW) needs to be informed of a workspace event.

Further, messages starting with "request" can have a corresponding message sent by the other side as a reply.

Base window messages can be sent to a third-party application (VOW) (while active) as follows. "activate" can be sent to a third-party application instance as soon as the third-party application becomes active. This can be at the same time as an initial execution of a script initial execution. As a payload object, the "activate" message can contain a current state of the instance (for screen-space objects, this can be the shared type state object plus the current geometry for the instance). Further, for example, any "ve" message targeting the user identification of the third-party application type (i.e., VOW type) (or object id of the third-party application instance, for workspace objects) can be forwarded to any active instances inside the client-side network node. In a case of position VEs, the client-side network node will have already done all the moving and geometry management and this is just informational.

Additionally, "geometry", can be sent to a third-party application (VOW) instance when geometry of the third-part application changes or upon request. It may not be necessary to send such a message for screen-space objects if the iframe can reliably get this information another way.

Moreover, "deactivate", can be sent to a third-party application (VOW) instance as soon as the third-party application is deactivated. After this message the event loop can will run once more (allowing the message handler to execute but no more timers) and then the container/iframe can be cleaned up.

Base window messages can be sent to a third-party application (VOW) (while inactive) as follows. A backend can load an instance of the third-party application in a headless environment to send, for example, the following messages. Responses to requests may be cached and re-used across multiple client-side network nodes (if the request parameters are identical). A cache can be is invalidated when the application developer indicates that a new version is available.

Additionally, "requestPreview" can be sent with the type/instance state object as the payload object. This can return an image or null (in which case the default preview will continue to be displayed, as it was before this finished rendering).

Furthermore, "requestDefaults" can be sent with the type/instance state object (minus the object id if present) as the payload object. This can return a default populated type/instance state object, including width and height, to pre-populate the state object for a new instance.

Messages can also be sent from a third-party application (VOW). For example, a "requestUserAccessToken" can be sent with a "appAccessToken" parameter, in order to allow an exchange of an access token for the third-party application (not tied to a user) for an access token from the current user of the workspace (facilitated by the client) for use by the third-party application with standard APIs used by the collaboration system. This technique can bypass the typical OAuth access window, as the organization administrator has already authorized the scope and the functionality is being used by the user in that workspace.

A "requestStateObject" message can be sent and will return a shared type state object. While once could keep track of this information from he "activate" and "ve" messages, this is another way to obtain the same information.

Moreover, "requestGeometry" can be sent, which is the same as that discussed above. Furthermore, a third-party application can send a "ve" event message associated with its type/instance to the client which will be propagated to all other client-side network nodes in the same workspace (but it is not stored in the workspace history).

Also, a "requestDeactivation" can be sent if the third-party application wishes to be deactivated to reduce resource consumption. The third-party application can send this message on its own. However, a third-party application can only be activated, according to an implementation, by a user input Workspace window messages can also be used in addition to the above-described messages. For example, a third-party application that is present in workspace objects can also support the following messages. Specifically, for example, a "he" message targeting the object id of the third-party application (VOW) instance can be forwarded from the client-side network node to the third-party application and the third-party application may send "he" messages to the client-side network node in order to set a new state in the history (this can be propagated to other client-side network nodes as well).

FIG. 5A illustrates an example gesture and workflow procedure that results in emailing a graphical object or information associated therewith to a specific user. FIG. 5B illustrates an example gesture and workflow that results graphical objects being logically related to one another and parallel groups of sequential tasks requesting status. FIG. 5C illustrates some example gestures that can have default and or user-defined workflow procedures associated therewith.

Referring to FIG. 5A, a screen space 550 is illustrated. The screen space 550 can be from the virtual workspace 410 of FIG. 4 as viewed through the second viewport 420 of FIG. 4. The screen space 550, which as described above is what is displayed on a physical display of, for example, a client-side network node. The screen space includes a first graphical object 552 and a second graphical object 554.

As described above, the first graphical object 552 can represent a digital asset in a screen space (i.e., screen space 550) of a display of the client-side network node. This first graphical object 552 can be generated by (i) mapping the screen space 550 to the second viewport 420 in the virtual workspace 410, (ii) identifying an event having a location in the viewport 410, where the identified event is linked, by the spatial event map, to the digital asset represented by the first graphical object 552 and (iii) placing the first graphical object 552, which represent the digital asset that is linked to the identified event, on the screen space 550 according to a location of the first graphical object 552 in the virtual workspace 410, as identified by the spatial event map. The second graphical object 554 can be illustrated in the same manner as the first graphical object 552. The first graphical object 552 and the second graphical object 554 have corresponding information stored in the spatial event map that dictates which actions can be taken therewith (e.g., editing, moving, resizing, etc.).

As also described above, the first graphical object 552 can represent a digital asset which is an electronic document, an image or any other type of electronic information. The second graphical object 554, in this example, is an email application. This email application can be a local application of the collaboration system, an external third-party application or a native third-party application. The email application can be configured (or pre-configured) to email a graphical object to a specific user or group of users or it can be configured to allow the user of the client-side network node to select which users of the collaboration system should be a recipient of an email.

The user of the client-side network node can draw a gesture 556 that starts on the first graphical object 552 to the second graphical object 554. In this example, the gesture

556 is just a straight line. This gesture 556 can be detected by the client-side network node or can be detected via communications with the server-side network node. As illustrated, the detected gesture 556 contacts a plurality of locations on the screen space 550. A straight line from one graphical object to another graphical object can be interpreted to send the first graphical object 552 to the second graphical object 554 to invoke whatever functions and/or operations can be performed by the second graphical object 554. In this case, the functions and/or operations are to send/email the first graphical object 552 to a particular user or groups of users or to another specified user.

Furthermore, an identification of a workflow procedure can be obtained in dependence upon an interpretation of the gesture 556. The client-side network node and/or the server-side network node can interpret the meaning of the gesture 556 using, for example, the spatial event map. The client-side network node and/or the server-side network node can also identify (or obtain an identification of) the workflow procedure in dependence upon the interpretation of the gesture. The identified workflow procedure can have an input parameter that, at least in part, influences the invocation of the workflow procedure.

In order to determine how the workflow procedure is performed, the client-side network node and/or the server-side network node maps locations (included in the plurality of locations contacted by the gesture, to the location of the first graphical object 552 and/or the second graphical object 554 on the screen space 550, in order to, from the spatial event map, identify (or obtain an identification of) corresponding information associated with the first graphical object 552 and/or the second graphical object 554.

An identification of input parameter of the identified workflow procedure can be obtained in dependence upon the identified corresponding information associated with the first graphical object 552 and/or the second graphical object 554. Once the input parameter of the identified workflow procedure is identified, the identified workflow procedure can be invoked according to the identified input parameter. For example, a workflow procedure can invoke display of a new graphical object in the screen space that requests a user to identify a target user to which the digital asset is the be shared, can change a status of the digital asset, can assign a status of the digital asset and can approve the digital asset.

In this specific example illustrated in FIG. 5A, the locations of the gesture 556 are mapped to both the first graphical object 552 and the second graphical object 554. Because, in this example, the first graphical object 552 is an electronic document and the second graphical object 554 is an email application and because the gesture 556 starts on (e.g., "touches") the first graphical object 552 and moves in the direction of and "touches" the second graphical object 554, the first graphical object 552 is emailed using the second graphical object 554 and/or using a digital asset represented by the second graphical object 554.

Here, the user of the client-side node could have previously designated a certain user or group of users as recipients of an email transmission. Alternatively, the invoked workflow procedure may provide the user of the client-side network node the ability to designate a user or group of users as recipients of the email prior to the email being sent. The specific information necessary to carry out these workflow procedures is stored in the spatial event map and/or in other sets of data accessible by the collaboration system.

FIG. 5B illustrates an example gesture and workflow that results graphical objects being logically related to one another and parallel groups of sequential tasks requesting status. Redundant descriptions of the generation of graphical objects, detecting of gestures, identification of workflow procedures in dependence upon the interpretations of the gestures, the mapping of locations to identify corresponding information, the obtaining of an identification of the input parameter of the identified workflow procedures and the invoking of the identified workflow procedures will not be unnecessarily repeated for FIG. 5B or any further Figures which describe gesture based workflow procedures. Each of these features is adequately described with respect to FIG. 5A as well as in other portions of this document.

Just as in FIG. 5A, FIG. 5B illustrates a screen space that includes several gestures and graphical objects. Specifically, FIG. 5B illustrates that (i) a first graphical object 560 and a second graphical object 562 are connected by a first gesture 564, (ii) a third graphical object 566 and a fourth graphical object 568 are connected by a second gesture 570, (iii) a fifth graphical object 572 and a sixth graphical object 574 are connected by a third gesture 576 and (iv) a seventh graphical object 578 and an eighth graphical object 580 are connected by a fourth gesture 582.

These various graphical objects can be any type of graphical object described within this document and the various gestures can be any type of gesture described within this document. In this specific example the first gesture 564 groups the first graphical object 560 to the second graphical object 562, and so on for the remainder of the gestures and graphical objects illustrated in FIG. 5B. Based on types of graphical objects (e.g., the first graphical object 560 could be an electronic document and the second graphical object 562 could be an image), the first gesture 564 could indicate that the image of the second graphical object 562 is related to electronic document of the first graphical object 560. The same for the remaining graphical object and gestures illustrated in FIG. 5B.

These gestures can group the graphical objects together to indicate that they are logically related, so that parallel groups of workflow procedures and be performed, such as incorporating the various images in to the various electronic documents according to the relationships created by the various gestures.

Additionally, a fifth gesture 584 can be drawn the user. Here, the fifth gesture 584 is a question mark requesting the status of each of the groups formed by the first gesture 564, the second gesture 570, the third gesture 576 and the fourth gesture 582. The "status" can be any type of status relating to the workflow procedures related to the other gestures, or it could be more specific information that is available and associated with the various graphical objects illustrated in FIG. 5B.

FIG. 5C illustrates some example gestures that can have default and or user-defined workflow procedures associated therewith. This is not a conclusive example set of gesture. Specifically FIG. 5C illustrates an "X" gesture 586, an arch gesture 588, a multiple line gesture 590 and checkmark gesture 592 and a checkmark "X" gesture 594 within the screen space 550. Each of these gestures can have a default meaning (interpretation) and can have a customized meaning (interpretation). Further, each of the gestures can have contextual meanings. For example, gestures can have different meaning based on (i) their virtual workspace, (ii) their viewport (e.g., a customized or predefined viewport) and (iii) which graphical object or objects they are "touching." Additional types of gestures are described throughout this document. Furthermore, other types of gestures will be apparent to a person of ordinary skill in the art.

Figure 6:
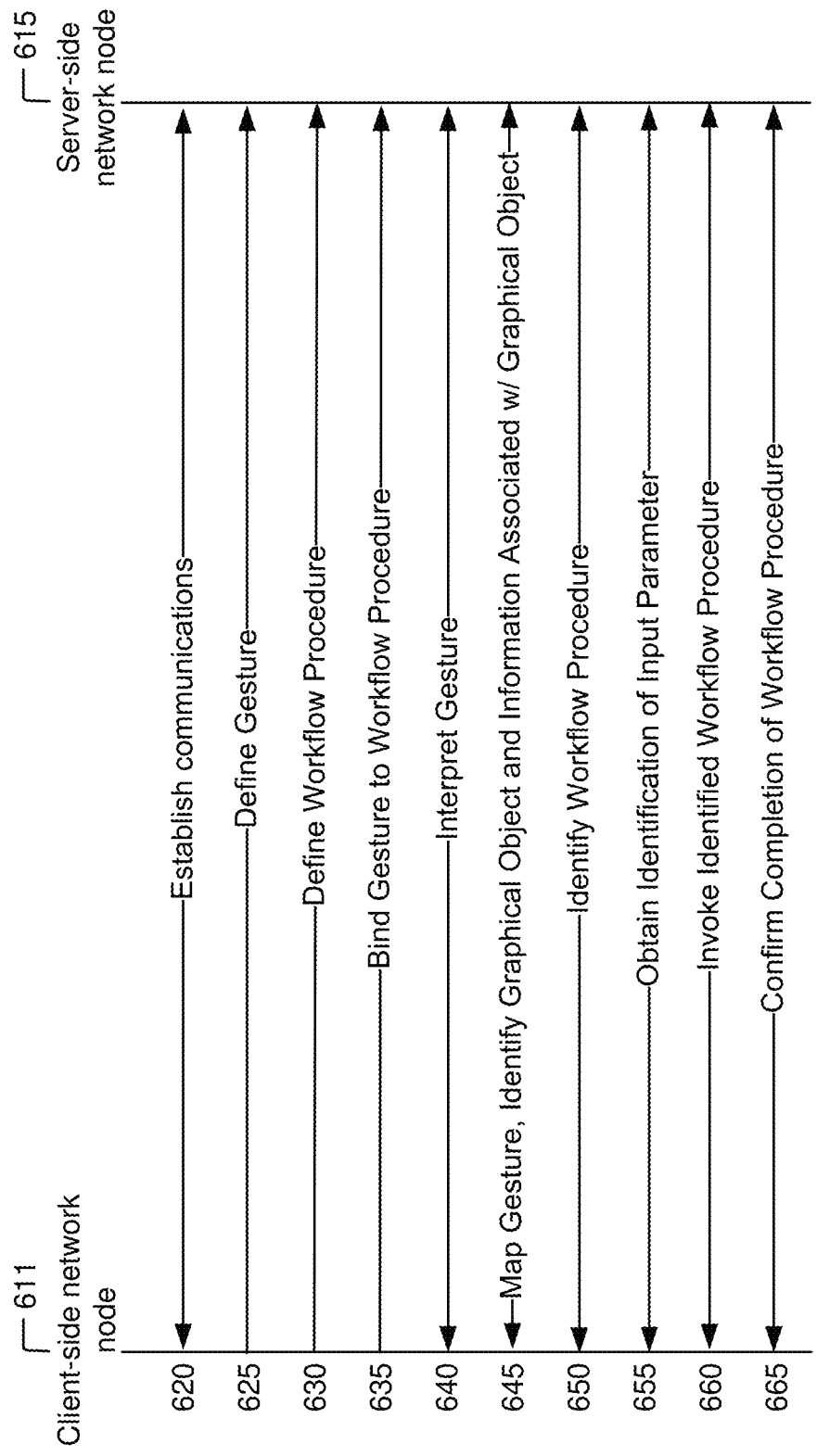
FIG. 6 illustrates a message map between a client-side network node and a server-side network node.

FIG. 6 illustrates a message map that occurs during the gesture and workflow procedure process discussed above with respect to FIG. 5.

Initially, in this implementation, a client-side network node 611 and a server-side network node 615 are participating in a collaborative workspace session. The client-side network node 611 can create events that are shared with other network nodes through the spatial event map on the server-side network node 615. The client-side network node 611 can also receive events from other client-side network nodes through the server-side network node 615. The transmission of events occurs through establishing of communications 620 between the client-side network node 611 and the server-side network node 615, as well as between the server-side network node 615 and any other client-side network nodes that are participating in the collaborative workspace. The server-side network node 615 distributes the events to other participating network nodes in this example.

In this example, the client-side network node 611 joins the collaborative workspace by establishing communications with the server-side network node 615. The server-side network node sends the collaboration data, including, but not limited to, a user list, viewport change records of the network nodes, and a spatial event map identifying viewports and viewport markers representing the viewports and also identifying any or all of the information described above with respect to gestures and workflow procedures, to the client-side network node 611. The client-side network node then stores the collaboration data to a local log. The client-side network node 611 sets an initial (local client) viewport then discovers the event records of graphical objects within the local log that intersect its initial viewport. The graphical objects that intersect the viewport are then rendered on the screen space.

The client-side network node 611 and other client-side network nodes can both create, transmit, and receive events within the workspace, and can view events that have occurred within their viewports. Events can be communicated to all participating network nodes through the server-side network node 615.

The technology disclosed allows a user of the client-side network node 611 to define a gesture 625 using any of the methods described herein. Information regarding the defined gesture can remain local to the client-side network node 611 and can be transmitted back to the server-side network node 615, as well as to all other participating network nodes through the server-side network node 615. Information regarding the defined gesture can be retained in the spatial event map or other data set.

The technology disclosed also allows the user of the client-side network node 611 to define a specific workflow procedure using any of the methods described therein. Information regarding the defined workflow procedure can remain local to the client-side network node 611 and can be transmitted back to the server-side network node 615, as well as to all other participating network nodes through the server-side network node 615. Information regarding the defined workflow procedure can be retained in the spatial event map or other data set.

The user of the client-side network node 611 can bind a defined gesture to a defined workflow procedure 635, so that the appropriate workflow procedure can be invoked when a particular gesture is received. Information regarding the binding of the gesture to the workflow procedure can be retained in the spatial event map or other data set.

Additionally, once a user makes a gesture on the client-side network node 611, the gesture can be detected and interpreted by either the client-side network node 611, the server-side network node 615 or a combination thereof. Specifically, this includes detecting a gesture contacting a plurality of locations on the screen space.

Furthermore, the gesture is mapped, a graphical object is identified and information associated with the graphical object is identified 645. This can include mapping locations, included in the plurality of locations contacted by the gesture, to the location of the graphical object on the screen space, to obtain, from the data set, an identification of corresponding information associated with the graphical object. This can be performed by either the client-side network node 611, the server-side network node 615 or a combination thereof.

Next a workflow procedure is identified 650. This can be accomplished by obtaining an identification of a workflow procedure in dependence upon an interpretation of the gesture, the workflow procedure having an input parameter. Again, this can be accomplished by either the client-side network node 611, the server-side network node 615 or a combination thereof.

Furthermore, an identification of the input parameter of the identified workflow procedure is obtained in dependence upon the identified corresponding information 655. This can be performed by either the client-side network node 611, the server-side network node 615 or a combination thereof.

Next, the identified workflow procedure can be invoked according to the identified input parameter 660.

Moreover, completion of the workflow procedure can be confirmed. by either the client-side network node 611, the server-side network node 615 or a combination thereof. Additionally, specific workflow procedure types can be created as well as gesture types.

Figure 7:
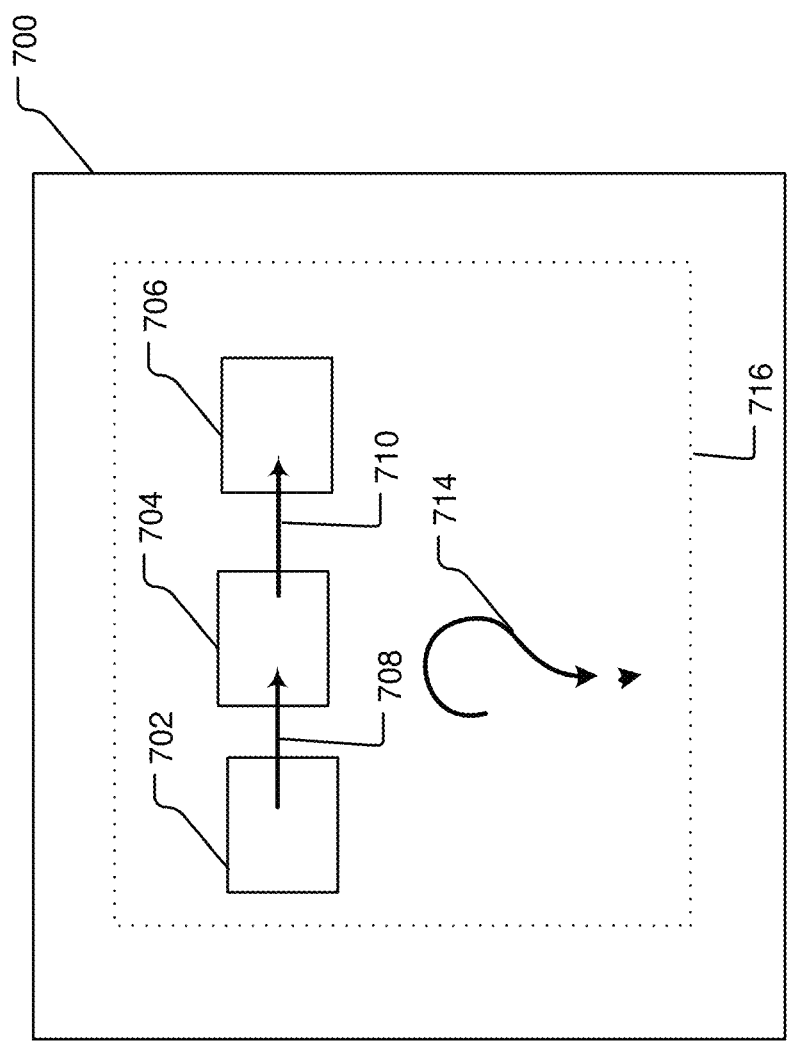
FIG. 7 illustrates an example gesture according to which three graphical objects in a workspace that are grouped together and a workflow procedure is invoked for each of the three graphical objects.

FIG. 7 illustrates three graphical objects in a workspace that are grouped together and a workflow procedure is invoked for each of the three graphical objects.

Redundant descriptions of the generation of graphical objects, detecting of gestures, identification of workflow procedures in dependence upon the interpretations of the gestures, the mapping of locations to identify corresponding information, the obtaining of an identification of the input parameter of the identified workflow procedures and the invoking of the identified workflow procedures will not be unnecessarily repeated for FIG. 7. Each of these features is adequately described with respect to FIG. 5A as well as in other portions of this document.

Specifically, FIG. 7 illustrates a virtual workspace 700 that includes a first graphical object 702, a second graphical object 704 and a third graphical object 706. A left-to-right straight-line gesture 708 is drawn between the first graphical object 702 and the second graphical object 704 in order to group the first graphical object 702 and the second graphical object 704. Further, a left-to-right straight-line gesture 710 is drawn between the second graphical object 704 and the third graphical object 706 in order to group the third graphical object 706 with the first graphical object 702 and the second graphical object 704. The workflow procedure invoked by gestures 708 and 710 is grouping of the graphical objects. As previously explained, the function performed by the workflow procedure associated with gestures 708 and 710 can be contextual based on the type of graphical objects and can be customized.

Once the three graphical objects 702, 704, 706 are grouped together, a user draws a question mark gesture 714. This invokes a workflow procedure that identifies various owners of the graphical objects 702, 704 and 706, generates request messages (e.g., an email) and sends the generated request messages to the various owners requesting the owners to provide a status of, for example, electronic documents represented by the graphical objects 702, 704, 706. These gestures and workflow procedures eliminates the need for writing an email to each of the document owners to send the status information. Additionally, a user's name or an identifier can be positioned beside the electronic documents (i.e., the graphical objects 702, 704, 706) on the workspace, such that the electronic documents are assigned to the corresponding person. Furthermore, a date can be put on the graphical objects 702, 704, 706 to assign a deadline to a task assigned to the graphical objects 702, 704, 706.

As an alternative to drawing gestures 708 and 710, a user can draw a box 716 around the graphical objects 702, 704, 706 to group the graphical objects 702, 704, 706 together.

Figure 8:
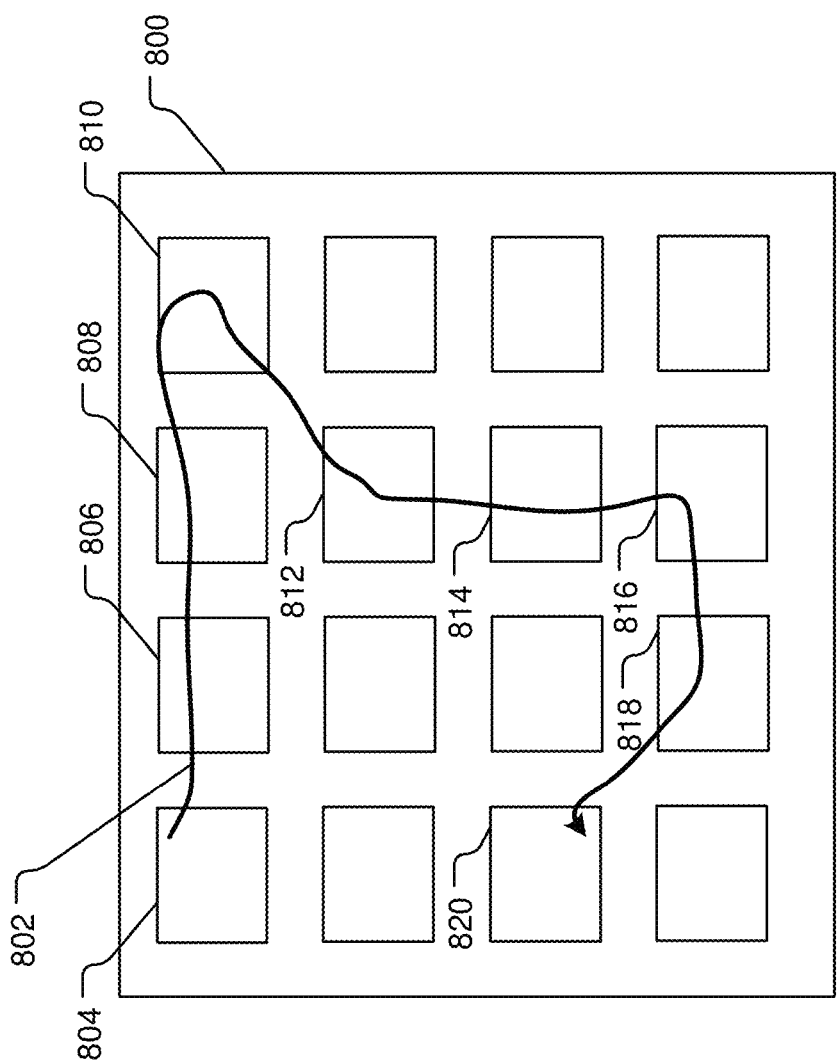
FIG. 8 illustrates a gesture that invokes a workflow procedure to assign tasks to multiple users.

FIG. 8 illustrates a gesture that invokes a workflow procedure to assign tasks to multiple users.

Redundant descriptions of the generation of graphical objects, detecting of gestures, identification of workflow procedures in dependence upon the interpretations of the gestures, the mapping of locations to identify corresponding information, the obtaining of an identification of the input parameter of the identified workflow procedures and the invoking of the identified workflow procedures will not be unnecessarily repeated for FIG. 8. Each of these features is adequately described with respect to FIG. 5A as well as in other portions of this document.

Specifically, FIG. 8 illustrates a virtual workspace 800 in which a free-form gesture 802 has been drawn to "touch" graphical objects 804, 806, 808, 810, 812, 814, 816, 818 and 820 of a larger group of graphical objects. As illustrated, there are multiple graphical objects arranged in a grid in the virtual workspace 800. When the users draws the free-form gesture 802, a workflow procedure can be invoked to assign tasks to users associated with the graphical objects 804, 806, 808, 810, 812, 814, 816, 818 and 820 "touched" by the gesture 802. Rather that composing individual messages or emails to each of the users who are associated with graphical objects, this provides an automated workflow procedure that provides for sending of multiple messages, which can have different content based on the context, to different users.

Alternatively, but not illustrated, the virtual workspace 800 could simply be a grid without any graphical assets included therein, where different users are assigned to different grids. The gesture 802 could then group the users that are "touched" by the gesture and specific functions can be carried out for that group of users as a workflow procedure.

Figure 9:
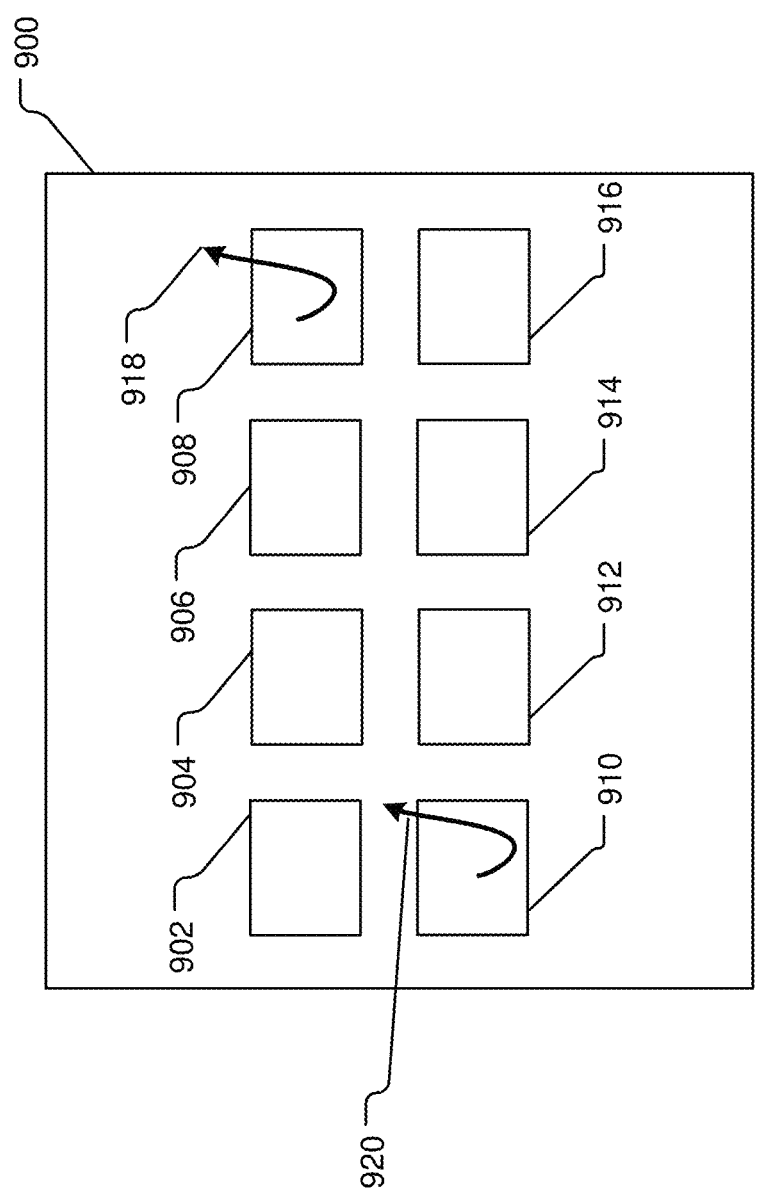
FIG. 9 illustrates example gestures that invokes a workflow procedure to approve designs and place them into a production folder.

FIG. 9 illustrates example gestures that invokes a workflow procedure to approve designs and place them into a production folder.

Redundant descriptions of the generation of graphical objects, detecting of gestures, identification of workflow procedures in dependence upon the interpretations of the gestures, the mapping of locations to identify corresponding information, the obtaining of an identification of the input parameter of the identified workflow procedures and the invoking of the identified workflow procedures will not be unnecessarily repeated for FIG. 9. Each of these features is adequately described with respect to FIG. 5A as well as in other portions of this document.

Specifically, FIG. 9 illustrates a virtual workspace 900 that includes graphical objects 902, 904, 906, 908, 910, 912, 914 and 916. These graphical objects can represent draft designs for a design house or draft documents for a marketing firm. A user can essentially approve various designs and/or documents for production. This is done by, for example, drawing a checkmark gesture 918 that "touches" graphical object 908 and drawing a checkmark gesture 920 that "touches" graphical object 910. The workflow procedure invoked by these gestures 918, 920 can include copying graphical objects 908 and 910 into a specific network or cloud folder, such as a "production" folder. For example, objects in the production folder can then be acted upon by other users. Furthermore, users of the collaboration system who are responsible for production can receive a message initiated by the workflow procedure that instructs them to take the next steps to move the graphical objects 908, 910 into production. Additionally, putting an "X" or a "cross" on various graphical objects can eliminate them from ever going into production. Furthermore, a checkmark gesture that is large enough to "touch" two different graphical objects can place both of those graphical objects into "production." The collaboration system can intelligently determine whether or not the checkmark gesture sufficiently "touches" both graphical objects and then proceed accordingly.

Figure 10:
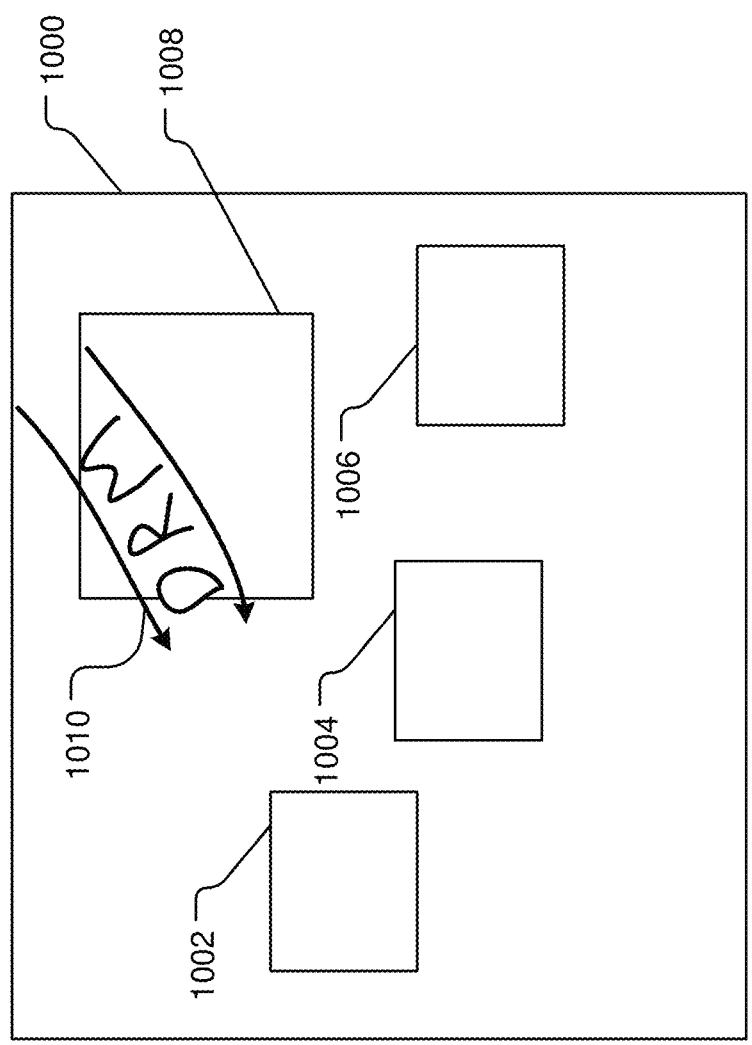
FIG. 10 illustrates an example gesture that invokes a workflow procedure to apply digital rights management (DRM) to a graphical object.

FIG. 10 illustrates an example gesture that invokes a workflow procedure to apply digital rights management (DRM) to a graphical object.

Redundant descriptions of the generation of graphical objects, detecting of gestures, identification of workflow procedures in dependence upon the interpretations of the gestures, the mapping of locations to identify corresponding information, the obtaining of an identification of the input parameter of the identified workflow procedures and the invoking of the identified workflow procedures will not be unnecessarily repeated for FIG. 10. Each of these features is adequately described with respect to FIG. 5A as well as in other portions of this document.

Specifically, FIG. 10 illustrates a virtual workspace 1000 that includes graphical objects 1002, 1004, 1006 and 1008. As illustrated a gesture, 1010 is drawn on top of graphical object 1008. In this example, the two somewhat parallel lines of the gesture 1010 indicate to the collaboration system that the user is going to draw text between the two parallel lines. Here, the user drew the text "DRM." The text "DRM" invokes a workflow procedure to apply digital rights management to the graphical object 1010. Other types of classifications can be applied to a graphical object by drawing other types of text using a gesture. This is annotation type gesture that can be used to perform any type of function on the graphical object or objects that are "touched" by the gesture. Furthermore, the workplace procedure can be configured to then send the DRM protected graphical object to a user or a group of users.

Figure 11:
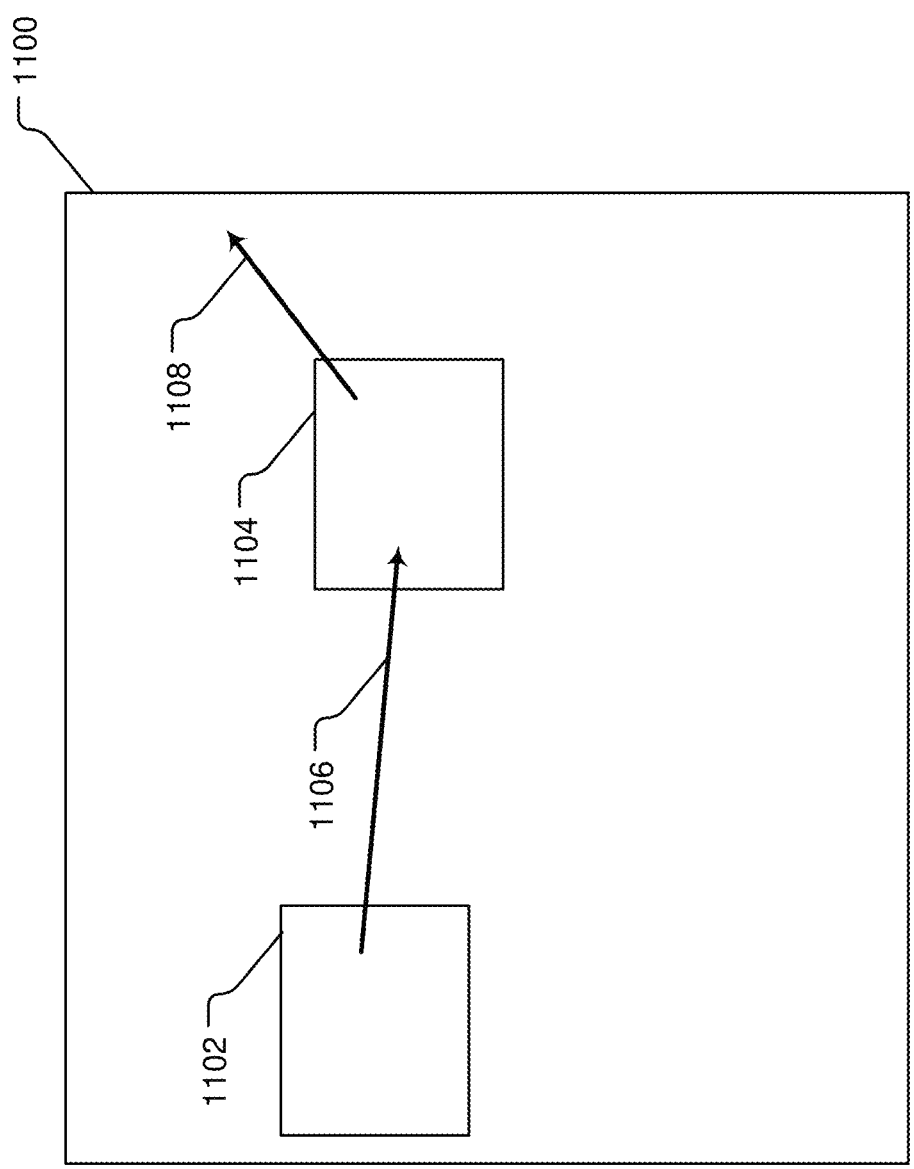
FIG. 11 illustrates an example gesture that invokes a workflow procedure to extract images from an electronic document and then send the extracted image to a user via email or a shared drive.

FIG. 11 illustrates an example gesture that invokes a workflow procedure to extract images from an electronic document and then send the extracted image to a user via email or a shared drive.

Redundant descriptions of the generation of graphical objects, detecting of gestures, identification of workflow procedures in dependence upon the interpretations of the gestures, the mapping of locations to identify corresponding information, the obtaining of an identification of the input parameter of the identified workflow procedures and the invoking of the identified workflow procedures will not be unnecessarily repeated for FIG. 11. Each of these features is adequately described with respect to FIG. 5A as well as in other portions of this document.

Specifically, FIG. 11 illustrates a virtual workspace 1100 that includes a graphical object 1102, which is (represents) an electronic document containing an image, and that includes a third-party application that is capable of extracting an image from an electronic document and then sending it to a designated user via email or via a shared drive. In this example, the line gesture 1106 from the electronic document 1102 to the image extractor and sender 1104 initiates a workflow procedure that causes the image extractor and sender 1104 to extract the image from the electronic document 1102. Next, an upwardly-extending line gesture 1108 is drawn from the corner of the image extractor and sender 1104, which initiates a workflow procedure that causes the image extractor and sender 1104 to send the extracted image to a particular user via email or shared drive.

Additionally, since gestures and workflow procedures can be contextual, a straight line gesture drawn from the upper right hand corner of graphical object 1104 may initiate an email message to a particular user and a straight line gesture drawn from the lower right hand corner of the graphical object 1104 may initiate sending the extracted image to a network or shared cloud drive.

As an additional example, the graphical object 1102 can represent a video and the other digital asset can represent a document. A workflow procedure can be created by the user using a gesture to associate the document with, for example, a particular frame of the video. When invoked, this particular workflow procedure will ad a comment to the particular frame of the video that includes the contents of the document.

Figure 12:
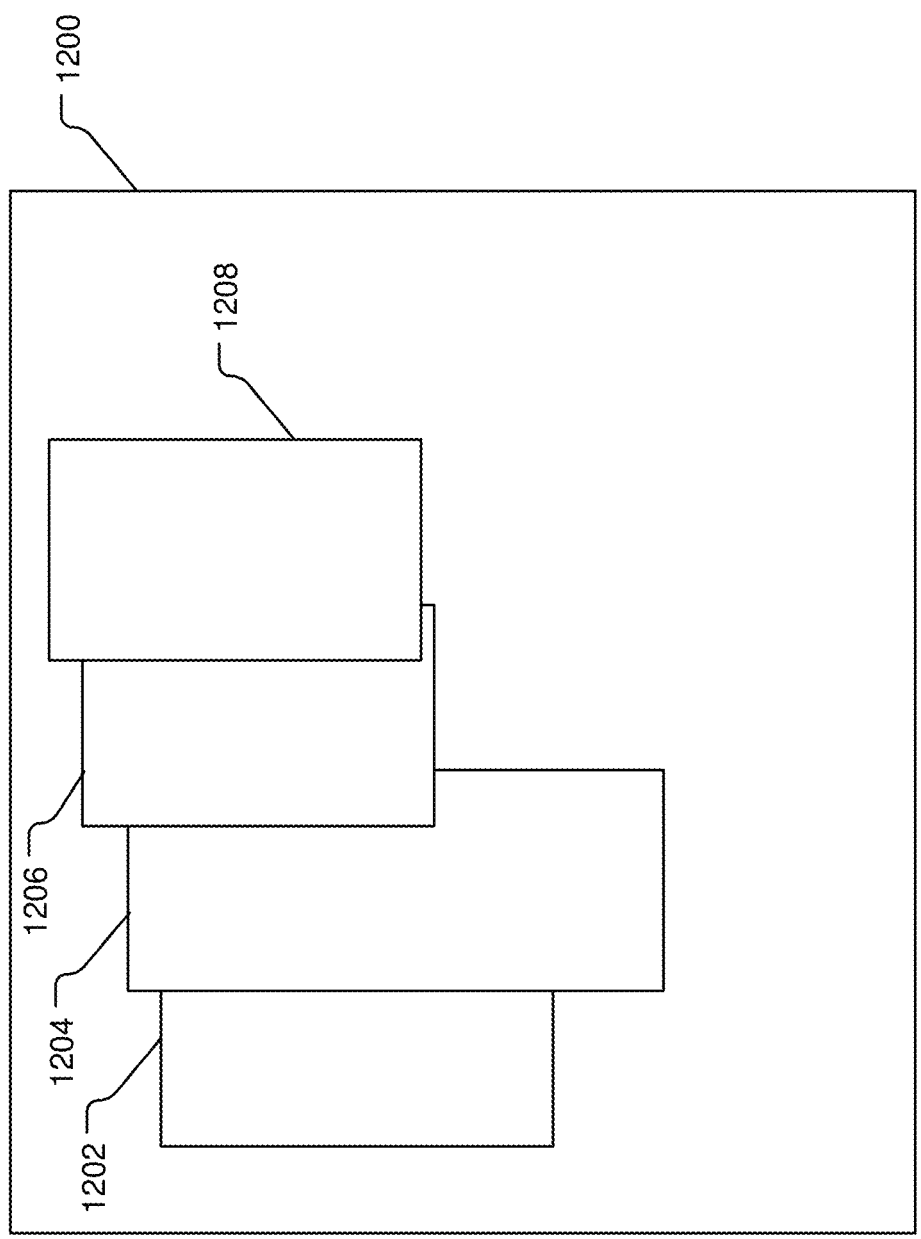
FIG. 12 illustrates an example gesture that invokes a workflow procedure to add relative dependencies to various graphical objects.

FIG. 12 illustrates an example gesture that invokes a workflow procedure to add relative dependencies to various graphical objects.

Redundant descriptions of the generation of graphical objects, detecting of gestures, identification of workflow procedures in dependence upon the interpretations of the gestures, the mapping of locations to identify corresponding information, the obtaining of an identification of the input parameter of the identified workflow procedures and the invoking of the identified workflow procedures will not be unnecessarily repeated for FIG. 12. Each of these features is adequately described with respect to FIG. 5A as well as in other portions of this document.

Specifically, FIG. 12 illustrates a virtual workspace 1200 that includes graphical objects 1202, 1204, 1206, 1208. The relative positions of the graphical objects 1202, 1204, 1206, 1208 can invoke a workflow procedure that creates dependencies of the various graphical objects. In other words, stacked graphical objects can have dependences on each other based on their relative positions to each other. This designated dependency can be used as an input parameter to another workflow procedure that is invoked according to a gesture.

Figure 13:
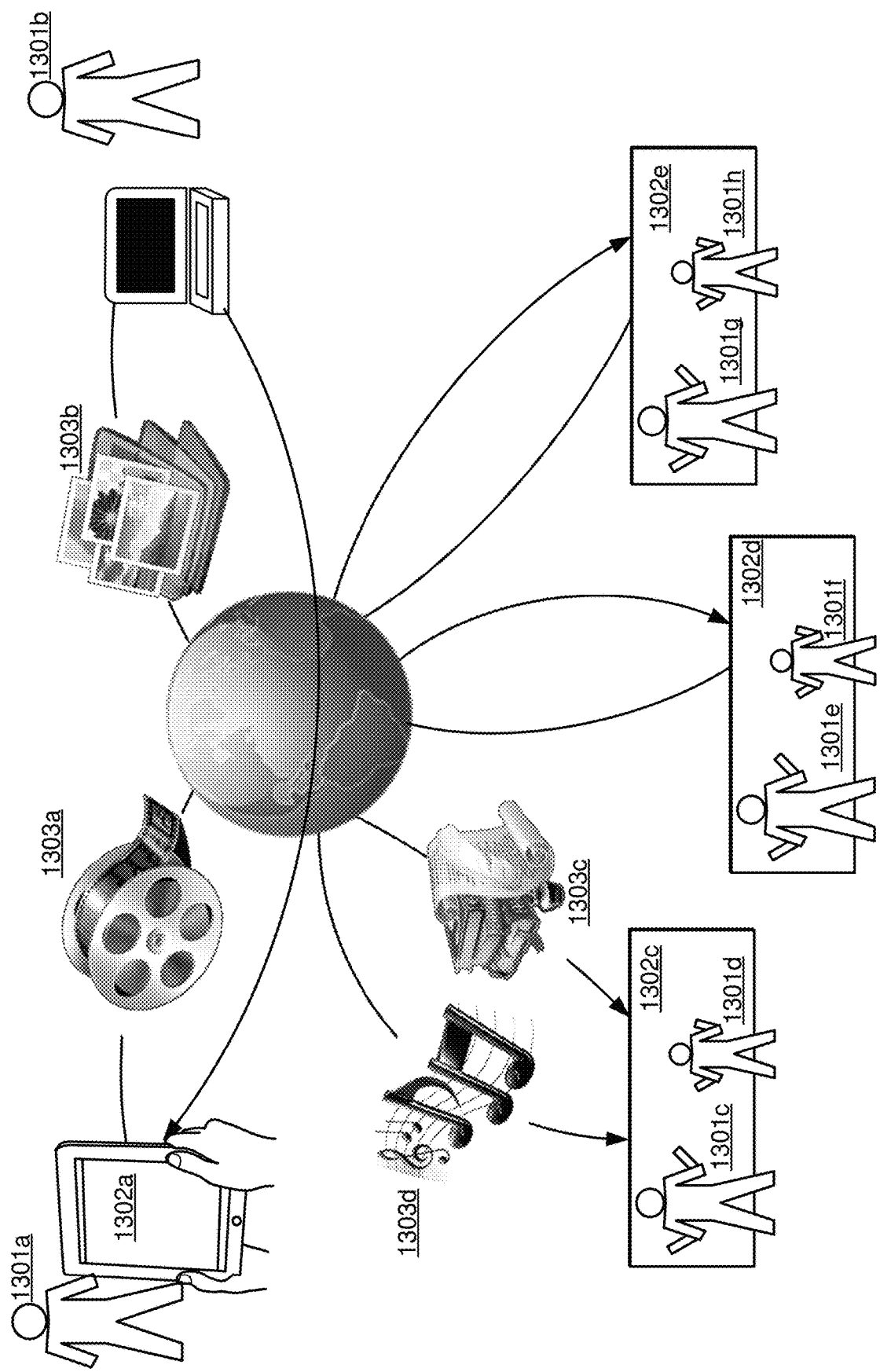
FIG. 13 illustrates additional example aspects of a digital display collaboration environment capable of implementing gesture based workflow procedures.

FIG. 13 illustrates example aspects of a digital display collaboration environment. In the example, a plurality of users 1301a-h (collectively 1301) may desire to collaborate with each other in the creation of complex images, music, video, documents, and/or other media, all generally designated in FIG. 13 as 1303a-d (collectively 1303). The users in the illustrated example use a variety of devices configured as electronic network nodes, in order to collaborate with each other, for example a tablet 1302a, a personal computer (PC) 1302b, and many large format digital displays or walls 1302c, 1302d, 1302e (collectively devices 1302). In the illustrated example, the large format display 1302c, which is sometimes referred to herein as a "wall", accommodates more than one of the users, (e.g. users 1301c and 1301d, users 1301e and 1301f, and users 1301g and 1301h). The user devices, which are referred to as client-side network nodes, have displays on which a screen space is allocated for displaying events in a workspace. The screen space for a given user may comprise the entire screen of the display, a subset of the screen, a window to be displayed on the screen and so on, such that each has a limited area or extent compared to the virtually unlimited extent of the workspace.

Figure 14:
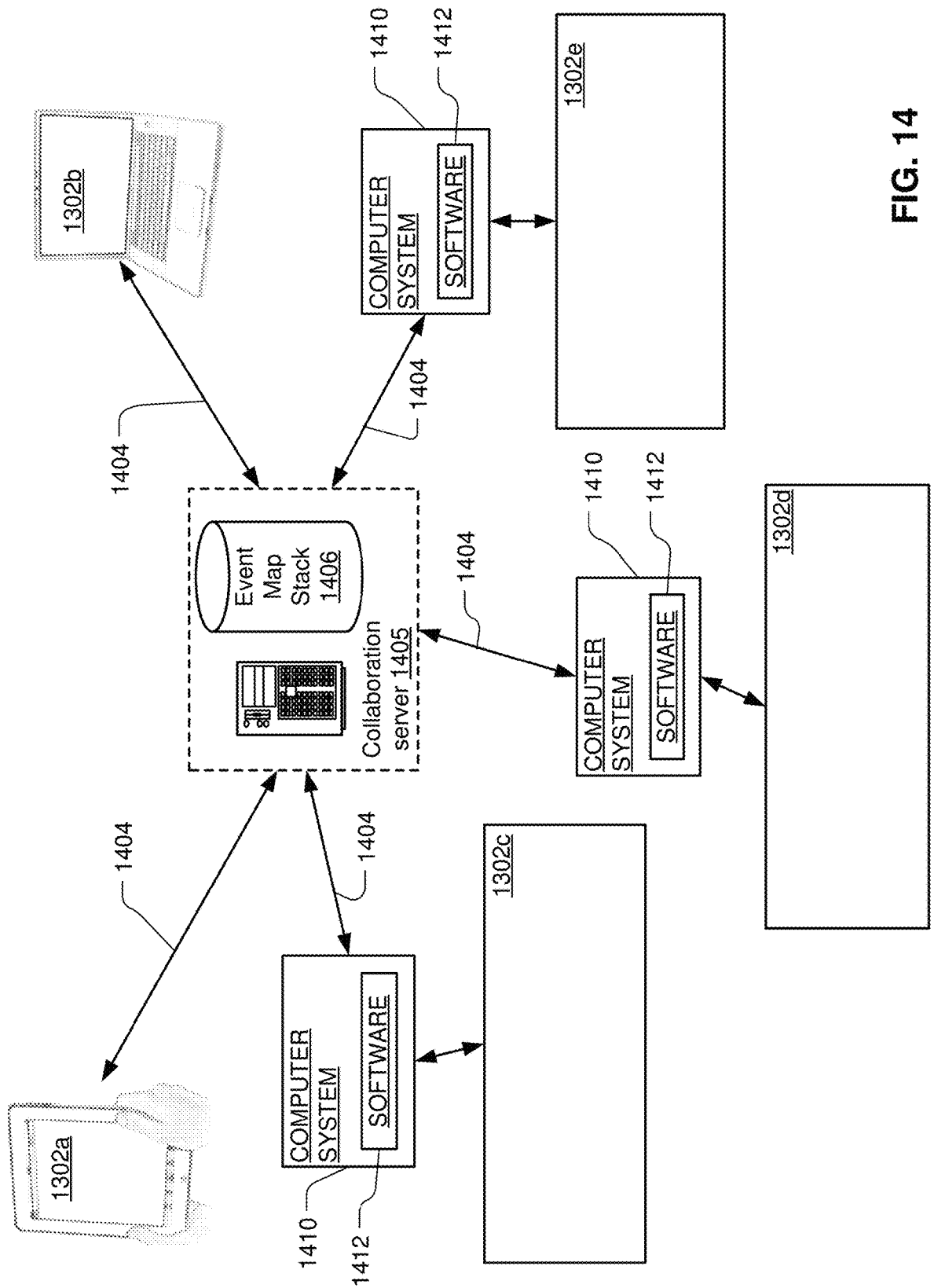
FIG. 14 illustrates additional example aspects of a digital display collaboration environment.

FIG. 14 illustrates additional example aspects of a digital display collaboration environment. As shown in FIG. 14 the large format digital displays 1302c, 1302d, 1302e sometimes referred to herein as "walls" are controlled by respective client-side, communication networks 1404, which in turn are in network communication with a central collaboration server 1405 configured as a server-side physical network node or nodes, which has accessible thereto a database 1406 storing spatial event map stacks for a plurality of workspaces.

As used herein, a physical network node is an active electronic device that is attached to a network, and is capable of sending, receiving, or forwarding information over a communication channel. Examples of electronic devices, which can be deployed as network nodes, include all varieties of computers, workstations, laptop computers, hand held computers and smart phones. As used herein, the term "database" does not necessarily imply any unity of structure. For example, two or more separate databases, when considered together, still constitute a "database" as that term is used herein.

The application running at the collaboration server 1405 can be hosted using Web server software such as Apache or nginx, or a runtime environment such as node.js. It can be hosted for example on virtual machines running operating systems such as LINUX. The server 1405 is illustrated, heuristically, in FIG. 14 as a single computer. However, the server architecture can involve systems of many computers, each running server applications, as is typical for large-scale cloud-based services. The server architecture includes a communication module, which can be configured for various types of communication channels, including more than one channel for each client in a collaboration session. For example, with near-real-time updates across the network, client software can communicate with the server communication module using a message-based channel, based for example on the WebSocket protocol. For file uploads as well as receiving initial large volume workspace data, the client software can communicate with the server communication module via HTTPS. The server can run a front-end program written for example in JavaScript served by Ruby-on-Rails, support authentication/authorization based for example on Oauth, and support coordination among multiple distributed clients. The server communication module can include a message-based communication protocol stack, such as a WebSocket application, that performs the functions of recording user actions in workspace data, and relaying user actions to other clients as applicable. This system can run on the node.JS platform for example, or on other server technologies designed to handle high-load socket applications.

The database 1406 stores, for example, a digital representation of workspace data sets for a spatial event map of each session where the workspace data set can include or identify events related to objects displayable on a display canvas. A workspace data set can be implemented in the form of a spatial event stack, managed so that at least persistent spatial events (called historic events) are added to the stack (push) and removed from the stack (pop) in a first-in-last-out pattern during an undo operation. There can be workspace data sets for many different workspaces. A data set for a given workspace can be configured in a database, or as a machine-readable document linked to the workspace. The workspace can have unlimited or virtually unlimited dimensions. The workspace data includes event data structures identifying objects displayable by a display client in the display area on a display wall, and associates a time and a location in the workspace with the objects identified by the event data structures. Each device 1402 displays only a portion of the overall workspace. A display wall has a display area for displaying objects, the display area being mapped to a corresponding area in the workspace that corresponds to a viewport in the workspace centered on, or otherwise located with, a user location in the workspace. The mapping of the display area to a corresponding viewport in the workspace is usable by the display client to identify objects in the workspace data within the display area to be rendered on the display, and to identify objects to which to link user touch inputs at positions in the display area on the display.

The server 1405 and database 1406 can constitute a server-side network node, including memory storing a log of events relating to graphical objects having locations in a workspace, entries in the log including a location in the workspace of the graphical object of the event, a time of the event, and an object identifier of the graphical object of the event. The server can include logic to establish links to a plurality of active client-side network nodes, to receive messages identifying events relating to modification and creation of graphical objects having locations in the workspace, to add events to the log in response to said messages, and to distribute messages relating to events identified in messages received from a particular client-side network node to other active client-side network nodes.

The logic in the server 1405 can comprise an application program interface (API), including a specified set of procedures and parameters, by which to send messages carrying portions of the log to client-side network nodes, and to receive messages from client-side network nodes carrying data identifying events relating to graphical objects having locations in the workspace.

Also, the logic in the server 1405 can include an application program interface including a process to distribute events received from one client-side network node to other client-side network nodes.

The events compliant with the API can include a first class of event (history event) to be stored in the log and distributed to other client-side network nodes, and a second class of event (ephemeral event) to be distributed to other client-side network nodes but not stored in the log.

The server 1405 (e.g., server-side network node) can store workspace data sets for a plurality of workspaces, and provide the workspace data to the display clients participating in the session. The workspace data is then used by the computer systems 1410 (e.g., client-side network node) with appropriate software 1412 including display client software, to determine images to display on the display, and to assign objects for interaction to locations on the display surface. The server 1405 can store and maintain a multitude of workspaces, for different collaboration sessions. Each workspace can be associated with a group of users, and configured for access only by authorized users in the group.

In some alternatives, the server 1405 can keep track of a "viewport" for each device 1402, indicating the portion of the canvas viewable on that device, and can provide to each device 1402 data needed to render the viewport.

Application software running on the client device responsible for rendering drawing objects, handling user inputs, and communicating with the server can be based on HTML5 or other markup-based procedures, and run in a browser environment. This allows for easy support of many different client operating system environments.

The user interface data stored in database 1406 includes various types of objects including graphical constructs, such as image bitmaps, video objects, multi-page documents, scalable vector graphics, and the like. The devices 1402 are each in communication with the collaboration server 1405 via a communication network 1404. The communication network 1404 can include all forms of networking components, such as LANs, WANs, routers, switches, WiFi components, cellular components, wired and optical components, and the internet. In one scenario, two or more of the users 1401 are located in the same room, and their devices 1402 communicate via WiFi with the collaboration server 1405. In another scenario two or more of the users 1401 are separated from each other by thousands of miles and their devices 1402 communicate with the collaboration server 1405 via the internet. The walls 1302*c*, 1302*d*, 1302*e* can be multi-touch devices, which not only display images, but also can sense user gestures provided by touching the display surfaces with either a stylus or a part of the body such as one or more fingers. In some embodiments, a wall (e.g. 1302*c*) can distinguish between a touch by one or more fingers (or an entire hand, for example), and a touch by the stylus. In an embodiment, the wall senses touch by emitting infrared light and detecting light received; light reflected from a user's finger has a characteristic which the wall distinguishes from ambient received light. The stylus emits its own infrared light in a manner that the wall can distinguish from both ambient light and light reflected from a user's finger. The wall 1302*c* may, for example, be an array of Model No. MT553UTBL MultiTaction Cells, manufactured by Multi-Touch Ltd., Helsinki, Finland, tiled both vertically and horizontally. In order to provide a variety of expressive means, the wall 1302*c* is operated in such a way that it maintains "state." That is, it may react to a given input differently depending on (among other things) the sequence of inputs. For example, using a toolbar, a user can select any of a number of available brush styles and colors. Once selected, the wall is in a state in which subsequent strokes by the stylus will draw a line using the selected brush style and color.

In an illustrative embodiment, a display array can have a displayable area usable as a screen space totaling on the order of 6 feet in height and 30 feet in width, which is wide enough for multiple users to stand at different parts of the wall and manipulate it simultaneously.

FIGS. 15A-15I represent data structures which can be part of workspace data maintained by a database at the collaboration server 1405. In FIG. 15A, an event data structure is illustrated. An event is an interaction with the workspace data that can result in a change in workspace data. Thus, an event can include an event identifier, a timestamp, a session identifier, an event type parameter, the client identifier as client-id, and an array of locations in the workspace, which can include one or more for the corresponding event. It is desirable, for example, that the timestamp have resolution on the order of milliseconds or even finer resolution, in order to minimize the possibility of race conditions for competing events affecting a single object. Also, the event data structure can include a UI object, which identifies an object in the workspace data to which a stroke on a touchscreen at a client display is linked. Events can include style events, which indicate the display parameters of a stroke, for example. The events can include a text type event, which indicates entry, modification or movement in the workspace of a text object. The events can include a card type event, which indicates the creation, modification or movement in the workspace of a card type object. The events can include a stroke type event which identifies a location array for the stroke, and display parameters for the stroke, such as colors and line widths for example. Events can include begin follow events and viewport change events. Events can include marker create events.

Events can be classified as persistent history events and as ephemeral events. Processing of the events for addition to workspace data and sharing among users can be dependent on the classification of the event. This classification can be inherent in the event type parameter, or an additional flag or field can be used in the event data structure to indicate the classification.

FIGS. 15A, 15B, 15C, 15D, 15E, 15F, 15G, 15H and 15I (collectively FIG. 15) represent data structures which can be part of workspace data maintained by a database at the collaboration server 1405.

A spatial event map can include a log of events having entries for historical events, where each entry comprises a structure such as illustrated in FIG. 15A. A server-side network node includes logic to receive messages carrying ephemeral and history events from client-side network nodes, and to send the ephemeral events to other client-side network nodes without forwarding them to a server at which events are added as corresponding entries in the log, and to send history events to the other client-side network nodes while forwarding them to a server at which events are added as corresponding entries to the log.

FIG. 15B illustrates a card data structure. The card data structure can provide a cache of attributes that identify current state information for an object in the workspace data, including a session identifier, a card type identifier, an array identifier, the client identifier, dimensions of the cards, type of file associated with the card, and a session location within the workspace.

FIG. 15C illustrates a data structure which consolidates a number of events and objects into a cacheable set called a chunk. The data structure includes a session identification, an identifier of the events included in the chunk, and a timestamp at which the chunk was created.

FIG. 15D illustrates the data structure for links to a user participating in a session in a chosen workspace. This data structure can include an access token, the client identifier for the session display client, the user identifier linked to the display client, a parameter indicating the last time that a user accessed a session, and expiration time and a cookie for carrying various information about the session. This information can, for example, maintain a current location within the workspace for a user, which can be used each time that a user logs in to determine the workspace data to display at a display client to which the login is associated.

FIG. 15E illustrates a display array data structure which can be used in association with large-format displays that are implemented by federated displays, each having a display client. The display clients in such federated displays cooperate to act as a single display. The workspace data can maintain the display array data structure which identifies the array of displays by an array ID, and identifies the session position of each display. Each session position can include an x-offset and a y-offset within the area of the federated displays, a session identifier, and a depth.

The system can encrypt communications with client-side network nodes, and can encrypt the database in which the spatial event maps are stored. Also, on the client-side network nodes, cached copies of the spatial event map are encrypted in some embodiments, to prevent unauthorized access to the data by intruders who gain access to the client-side computers.

FIG. 15F illustrates a Global Session Activity Table (GSAT) used to map active clients to active workspaces. The data structure includes a workspace name, a device type, a client identification, a session identification, an actor type, and an actor identification.

FIG. 15G illustrates an example viewport data structure. The viewport data structure can provide a cache of attributes that identify current state information for the viewport in the workspace data, including client identifier, an event type, a target/object identifier, a session identifier, a location array, a dimension array, a title, a color, a timestamp, a context menu, an access list, and linking information.

FIG. 15H illustrates an example workflow procedure data structure. The workflow procedure data structure can provide, at least, a type of workflow procedure, a gesture or gestures associated with the workflow procedure, a function or functions than can be invoked by the workflow procedure, an object or objects that can be the recipient of the function or functions, an input parameter or input parameters according to which the workflow procedure can be invoked and an identification of the workflow procedure. Other components of the data structure will be apparent to a person of ordinary skill in the art and are not limited to components described herein.

FIG. 15I illustrates an example graphical object data structure. The graphical object data structure can provide, at least, a session identification, type of graphical object, a gesture or gestures applicable to the graphical object, an identification of the graphical object, information indicating whether the graphical object is native, external or local and a workflow procedure or workflow procedures that can be invoked on the graphical object. Other components of the data structure will be apparent to a person of ordinary skill in the art and are not limited to components described herein.

Figure 16:
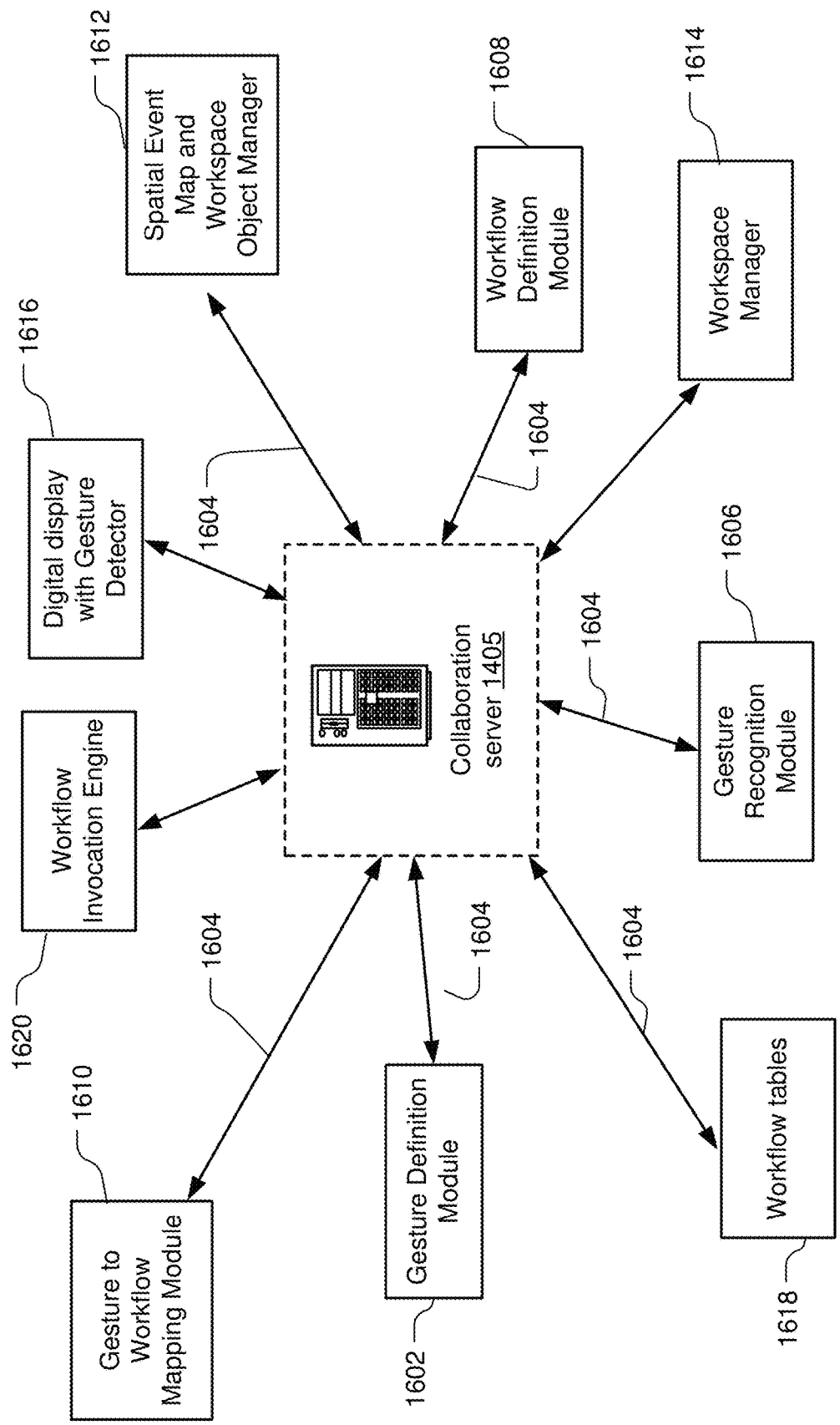
FIG. 16 is a simplified architecture diagram of various components that can be implemented to interpret gestures and invoke workflow procedures.

FIG. 16 is a simplified architecture diagram of various components that can be implemented to interpret gestures and invoke workflow procedures.

The diagram includes the collaboration server 1405 of FIG. 14 (a redundant description of the collaboration server 1405 is omitted here). Additionally, the diagram illustrates a gesture definition module 1602, which is in communication 1604 with the collaboration server 1405. The gesture definition module 1602 can enable users and developers to define new gestures, as described throughout this document.

A gesture recognition module 1606, which is in communication 1604 with the collaboration server 1405, includes logic to recognize predefined gestured (including default and customized gestures) that are input by users during a collaboration session.

A workflow definition module 1608, which is in communication 1604 with the collaboration server 1405, includes logic to define new workflow procedures or edit predefined workflow procedures. Example workflow procedures are described throughout this document. Workflow procedures can be defined for specific domains or industries (e.g., manufacturing, medical science, construction, etc.).

A gesture to workflow mapping component 1610, which is in communication 1604 with the collaboration server 1405, includes logic to map one or more gestures to one or more workflows. As described throughout this document, a gesture can be one annotation or a combination of multiple annotations. Users and developers can create new gestures and link the gestures to workflows.

A spatial event map and workspace object manager 1612, which is in communication 1604 with the collaboration server 1405, includes logic to manage graphical objects in the workspace. The graphical objects are identified using unique identifiers and their locations are defined using coordinates on the workspace.

Workspace manager 1614, which is in communication 1604 with the collaboration server 1405, includes logic to manage spatial event map and virtual workspaces. The workspace manager 1614 can also include logic to identify graphical objects in the workspace that are displayed on the digital display via, for example, a display viewport.

Digital display with gesture detector 1616, which is in communication 1604 with the collaboration server 1405, includes logic that enables users to interact with graphical objects displayed on the digital display. The detected gestures are passed to a workflow invocation engine 1620. As previously described, the gestures can be touch gestures, observed gestures in space and/or a combination thereof.

Workflow tables 1618, which are in communication 1604 with the collaboration server 1405, can store workflow procedure executables. The workflow tables 1618 can include tables to store user interaction data, such as events. An event is an interaction with the workspace that results in a change in workspace data. Further, as discussed in other portions of this document, an event can include an event identifier, a client identifier, a timestamp, and an array of locations in the workspace. In one embodiment, the event data structure can include a user interface (UI) object, which identifies a graphical object or a group of graphical objects in the virtual workspace to which a gesture (such as an annotation or a stroke on screen) on a digital display or a "wall" is linked. More than one graphical object can be included in the UI object. The workflow tables 1618 can store a data structure which consolidates a number of events and graphical objects into a cacheable set called a chunk.

A workflow invocation engine 1620, which is in communication 1604 with the collaboration server 1405, can identify a workflow procedure to invoke when a gesture is detected on the digital display. The technology disclosed includes logic to identify digital assets and/or graphical objects to which a gesture applies by identifying the group of digital assets and/or graphical objects related to an event and then identifying the UI object for the gesture, as stored in the workflow tables 1618. The UI object can be one digital asset or a group of digital assets and/or a graphical object or a group of graphical objects.

Additionally, the workflow invocation engine 1620 includes logic that links the gesture to the UI object in virtual workspace. The logic links the digital assets and/or graphical objects in the UI object to the workflow procedure and invokes the workflow procedure logic (or functions). As described throughout this document, the workflow procedure logic (or functions) can be implemented by third parties using browser enabled third-party applications and/or plugins that support third-party applications, whether they be external third-party applications or native third-party applications. The workflow invocation engine 1620 can also include logic to identify different types of virtual workspaces (e.g., workspaces corresponding to different types of industries, as described above). When a gesture is detected, the workflow procedure corresponding to the workspace type is invoked.

Digital assets and/or graphical objects can be from local sources and multiple external sources, such as, but not limited to, Dropbox™, Box™, Google™ Drive, YouTube™, Google™ Docs etc. Additionally, outputs of the workflow procedures can be sent to external systems such as TIBCO™ etc.

Furthermore, each of the above described modules, tables, engines, detectors and managers can include memory, processors, storage an logic and the above described modules, tables, engines, detectors and managers can be part of the same system, variously configured in various systems and can be remotely or locally located.

Figure 17:
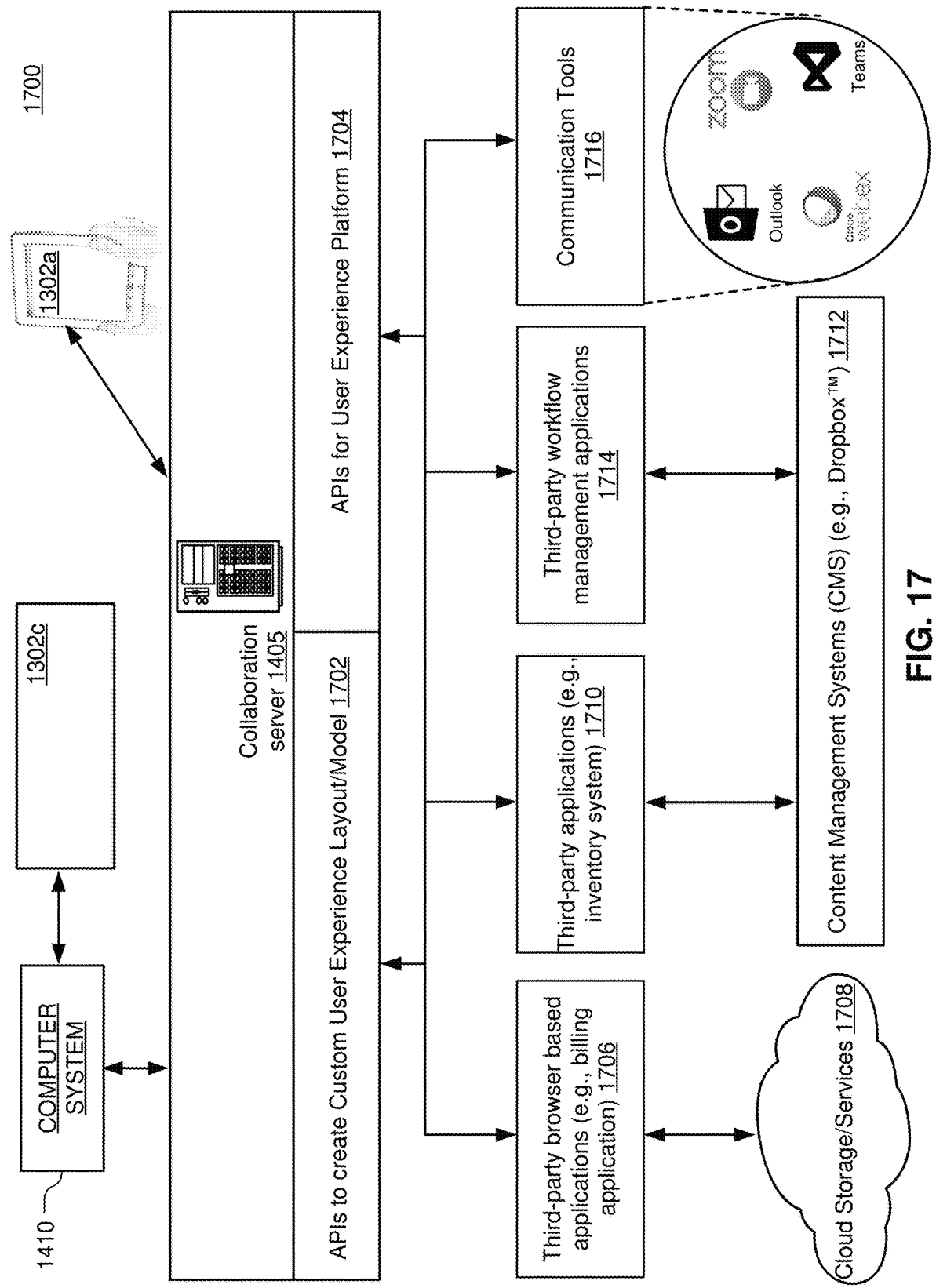
FIG. 17 illustrates a high-level collaboration environment that is able to obtain third-party data and utilize the third-party data to facilitate use of third-party applications.

FIG. 17 illustrates a high-level collaboration environment that is able to obtain third-party data and utilize the third-party data to facilitate use of third-party applications. This collaboration environment can be implemented in any type of scenario, such as on online retailer, a manufacturer, and a healthcare provider, just to name a few. For the sake of this example, the collaboration environment is discussed in terms of a healthcare provider.

Specifically, FIG. 17 illustrates a collaboration environment 1700 that includes the display wall 1302c and the tablet 1302a, as described above with reference to FIG. 13 and includes the collaboration server 1405 and computer system 1410 described above with reference to FIG. 14. Redundant descriptions thereof are omitted. The collaboration server 1405 can provide a visual user interface to users of, for example, the collaboration environment 1700 of a healthcare provider via the computer system 1410, the display wall 1302c and the tablet 1302a.

Within the collaboration environment 1700, APIs 1702 can be implemented to allow for creation of a custom user experience layout/model. These APIs 1702 can implement, for example, a declarative schema-based mechanics to create user an experience layout that supports both third-party browser based applications 1706 (e.g., a browser-based third-party billing application, etc.) and (externally ran or natively ran) third-party applications 1710 (e.g., a patient lifetime record application, an audio and video conference application, etc.). The third-party browser-based applications can utilize cloud storage/services 1708 for the storage and retrieval of data. Further, the third-party applications can utilize comments management systems (CMSs) 1712 (e.g., Dropbox™) for the storage and retrieval of data related to the usage and/or execution of the third-party applications 1710.

Additionally, within the collaboration environment 1700, APIs 1704 can be implemented to provide a user experience platform. Specifically, the APIs 1704 can include APIs for synchronous rendering across clients, APIs for capturing/storing collaboration artifacts, APIs for implementing gestures recognition, creation and workflow procedure creation and invocation based on recognized gestures.

Specifically, the APIs 1704 allow for calibration with third-party workflow management applications 1714 that are specific to a domain. The third-party workflow management applications 1714 can also utilizes CMSs 1712 for the storage and retrieval of data related to the usage and/or execution of the third-party workflow management applications 1714. Furthermore, the APIs 1704 for the user experience platform allow for invoking of third-party communication tools 1716, such as Outlook™ Zoom™, WebEx™, Teams™, etc. The gesture based workflow procedures described in this document can be implemented in the collaboration environment 1700 to allow for efficient interaction with multiple platforms and data repositories across the board, providing a single one-stop collaboration system that addresses all of a user's needs within, for example, a healthcare provider software system.

Figure 18:
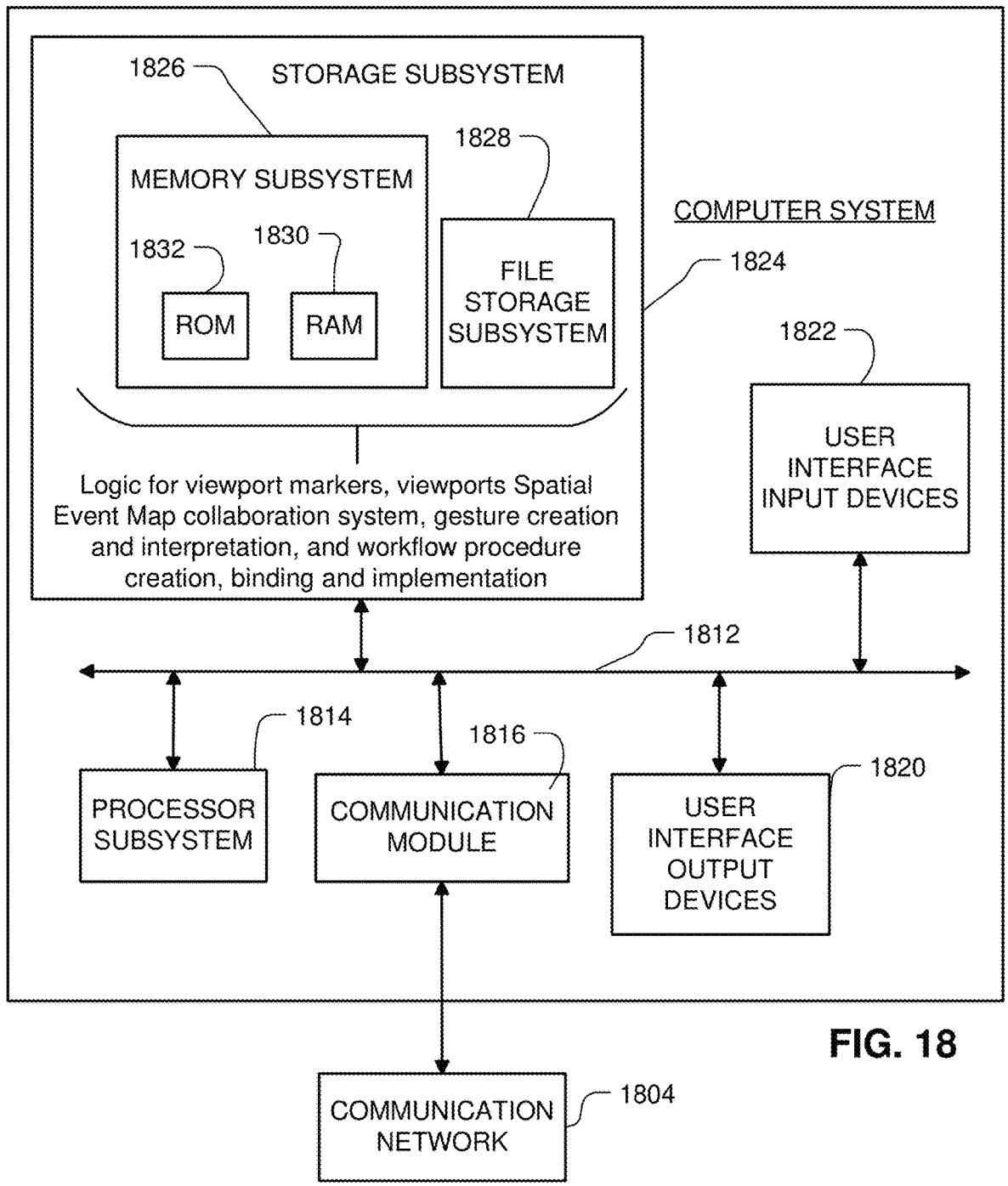
FIG. 18 is a simplified block diagram of a computer system, or network node, which can be used to implement the client-side functions or the server-side functions in a distributed collaboration system.

FIG. 18 is a simplified block diagram of a computer system, or network node, which can be used to implement the client-side functions (e.g. computer system 1310) or the server-side functions (e.g. server 1405) in a distributed collaboration system. A computer system typically includes a processor subsystem 1814 which communicates with a number of peripheral devices via bus subsystem 1812. These peripheral devices may include a storage subsystem 1824, comprising a memory subsystem 1826 and a file storage subsystem 1828, user interface input devices 1822, user interface output devices 1820, and a network interface subsystem within a communication module 1816. The input and output devices allow user interaction with the computer system. Communication module 1816 provides physical and communication protocol support for interfaces to outside networks, including an interface to communication network 1804, and is coupled via communication network 1804 to corresponding communication modules in other computer systems. Communication network 1804 may comprise many interconnected computer systems and communication links. These communication links may be wireline links, optical links, wireless links, or any other mechanisms for communication of information, but typically consist of an IP-based communication network, at least at its extremities. While in one embodiment, communication network 1804 is the internet, in other embodiments, communication network 1804 may be any suitable computer network.

The physical hardware components of network interfaces are sometimes referred to as network interface cards (NICs), although they need not be in the form of cards; for instance, they could be in the form of integrated circuits (ICs) and connectors fitted directly onto a motherboard, or in the form of macrocells fabricated on a single integrated circuit chip with other components of the computer system.

User interface input devices 1822 may include a keyboard, pointing devices such as a mouse, trackball, touchpad, or graphics tablet, a scanner, a touch screen incorporated into the display (including the touch sensitive portions of large format digital display 1302*c*), audio input devices such as voice recognition systems, microphones, and other types of tangible input devices. In general, use of the term "input device" is intended to include all possible types of devices and ways to input information into the computer system or onto communication network 1804.

User interface output devices 1820 may include a display subsystem, a printer, a fax machine, or non-visual displays such as audio output devices. The display subsystem can include a cathode ray tube (CRT), a flat panel device such as a liquid crystal display (LCD), a projection device, or some other mechanism for creating a visible image. In the embodiment of FIG. 13, it includes the display functions of large format digital display 1302*c*. In general, use of the term "output device" is intended to include all possible types of devices and ways to output information from the computer system to the user or to another machine or computer system.

Storage subsystem 1824 stores the basic programming and data constructs that provide the functionality of certain embodiments of the technology disclosed. The storage subsystem 1824 includes computer program instructions implementing a spatial event map collaboration system client, or a spatial event map collaboration system server, and can include logic for modules such as viewport markers, viewports Spatial Event Map collaboration system, gesture creation and interpretation, and workflow procedure creation, binding and implementation.

The storage subsystem 1824 when used for implementation of server side network-nodes, comprises a product including a non-transitory computer readable medium storing a machine readable data structure including a spatial event map which locates events in a workspace, wherein the spatial event map includes a log of events, entries in the log having a location of a graphical object of the event in the workspace and a time. Also, the storage subsystem 1824 comprises a product including executable instructions for performing the procedures described herein associated with the server-side network node.

The storage subsystem 1824 when used for implementation of client side network-nodes, comprises a product including a non-transitory computer readable medium storing a machine readable data structure including a spatial event map in the form of a cached copy as explained below, which locates events in a workspace, wherein the spatial event map includes a log of events, entries in the log having a location of a graphical object of the event in the workspace and a time. Also, the storage subsystem 1824 comprises a product including executable instructions for performing the procedures described herein associated with the client-side network node.

For example, the various modules implementing the functionality of certain embodiments of the technology disclosed may be stored in storage subsystem 1824. These software modules are generally executed by processor subsystem 1814.

Memory subsystem 1826 typically includes a number of memories including a main random-access memory (RAM) 1830 for storage of instructions and data during program execution and a read only memory (ROM) 1832 in which fixed instructions are stored. File storage subsystem 1828 provides persistent storage for program and data files, and may include a hard disk drive, a floppy disk drive along with associated removable media, a CD ROM drive, an optical drive, or removable media cartridges. The databases and modules implementing the functionality of certain embodiments of the technology disclosed may have been provided on a computer readable medium such as one or more CD-ROMs, and may be stored by file storage subsystem 1828. The host memory subsystem 1826 contains, among other things, computer instructions which, when executed by the processor subsystem 1814, cause the computer system to operate or perform functions as described herein. As used herein, processes and software that are said to run in or on "the host" or "the computer," execute on the processor subsystem 1814 in response to computer instructions and data in the host memory subsystem 1826 including any other local or remote storage for such instructions and data.

Bus subsystem 1812 provides a mechanism for letting the various components and subsystems of a computer system communicate with each other as intended. Although bus subsystem 1812 is shown schematically as a single bus, alternative embodiments of the bus subsystem may use multiple busses.

The computer system itself can be of varying types including a personal computer, a portable computer, a workstation, a computer terminal, a network computer, a television, a mainframe, a server farm, or any other data processing system or user device. In one embodiment, a computer system includes several computer systems, each controlling one of the tiles that make up the large format digital display 1302*c*. Due to the ever-changing nature of computers and networks, the description of computer system 1310 depicted in FIG. 18 is intended only as a specific example for purposes of illustrating the preferred embodiments of the technology disclosed. Many other configurations of the computer system are possible having more or less components than the computer system depicted in FIG. 18. The same components and variations can also make up each of the other devices 1302 in the collaboration environment of FIG. 14, as well as the collaboration server 1405 and display database 1406.

Additional Example Application Programming Interfaces (APIs)

Aspects of an application program interface (API) supporting use of spatial event maps are set out here for the purposes of providing an example of technology to implement the techniques described herein.

An example of components of an API supporting the spatial event map processes described herein is provided.

Message Structure

The first element of each message array is a sender-id, specifying the client that originated the message. Sender-ids are unique among all sessions on the server. The id and cr messages sent from the server to the client have their sender-id set to a default value, such as −1. The second element of each message array is a two-character code. This code defines the remaining arguments in the array as well as the intended action. Messages sent with a sender-id of −1 are messages that originate from the server.

Message Types

The following messages types are officially supported.

| | |
|---|---|
| 1) cs | Change Session |
| 2) echo | Echo |
| 3) error | Error |
| 4) id | Client Id |
| 5) jr | Join Room |
| 6) rl | Room List |
| 7) un | Undo |
| 8) up | User Permissions |
| 9) vc | Viewport Change |
| 10) he | History Event |
| 11) ve | Volatile Event |
| 12) disconnect | Disconnect |
| 13) ls | List Streams |
| 14) bs | Begin Stream |
| 15) es | End Stream |
| 16) ss | Stream State |
| 17) oid | Object Id Reservation |

Change Session (cs)

Inform a client or siblings in a display array that the workspace has changed. The server sends this message to the client when it receives a request to send a workspace to a wall.

```
// server --> client
[sender-id, "cs", workspaceId]
    sender-id always -1 (indicating the server initiated the message)
    workspaceId (string) is the id of the workspace to switch to
```

Echo (echo)

Echoes an optional body back to the originating client. Used to verify that the socket connection and the server are still healthy.

```
// client --> server
[sender-id, "echo", "foo", "bar"...]
// server --> client
[-1, "echo", "foo", "bar"...]
```

After "echo" the message can take any arguments. They will all be echoed back to the client unaltered if the service and the client's socket connection are healthy. When using the echo message to verify socket health we recommend the following:

Wait at least 5 seconds between echo messages.

Require 2 consecutive echo failures before assuming network or server problems.

This message was added to the protocol because the current implementation of WebSockets in Chrome and other supported browsers do not correctly change readyState or fire onclose when network connection dies.

Error (error)

Informs clients of an error on the server side.

```
// server -> client
["-1", "error", target-id, message]
    target-id: the guide for the object in the session that the error affects
    message: a message about the error.
```

This message is only sent by the server and currently only used when an upload fails during asynchronous processing.

Client Id (id)

The server sends this message when the client connects to the socket. Clients are required to store the assigned client identification for use in subsequent socket requests.

```
// server --> client
["-1", "id", client-id]
    client-id (string) the ID of the newly-joined client
```

Join Room (jr)

Rooms are communication channels that a client can subscribe to. There can be channels for specific workspaces (sessions), for display arrays, or potentially for other groups of clients. The server repeats/sends messages to all the clients connected to a specific room as events happen in that room. A client joins a room to get messages for that display array or workspace (session). There are several types of join room requests.

General Join Room (jr)

Join any room if you know the id.

```
// server <-- client
[sender-id, "jr", room-id, [data]]
    room-id can contain one of lobby or workspace-id
    data is a wildcard set of arguments, which should be
    used to initialize the room.
```

Lobby Join Room (jr)

Joins the lobby channel. Used by clients that wish to keep a web socket open while not displaying a workspace.

```
// server <-- client
[sender-id, "jr", "lobby"]
```

Session Join Room (ir)

Joins the room for a specific workspace (session).

```
// server <-- client
[sender-id, "jr", "session", workspace-id]
    workspace-id: the id of the workspace (workspace)
```

Array Join Room (jr)

Joins the room for a specific display array.

```
// server <-- client
[sender-id, "jr", "array", {
  arrayId: "myArrayId",
  x: 0,
  y: 0,
  width: 1920,
  height: 1080
}]
    arrayId (string)        id of the display array
    x (integer)             x offset of this display
    y (integer)             y offset of this display
    width (integer)         width of this display
    height (integer)        height of this display
```

Room Join Response:

The server responds to successful room join (jr) messages with a room message.

General Room

```
// server --> client
["-1", "room", [room-id], [databag]]
    room-id contains one of: lobby or workspace
    databag is a room-specific bag of variables:
```

Lobby Room

```
// server --> client
["-1", "room", "lobby", {pin: pin-code}]
    pin containing the pin for wall authentication
```

Session Room

```
// server --> client
// server --> client
["-1","room","session",{"uid":" SU5DVpxbfnyGCesijBou",
"name":"Dec 16
    Release","sharing_link":"https://portal.Bluescape.com/
    sessions/1357/shares"}]`
* `uid` the id of the workspace
* `name` the name of the workspace to show in the client
* `sharing_link` a link to the portal page where a user can
    share this workspace with
    others
```

Room List

Informs the client of the room memberships. Room memberships include information regarding clients visiting the same room as you.

```
// server --> client
["-1", "rl", roomMembershipList]
    roomMembershipList (array of room membership objects)
```

A room membership is a hash with the following keys:

| | |
|---|---|
| name | User or device name |
| device_type | The type of device the user is on, |
| (Deprecated) | currently wall or other. |
| clientId | The clientId of this device |
| clientType | The type of client (browser, ipad, or wall) |
| viewport | If the client provides a viewport |
| (optional) | rect the server will repeat it to all clients. |

Undo (un)

Undoes the last undo-able action (move, set text, stroke, etc.).

```
// server <-- client
[sender-id, "un", region-id]
// server --> client
[client-id, 'undo', target-id, removeEventId]
```

Undo Example: Move a Window and then Undo that Move/ Server->Client

The following example shows a move, and how that move is undone.

```
// Client sends move
["5122895cff31fe3509000001","he","5122898bff31fe3509000002",
"position",{
    "rect":[257,357,537,517],
    "order":2
}]
// Server response
["5122895cff31fe3509000001","he","5122898bff31fe3509000002",
"5122898efde0f3350
    9000008","position",{
    "rect":[257,357,537,517]
    ,"order":2
}]
// Client sends undo [<clientId>, 'un', <canvasRegionId>]
["5122895cff31fe3509000001","un",null]
// Server response
// [<clientId>, 'undo', <targetId>, <removedMessageId>]
["-1", "undo","5122898bff31fe3509000002",
"5122898efde0f33509000008"]
```

The server removes the history event from the workspace history and notifies all clients subscribed to the room that this record will no longer be a part of the workspace's historical timeline. Future requests of the history via the HTTP API will not include the undone event (until we implement redo).

User Permissions (up)

Gets the permissions that the current user has for this workspace. Only relevant when a client is acting as an agent for a specific user not relevant when using public key authentication (walls).

```
// server --> client
[sender-id, "up", permissions]
    • Permissions     a hash of permission types
        and true/false to indicate if the
        authenticated user has that permission.
        Currently the only permission is
        "can_share" indicating users who can share
        the workspace with others.
```

Viewport Change

Updates other clients in a session that one client's viewport has changed. This is designed to support the "jump to user's view" and "follow me" features. Clients must send a "vc" upon entering a session for the first time. This ensures that other clients will be able to follow their movements. When processing incoming "vc" events, clients must keep a cache of viewports, keyed by client identification. This is in order to handle occasions where room list membership (rl) events with missing viewports arrive after associated "vc" events. A change in a target viewport to a revised target viewport can include a change in the size of the viewport in one or the other dimension or both, which does not maintain the aspect ratio of the viewport. A change in a target viewport can also include a change in the page zoom of the viewport. When subject client-side viewports in "jump to user's view" or "follow-me" mode receive a first "vc" record, it is an instruction for mapping a displayable area of the subject client-side viewport to the area of a target viewport. A subsequent "vc" record results in a remapped displayable area of the subject client-side viewport to the target viewport. When the "jump to user's view" or "follow me" feature is disabled, the subject client-side viewport returns to its prior window.

```
// server <--> client
[sender-id, "vc", viewport-rect]
    viewport-rect    an array in the form [x1, y1, x2, y2] representing the
    section of the workspace viewable on the sending client.
```

Historical/History Event (he)

History events are pieces of data that are persisted to the database. Any information that is necessary for recreating a visual workspace should be sent to the collaborative service via "he" messages.

EXAMPLES

Creation of notes, images, and other widgets
Moving widgets
Setting or updating attributes of widgets (e.g. note text, marker locations)
Deleting widgets
When the server receives a history event it does the following:
Assign the event a unique id
Persist the event to the database
Broadcast the event, with its id, to all clients connected to the workspace
Establishing an Attachment Relationship record
Updating an Attachment Relationship record History Event Basic Message Format

```
// server <-- client
[client-id, "he", target-id, event-type, event-properties
    client-id (string) the ID of the originating client
    target-id (string) the ID of the target object/widget/app
        to which this event is
        relevant
    event-type (string)an arbitrary event type
    properties (object) a JSON object describing pertinent
    key / values for the
    event
    regionId (string) the canvas region identifier if the
        object is created in a
        canvas region (optional, will be included if it was
        included in the history event
        sent by the client)
```

All properties included in a message will be stored on the server and echoed back to clients. They will also be included in the history sent over http.

```
// server --> client
[client-id, "he", target-id, event-id, event-type, event-properties]
    client-id (string) the ID of the originating client
    target-id (string) the ID of the target window to which this
        event is relevant
    event-id (string) the ID of the event in the database
    event-type (string)an arbitrary event type
    properties (object) a JSON object describing pertinent key /
```

```
values for the
event, including a time value
    o regionId (string) the canvas region identifier if the object
    is created
        in a canvas region (optional, will be included if it was
        included in the
        history event sent by the client)
```

Batch History Events

In order to ensure ordering of tightly coupled events, many can be sent in a batch message by changing the event payload to be an array of event payloads.

```
// server <-- client
[client-id, "bhe", [event1, event2, event3, event4]]
```

In this case, each event is a packet sent as a standard web socket history message.
The event structure is:
[targetId, eventType, props]
So, the clientId portion is not repeated, but all else is as a standard event.

Example History Event Types

| | |
|---|---|
| create | Add a widget to the workspace |
| delete | Remove the widget from the workspace |
| position | Update the size or location of the widget in the workspace |
| template | Change a card template (background color) |
| membership | Update the target children. Used for groups. |
| pin | Pin or unpin a widget |
| stroke | Add a pen or eraser stroke to a widget |
| text | Sets or update the text and/or text formatting of a note. |
| markercreate | Creates a location marker |
| markermove | Moves an existing location marker |
| markerdelete | Deletes an existing location marker |
| tsxappevent | Used for creating, deleting, and updating tsx widgets such as web browsers |
| navigate | Used for navigating to different page inside group documents (MS docs/PDF) |
| attachment relationship create | Used for establishing an attachment relationship record. |
| attachment relationship update | Used for changing an attachment relationship record. |

Widgets and History Events Table

| | note | image | Work-space | web browser | location marker | pdf | group | doc |
|---|---|---|---|---|---|---|---|---|
| create | X | X | | | * | X | X | X |
| delete | X | X | | | * | X | X | X |
| position | X | X | | | * | X | X | X |
| template | X | | | | | | | |
| member-ship | | | | | | | X | |
| pin | X | X | | | | | X | X |
| stroke | X | X | X | | | | | |
| text | X | | | | | | | |
| marker-create | | | | | X | | | |
| marker-move | | | | | X | | | |
| marker-delete | | | | | X | | | |

-continued

|  | note | image | Work-space | web browser | location marker | pdf | group | doc |
|---|---|---|---|---|---|---|---|---|
| tsxap-pevent |  |  |  | X |  |  |  |  |
| navigate |  |  |  |  |  |  |  | X |

*The browser client supports receiving alternative versions of these messages but does not send them out to other clients History Event Details Comments Comments are stored in the history database, but are associated with a particular object rather than a position on the plane.

```
// client --> server
[client-id, "he", target-id, "create", {
   "id":"5123e7ebcd18d3ef5e000001",
   "type":"comment",
   "text":"text of the comment",
   "parent":"5123e7ebcd18d3ef5e000000"}]
Server will append 'name' to the body of the
comment into the props object. The
parent prop is optional and is an id
[client-id, "he", comment-id, "delete"}]
[client-id, "he", comment-id, "text", {"text":"text of the comment"}]
```

Create

Clients send "create" to the collaboration server to add a widget to a workspace. For "create" messages the target-id is the id of the containing element, usually the workspace-id.

Generic Widget Create Example

```
// client --> server
[client-id, "he", workspace-id, "create", {
   "id":"5123e7ebcd18d3ef5e000001",
   "type":"widget",
   "regionId":null
}]
   Props
      id (string)            unique identifier for the widget
      type (string)          the type of widget
      regionId (string)      the canvas region if the object is
                             created in a canvas
      region
```

Most widgets will also have a location property, usually a rect and order, but potentially a point or other representation.

Card Create Example

```
// client --> server
[client-id, "he", workspace-id, "create", {
   "id":"5123e7ebcd18d3ef5e000001",
   "baseName":"sessions/all/Teal",
   "ext":"JPEG",
   "rect":[-1298,-390,-1018,-230],
   "actualWidth":560,
   "actualHeight":320,
   "order":4,
   "type":"note",
   "regionId":null,
   "hidden":false,
   "text":"some text for the note",
   "styles": {
      "font-size" : "42px" ,
      "font-weight" : "400",
      "text-transform" : "inherit"
   }
}]
```

Props
   id (string)                      unique identifier for the window
   baseName (string)       the background image file name
   ext (string)               the background image file extension
   rect (object)              the location of the window
   actual Width (int)       the background image width in pixels
   actualHeight (int)       the background image height in pixels
   order (int)                z order
   type (string)              "note" for objects that can have text,
                                          "image" for
   other objects
   regionId (string)        the canvas region if the object is
                                        created in a
   canvasregion
   hidden (boolean)        whether the window is currently hidden
   text (string)              the text contained in the note (optional)
   styles (object)            style for the text contained in the note
                                        (optional)

PDF Create Example

```
// server --> client
[client-id,
   "he",
   target-id,
   event-id,
   "create",
   {"type":"pdf",
   "id":"5307ec25a294d9250bf65fce",
      "assetPath":"sessions/objects/s7t6mNHxfpqWxAYqYXLF/
      5307ec25a294d9250b
      f65fce.pdf",
   "rect":[1770,284,2994,1076],
   "actualWidth": 1224,
   "actualHeight": 792,
   "filename":"5617_FSPLT1_018078.pdf",
   "title":"Record of Decision",
   "hidden":false,
   "pin":false
   "pages":73}]
      Props
         type (string)         "pdf"
         id (string)           unique identifier for the pdf
         assetPath (string)    the location of this asset on the
                               asset server. Use
      configuration service to get the asset base path.
      rect (object) the location of the window in the workspace
      actual Width (int)       the width of the widest page in
                               the pdf, combined
      with actualHeight to build "bounding box"
      actualHeight (int)       the height of the tallest page
                               in the pdf, combined
      with actual Width to build "bounding box"
      filename (string)        the original file name of the pdf
      order (int)              z order
      hidden (boolean)         whether the window is currently
                               hidden
      pin (boolean)            whether the pdf is pinned in one
                               location on the
      workspace
      regionId (string)        the canvas region if the object is
                               created in a canvas
      region (optional)
```

Group Create Example

```
// client "-> server
[client"id,
   "he" ,
   target-id,
   "create",
   {"type" : "group" ,
   -id" : "S3aS2b392S8f62fce" ,
   -children" : [ ]}]
      Props
```

-continued

```
type (string) "group"
id (string) unique identifier
   for the group
children (array) array of target-ld's
   of widgets that should be part of the
   group
```

Generic Group Position Example

```
//client --> server
[client-id, he, groupid, 'position' , {" rect" : [0, 0, 0, 0 ], "order" :4}]
   Props
      rect (object) The rect of the group. Specified as x1, y1, x2, y2.
      order (int) the z-order of the target group
```

Membership
Replaces the target object's children. Used for grouping items.

```
// server <-- client
[client-id, "he", target-id, "membership", {"children" :
[53a52b39250f62fce,
53a52b39250f62fce]}]
// server --> client
[client-id, "he", target-id, event-id, "membership",
{"children" : [53a52b39250f62fce,
53a52b39250f62fce]}]
   Properties
      children (array) Required. An array containing
      at least one widget ID to
      include in the group. To remove all children, a
      delete message should be
      used instead.
```

Group Document Create Example

```
// server --> client
[ client-id,
"he",
target-id, // group document id
event-id,
"create",
{
"type":"document",
"rect":[x1,y1,x2,y2]
"maxWidth":123,
"maxHeight":456,
"layout":"stacked",
"title":"title of this document",
"assetURL": "xxx/xxx/xxx.docx",
"hidden": true,
"pin": false,
"activeChildId": "id1838094221",
"children": [
"id0398749123",
"id1838094221",
"id2849239042",
"id3849012830"]}]
   Properties
      type (string) "groupdocument"
      activeChildId (string) active child Id, such as
         currently displayed page of
         PDF/Doc
      children (array) array of child(page) object IDs,
         array order represents the
         child(page) order.
      layout (string) Define the client layout to render this group document.
```

Presentation Create Example

```
// client --> server
[client-id,
"he",
target-id,
"create",
{"type":"presentation",
"id":"53a52b39250f62fce",
"children": [ ]}]
   Props
      type (string) "presentation"
      id (string) unique identifier for the group
      children (array) array of target-id's of widgets that should part of the
         presentation in order of presentation
```

Presentation Create Example

```
// server --> client
[ client-id,
"he",
target-id, // presentation id
event-id,
"create",
{
"type":"presentation",
"children": [
"id0398749123",
"id1838094221",
"id2849239042",
"id3849012830"]}]
   Props
      type (string) "presentation"
      children (array) array of child(page) object IDs,
         array order represents the
         child(page) order.
```

Delete
Removes a widget from a workspace.

```
// server <-- client
[client-id, "he", target-id, "delete", {"hidden":true}]
// server --> client
[client-id, "he", target-id, event-id, "delete", {"hidden":true}]
```

Position
Used to save the position of a widget after a move, fling, resize, etc.

Generic Widget Position Example

```
// server <-- client
[client-id, "he", target-id, "position", {new-position}]
// server --> client
[client-id, "he", target-id, event-id, "position", {new-position}]
   • Props
      o new-position (object)   some way to represent the new position of
         the object. See the window example.
```

Generic Window Position Example

```
// server <-- client
[client-id, "he", target-id, "position", {"rect":[−1298,−390,
−1018,−230],"order":4}]
// server --> client
[client-id, "he", target-id, event-id, "position", {"rect":[−1298,
−390,−1018,−
   230],"order":4}]
   Props
      rect (object)      the location of the target window. Specified
                         as x1, y1, x2, y2
      order (int)        the z-order of the target window
```

Template

Used to change the template for a note. This allows changing the background color.

Note Template Example

```
// server --> client
[client-id, "he", workspace-id, event-id, "template",
{"baseName": "sessions/all/Beige"}]
  Props
    baseName (string) the file name of the new
    background. The file must
    be already on the collaboration server. The list
    of templates is available
    via the http-protocol at /card_templates.json
```

Used to pin a widget and prevent users from moving or resizing that widget. Also used to remove an existing pin.

Generic Widget Position Example

```
// server --> client
[client-id, "he", workspace-id, event-id, "pin", {"pin": true}]
  • Props
    o pin (boolean) true is pin, false is un-pin
```

Stroke

Used to add a stroke to a widget or to the workspace background.

Generic Stroke Example

```
// server <-- client
[client-id, "he", target-id, "stroke", {
  "size": 10,
  "brush": 1,
  "color": [255, 153, 0, 1],
  "locs": [850, 616, 84, 617],
  "regionId": 59.1
}]
// server --> client
[client-id, "he", target-id, event-id, "stroke", {
  "size": 10,
  "brush": 1,
  "color": [255, 153, 0, 1],
  "locs": [850, 616, 84, 617],
  "regionId": 59.1
}]
Props
    size (integer)      diameter of the stroke using the
                        coordinate space of the containing object. Strokes on the
                        canvas are sized in world space, while strokes on widgets
                        are sized in their parent widget space.
    brush (integer)     the brush type to use when rendering the
                        stroke. 1 is the draw brush, while 2 is the erase brush.
    color (numbers)     r/g/b/a values for the color of the
                        stroke. Ignored for erase strokes (although may still be
                        present).
    locs (array)        stroke locations in the format:
                        [10, 1, 10, 2, 12, 3] where coordinates are paired
                        [x, y, x, y, x, y, ...] in an array. Similar to size, locations
                        are in the coordinate space of the containing object.
    regionId (string)   the canvas region if the stroke is
                        created in a canvas region (optional).
```

Rendering note: strokes should be rendered with end caps centered on the first and last points of the stroke. The end cap's diameter should be equal to the brush size. Rendering end caps is the responsibility of each client.

Text

Set the text and style of text on a widget. Both the text attribute and style attribute are optional.

Generic Text Example

```
// server <-- client
[client-id, "he", target-id, "text", {
  "text": "abcdef",
  "styles" : {"font-size" : "42px","font-weight" :
  "400","text-transform" : "inherit"}
}]
// server --> client
[client-id, "he", target-id, event-id, "text", {
  "text" : "abcdef",
  "styles" : {
    "font-size" : "42px",
    "font-weight": "400",
    "text-transform": "inherit"
  }
}]
Props
    text (string)       the text string to show on the widget
    styles (hash)       the css styles to apply to the text
``` markercreate

Creates a location marker (map marker, waypoint) at a specific place in the workspace.

Example

```
// server <-- client
[client-id, "he", new-widget-id, "markercreate",{
  "creationTime":1387565966,
  "name":"my marker",
  "y":1828,
  "x":-875,
  "color":0
}]
// server --> client
[client-id, "he", new-widget-id, event-id, "markercreate",{
  "creationTime":1387565966,
  "name":"my marker",
  "y":1828,
  "x":-875,
  "color":0
}]
Props
    creationTime (int)  the creation time (unix time)
    name (string)       a label for the location marker
    y (number)          the y location of the marker
    x (number)          the x location of the marker
    template (string)   the marker template name
```

Alternative Form Accepted by Browser Client

```
// server <-- client
[client-id, "he", session-id, "create",{
  "id":"52b0f86ac55697ad30003b21"
  "type":"locationMarker",
  "creationTime":1387565966,
  "name":"my marker",
  "y":1828,
  "x":-875,
  "template":"red"
}]
// server --> client
[client-id, "he" session-id, event-id, "create",{
  "id":"52b0f86ac55697ad30003b21"
  "type":"locationMarker",
  "creationTime":1387565966,
  "name":"my marker",
  "y":1828,
  "x":-875,
  "template":"red"
}]
``` markermove

Moves an existing location marker (map marker, waypoint) to a new place in the workspace.

Example

```
// server <-- client
[client-id, "he", marker-id, "markermove",{
  "y":1828,
  "x":-875,
}]
// server --> client
[client-id, "he", marker-id, event-id, "markermove",{
  "y":1828,
  "x":-875,
}]
```

Props
y (number)    the y location of the marker
x (number)    the x location of the marker

Alternative Form Accepted by Browser Client

```
// server <-- client
[client-id, "he", target-id, "position",{
  "y":1828,
  "x":-875,
}]
// server --> client
[client-id, "he", target-id, event-id, "position",{
  "y":1828,
  "x":-875,
}]
``` markerdelete

Delete an existing location marker.

Example

```
// server <-- client
[client-id, "he", marker-id, "markerdelete",{ }]
// server --> client
[client-id, "he", marker-id, event-id, "markerdelete",{ }]
```

Alternative form accepted by browser client

```
// server <-- client
[client-id, "he", target-id, "delete",{
  "hidden":true,
}]
// server --> client
[client-id, "he", target-id, event-id, "delete",{
  "hidden":true,
}]
``` tsxappevent

TSXappevent sends a history event to various widgets on the tsx system.

Example

```
// server <-- client
[client-id, "he", target-id, "tsxappevent",{
  "payload":
  {
    additional-properties
  },
  "messageType":message-type,
  "targetTsxAppId":tsx-app-id
}]
// server --> client
[client-id, "he", target-id, event-id, "tsxappevent",{
  "payload":
  {
    additional-properties
  },
  "messageType":message-type,
  "targetTsxAppId":tsx-app-id
}]
```

Props
payload (object)       the properties necessary for this tsxappevent
messageType (string)   the type of message

Example of Creating a Web Browser

```
// server <-- client
client-id,"he",new-browser-id,"tsxappevent",{
  "payload": {
    "y":709,
    "x":1517,
    "worldSpaceWidth":800,
    "worldSpaceHeight":600,
    "windowSpaceWidth":800,
    "windowSpaceHeight":600,
    "version":1,
    "url":"http://www.google.com/",
    "order":735880
  },
  "messageType":"createBrowser",
  "targetTsxAppId":"webbrowser"
}]
// server --> client
[client-id,"he",new-browser-id, event-id, "tsxappevent", {
  "payload": {
    "y":709,
    "x":1517,
    "worldSpaceWidth":800,
    "worldSpaceHeight":600,
    "windowSpaceWidth":800,
    "windowSpaceHeight":600,
    "version":1,
    "url":"http://www.google.com/",
    "order":735880
  },
  "messageType":"createBrowser",
  "targetTsxAppId":"webbrowser"
}]
```

Props
payload (object)          details needed for creating a browser
  x (number)              the x location of the marker
  y (number)              the y location of the marker
  worldSpaceWidth (number) the width in world space
  worldSpaceHeight (number) the height in world space
  windowSpaceWidth (number)   the width in window space
  windowSpaceHeight (number)  the height in window space
  version (number)          #TODO
  url (number)              the url this browser widget shouldpoint to messageType *(string) "createBrowser" for creating browsers targetTsxAppId *(string) "webbrowser" for web browser widgets

Example of Deleting a Web Browser

```
// client --> server
[client-id, "he",target-id,"tsxappevent",{
  "messageType":"deleteBrowser",
  "targetTsxAppId":"webbrowser",
  "payload":{"version":1}
}]
``` navigate

Example of navigating to a different item in the payload. One could use this for example for a browser widget navigating to an URL.

```
[
client-id,
"he"
target-id, //Group/presentation or maybe Browser URL ID
"navigate",
payload // navigate to this page
]
```

Volatile Event (ve)

Volatile events are not recorded in the database, so they are good for in-progress streaming events like dragging a card around the screen, and once the user lifts their finger, a history event is used to record its final place.

Volatile Event Basic Message Format

```
// server <--> client
[client-id, "ve", target-id, event-type, event-properties]
    client-id (string)     the ID of the originating client
    target-id (string)     the ID of the target window to
                           which this event is relevant
    event-type (string)    an arbitrary event type
    properties (object)    a JSON object describing pertinent key /
                           values for the event
```

Example Volatile Event Types

| | |
|---|---|
| sb | Begins a new stroke. |
| sc | Continues a previously started stroke. |
| se | Ends a stroke |
| position | Used to share a position with other clients that should not be persisted. For example show a window being dragged in real time. |
| bf | Begin Follow: User A begins to follow User B. Used to notify User A that user B is following. |
| ef | End Follow: User B is no longer following user A. Used to notify user A that user B is no longer following. |

Volatile events by Widget type

| | card | image | Workspace |
|---|---|---|---|
| sb | X | X | X |
| sc | X | X | X |
| se | X | X | X |
| position | X | X | |
| bf | | | X |
| ef | | | X |

Workspace

| | |
|---|---|
| sb | Starts a stroke. Used to render strokes on one client while they are being drawn on another client. |
| sc | Continues a previously started stroke by giving another point to include. Used to render strokes while they are being drawn on another client. |
| se | Ends a previously started stroke. |
| bf | Begin Follow: User A begins to follow User B. Used to notify User A tha tuser B is following. |
| ef | End Follow: User B is no longer following user A. Used to notify user A that user B is no longer following. |

Note

| | |
|---|---|
| position | Live updates the position of a note while it is being moved by another user. |
| sb | Starts a stroke. Used to render strokes on one client while they are being drawn on another client. |
| sc | Continues a previously started stroke by giving another point to include. Used to render strokes while they are being drawn on another client. |
| se | Ends a previously started stroke. |

Image

| | |
|---|---|
| position | Live updates the position of an image while it is being moved by another user. |
| sb | Starts a stroke. Used to render strokes on one client while they are being drawn on another client. |
| sc | Continues a previously started stroke by giving another point to include. Used to render strokes while they are being drawn on another client. |
| se | Ends a previously started stroke. |

Volatile Event Details

The following fields are properties of several volatile events.

stroke-id Stroke-IDs are selected by the client. Currently they are the sender-id composed with an increasing integer, separated by a dot. This is to make it unique within the server context among all clients.

target-id A stroke may be attached to a specific target (container) in the workspace. In the case of a stroke belonging to a widget, the target identification field would contain the ID of the widget. Strokes destined for the main canvas in the workspace are designated by having their target identification be the same as the workspace identification.

position—ve

Used to broadcast intermediate steps of a window moving around the workspace.

Generic Position Example

```
// server <--> client
[client-id, "ve", target-id, "position", {position-info}]
• Props
    ○ position-info - information about the widget's new position
```

Window Position Example

```
// server <--> client
[client-id, "ve", target-id, "position", {"rect":[-1298,-390,-1018,-230],
"order":4}]
Props
    rect (object)    the location of the target window
    order (int)      the z-order of the target window
```

Stroke Begin (sb)

Used to broadcast the beginning of a stroke to the other clients.

```
// server <--> client
[client-id, "ve", target-id, "sb",{
    "brush":1,
    "size":2,
    "color":[214,0,17,1],
    "x":100,
    "y":300,
```

-continued

```
    "strokeId": 395523d316e942b496a2c8a6fe5f2cac"
}]
    Props
        x,y (int)           the starting point of this stroke
        strokeId (string)   the ID of the new stroke
```

Stroke Continue (sc)

Continues the stroke specified by the stroke identification.

```
// server <--> client
[client-id, "ve", target-id, "sc", {"x":100, "y":300, "strokeId":"
    395523d316e942b496a2c8a6fe5f2cac"}]
    Props
        x,y (int)           the new end-point of the stroke
        strokeId (string)   the ID of the new stroke
```

Stroke End (se)

Ends the stroke specified by stroke-id.

```
// server <--> client
[client-id, "ve", target-id, "se",
    {"strokeId": 395523d316e942b496a2c8a6fe5f2cac"}]
        stroke-id (string)  the ID of the continued stroke
```

Begin Follow (bf)

Begin Follow: User A begins to follow User B. Used to notify User A that user B is following. For this global volatile event, the target identification is the session identification. The user being followed will update the UI to indicate that user B is following.

```
// server <--> client
[follower-client-id, "ve", session-id, "bf",
    {"clientId":"395523d316e942b496a2c8a6fe5f2cac"}]
    Props
        clientId (string) the ID of the client being followed
```

End Follow (ef)

End Follow: User B is no longer following user A. Used to notify user A that user B is no longer following. For this global volatile event, the target identification is the session identification. The user being followed will update the UI to indicate that user B is no longer following. If user B leaves the session, user A will receive a room list message which does not contain user B. User A's room list will then be rebuilt, no longer showing user B as a follower.

```
// server <--> client
[follower-client-id, "ve", session-id, "ef",
    {"clientId":"395523d316e942b496a2c8a6fe5f2cac"}]
    Props
        o clientId (string) the ID of the client no longer
            being followed
```

Example Interaction: Moving Objects

A good example illustrating some of the history event/volatile event-related changes is moving an object. While the object is being moved/resized by dragging, a series of volatile events ("ve"s) is sent to the server, and re-broadcast to all clients subscribed to the workspace:

```
// client sends the following volatile events during the move
// client->server format is: [<clientId>, <messageType>, <targetId>,
        <eventType>, <messageProperties>]
["511d6d429b4aee0000000003","ve","511d6f9c9b4aee0000000039",
"position",{
    "rect": [-493,73,-2,565],
    "order":0
}]
["511d6d429b4aee0000000003","ve","511d6f9c9b4aee0000000039",
"position",{
    "rect": [-493,73,-2,565],
    "order":0
}]
["511d6d429b4aee0000000003","ve","511d6f9c9b4aee0000000039",
"position",{
    "rect"[-538,91,-47,583],
    "order":0
}]
["511d6d429b4aee0000000003","ve","511d6f9c9b4aee0000000039",
"position",{
    "rect": [-538,91,-47,583],
    "order":0
}]
```

Once the user finishes moving the object, the client should send a history event to specify the rect and order of the object:

```
["511d6d429b4aee0000000003","he","511d6f9c9b4aee0000000039",
"position",{
    "rect":[-492,73,-1,565],
    "order":0
}]
```

The server will respond with the newly persisted "he" record. Note the inclusion of the record's event identification.

```
// server-> client format of 'he' is: [<clientId>, <messageType>,
//                    <targetId>, <eventId>, <eventType>, <messageProps>]
["511d6d429b4aee0000000003","he","511d6f9c9b4aee0000000039",
    "511d9165c422330000000253","position",{
    "rect": [-492,73,-1,565] ,
    "order":0
}]
```

Note:
The event identification will also be included in history that is fetched via the HTTP API.

Disconnect (disconnect)

Inform other app instances opened by the same user to close their connection and cease reconnect attempts. This is consumed by browser clients in order to prevent the "frantic reconnect" problem seen when two tabs are opened with the same workspace.

```
// server --> client
[-1, "disconnect"]
```

List Streams (ls)

Inform a client of the current streams in a list. Triggered by other events, similar to a room list.

```
// server --> client
[send-id, "ls", [Stream List for Session]]
    sender-id always -1 (indicating the server initiated the message)
```

Stream list is an array of objects, each of which contains the following fields:

sessionId (string) is the id of the workspace containing the conference
conferenceId (string) the id of the conference session all users in this workspace connect to
clientId (ObjectID) the ID of the client broadcasting this particular stream
streamId (string) the ID of this particular AV stream Begin Stream (bs)

Informs the server of a new AV stream starting. The server responds with a List Streams message.

```
// server <-- client
[sender-id, "bs", conferenceId, conferenceProvider, streamId, streamType]
    sender-id clientID of the user starting the stream
    conferenceId (string) the id of the conference session all users
    in this workspace connect to
    conferenceProvider (string) the type of conference, tokbox or twilio
    for example
    streamId (string) the ID of this particular AV stream
    streamType (string) audio, video or screenshare
```

End Stream (es)

Informs the server of a new AV stream ending. The server responds with a List Streams message.

```
// server <-- client
[sender-id, "es", conferenceId, streamId]
    sender-id clientID of the user starting the stream
    conferenceId (string) the id of the conference session all users
    in this workspace connect to
    streamId (string) the ID of this particular AV stream
```

Stream State (ss)

Informs the server of an existing AV stream changing state. The server responds with a List Streams message.

```
// server <-- client
[sender-id, "ss", streamId, streamType]
    sender-id clientID of the user starting the stream
    streamId (string) the ID of this particular AV stream
    streamType (string) audio, video or screenshare
```

Object ID Reservation (oid)

Use this to create a new unique object id that is acceptable for creating new history events which create an object.

```
```javascript
// server <-- client
[sender-id, "oid"]
```

Server responds with:

```
// server -->client
["-1", 'oid', <new-object-id>]
```

The API described above provides one example message structure. Other structures may be utilized as well, as suits a particular implementation.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Also, as used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the technology disclosed may consist of any such feature or combination of features. In view of the foregoing description it will be evident to a person skilled in the art that various modifications may be made within the scope of the technology disclosed.

The foregoing descriptions of preferred embodiments of the technology disclosed has been provided for the purposes of illustration and description. It is not intended to be exhaustive or to limit the technology disclosed to the precise forms disclosed. Obviously, many modifications and variations will be apparent to practitioners skilled in this art. For example, though the displays described herein are of large format, small format displays can also be arranged to use multiple drawing regions, though multiple drawing regions are more useful for displays that are at least as large as 12 feet in width. In particular, and without limitation, any and all variations described, suggested by the Background section of this patent application or by the material incorporated by reference are specifically incorporated by reference into the description herein of embodiments of the technology disclosed. In addition, any and all variations described, suggested or incorporated by reference herein with respect to any one embodiment are also to be considered taught with respect to all other embodiments. The embodiments described herein were chosen and described in order to best explain the principles of the technology disclosed and its practical application, thereby enabling others skilled in the art to understand the technology disclosed for various embodiments and with various modifications as are suited to the particular use contemplated. It is intended that the scope of the technology disclosed be defined by the following claims and their equivalents.

As with all flowcharts herein, it will be appreciated that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the technology disclosed, and it will be understood that numerous additional steps for accomplishing other functions can be performed before, after and between those shown.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the technology disclosed and the scope of the following claims. It is contemplated that technologies described herein can be implemented using collaboration data structures other that the spatial event map.

What is claimed is:

1. A method for operating a server-side network node of a system, the server-side network node having a processor and a communication port, the method comprising:
   storing, by the server-side network node, a data set identifying graphical objects having locations with coordinates in a virtual workspace;
   providing, from the server-side network node to a client-side network node, at least a portion of the data set including information related to a graphical object, the information enabling display of the graphical object by the client-side network node according to a location of the graphical object in the virtual workspace;
   interpreting, at the server-side network node, a detected user interaction event associated with a plurality of locations on a display of the client-side network node, wherein at least one of the plurality of locations corresponds to coordinates of the graphical object in the virtual workspace;
   providing, from the server-side network node to the client-side network node, an identification of a workflow procedure in dependence upon the interpretation of the detected user interaction event,
   wherein the workflow procedure has an input parameter associated with one or more properties of the graphical object; and
   facilitating invocation of the workflow procedure according to the input parameter.

2. The method of claim 1, wherein the user interaction event is a gesture.

3. The method of claim 2, wherein the gesture is a combination of a touch gesture and a non-touch gesture.

4. The method of claim 2, wherein
   the interpreting, at the server-side network node, of the detected user interaction event comprises interpreting a gesture by:
     comparing the gesture to a library of gestures stored in a module in communication with the server-side network node, and
     determining a context of the gesture.

5. The method of claim 1, wherein the input parameter includes at least one of:
   (i) an identifier of a digital asset associated with the graphical object;
   (ii) coordinates of the graphical object;
   (iii) an owner of the digital asset linked to the graphical object; and
   (iv) a user associated with the digital asset.

6. The method of claim 1,
   wherein the graphical object is associated with a digital asset that is at least one of (i) an external third-party application, and (ii) an internal built-in user level object, and
   wherein the graphical object associated with the digital asset is a container representing the external third-party application.

7. The method of claim 6,
   wherein the data set includes information that allows the workflow procedure to be invoked using the external third-party application, and
   wherein the container loads a specific URL associated with the external third-party application and the URL is obtained from the data set using information from the data set associated with the graphical object.

8. The method of claim 1, wherein the graphical object is associated with a digital asset that is a natively integrated third-party application and the graphical object is a container representing the natively integrated third-party application.

9. The method of claim 8, wherein the data set includes information that allows the workflow procedure to be invoked using the natively integrated third-party application.

10. The method of claim 1, wherein the method further comprises:
    providing, from the server-side network node to the client-side network node, at least a portion of the data set including information related to a second graphical object, the information enabling display of the second graphical object by the client-side network node according to coordinates of the second graphical object in the virtual workspace,
      wherein at least one of the plurality of locations corresponds to coordinates of the second graphical object, and
      wherein the workflow procedure has a second input parameter associated with one or more properties of the second graphical object; and
    facilitating invocation of the workflow procedure according to the second input parameter.

11. The method of claim 10, wherein the workflow procedure invokes a second digital asset associated with the second graphical object to perform an operation using information related to the second digital asset.

12. The method of claim 11,
    wherein the second digital asset is an external third-party application and the second graphical object associated with the second digital asset is a container representing the external third-party application, and
    wherein the data set includes information that allows the workflow procedure to be invoked using the external third-party application.

13. The method of claim 11,
    wherein the second digital asset is a natively integrated third-party application and the second graphical object associated with the second digital asset is a container representing the natively integrated third-party application, and
    wherein the data set includes information that allows the workflow procedure to be invoked using the natively integrated third-party application.

14. The method of claim 11,
    wherein the graphical object is associated with a digital asset that is an electronic document and the second digital asset is an image extractor, and wherein the workflow procedure invokes the second digital asset to extract an image from the electronic document.

15. The method of claim 1, wherein the identification of the workflow procedure is contextual based on a type of the graphical object.

16. The method of claim 1, wherein the workflow procedure includes:
requesting a user that provided the user interaction event to identify a target user to which a digital asset associated with the graphical object is to be shared.

17. The method of claim 1, wherein the workflow procedure includes at least one of:
(i) changing a status of a digital asset associated with the graphical object; and
(ii) assigning a status of a digital asset associated with the graphical object.

18. The method of claim 1, wherein the workflow procedure includes:
approving a digital asset associated with the graphical object.

19. A system comprising a server-side network node, the server-side network node having a communication module and a processor, and comprising logic, executable by the processor, to:
store, by the server-side network node, a data set identifying graphical objects having locations with coordinates in a virtual workspace;
provide, from the server-side network node to a client-side network node, at least a portion of the data set including information related to a graphical object, the information enabling display of the graphical object by the client-side network node according to a location of the graphical object in the virtual workspace;
interpret, at the server-side network node, a detected user interaction event associated with a plurality of locations on a display of the client-side network node,
wherein at least one of the plurality of locations corresponds to coordinates of the graphical object in the virtual workspace;
provide, from the server-side network node to the client-side network node, an identification of a workflow procedure in dependence upon the interpretation of the detected user interaction event,
wherein the workflow procedure has an input parameter associated with one or more properties of the graphical object; and
facilitate invocation of the workflow procedure according to the input parameter.

20. A non-transitory computer readable storage medium impressed with computer program instructions to operate a server-side network node of a system, the instructions, when executed on one or more processors, causing the one or more processor to implement operations comprising:
storing, by the server-side network node, a data set identifying digital assets associated with graphical objects having locations with coordinates in a virtual workspace;
providing, from the server-side network node to a client-side network node, at least a portion of the data set including information related to a graphical object associated with a digital asset, the information enabling display of the graphical object by the client-side network node according to a location of the graphical object in the virtual workspace;
interpreting, at the server-side network node, a detected user interaction event associated with a plurality of locations on a display of the client-side network node,
wherein at least one of the plurality of locations corresponds to coordinates of the graphical object in the virtual workspace;
providing, from the server-side network node to the client-side network node, an identification of a workflow procedure in dependence upon the interpretation of the detected user interaction event, wherein the workflow procedure has an input parameter associated with one or more properties of the graphical object; and
facilitating invocation of the workflow procedure according to the input parameter.

* * * * *